US007336775B2

(12) United States Patent
Tanaka et al.

(10) Patent No.: US 7,336,775 B2
(45) Date of Patent: Feb. 26, 2008

(54) IMAGE STORAGE APPARATUS, IMAGE STORAGE SUPPORTING APPARATUS, IMAGE STORAGE SYSTEM, IMAGE MANAGEMENT APPARATUS AND IMAGE SAVING APPARATUS

(75) Inventors: Masahide Tanaka, Tokyo (JP); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/493,415

(22) PCT Filed: Oct. 30, 2002

(86) PCT No.: PCT/JP02/11262

§ 371 (c)(1),
(2), (4) Date: Sep. 27, 2004

(87) PCT Pub. No.: WO03/039143

PCT Pub. Date: May 8, 2003

(65) Prior Publication Data

US 2005/0069107 A1   Mar. 31, 2005

(30) Foreign Application Priority Data

Oct. 30, 2001 (JP) ............................. 2001-332555
Nov. 15, 2001 (JP) ............................. 2001-349644

(51) Int. Cl.
*H04M 11/00* (2006.01)

(52) U.S. Cl. ................................. 379/93.17; 379/93.25

(58) Field of Classification Search ............. 379/93.25, 379/93.17; 348/207.1, 211.1, 211.2, 211.3, 348/211.6, 231.1, 231.2
See application file for complete search history.

(56) References Cited

U.S. PATENT DOCUMENTS 6,784,924 B2 * 8/2004 Ward et al. .............. 348/207.1

(Continued)

FOREIGN PATENT DOCUMENTS

JP    A-63-142963    6/1988

(Continued)

OTHER PUBLICATIONS

Olympus; "Digital Photo-Editor"; Camedia VS100ST; Camedia VS100MO, no date.
Canon; "Digital Photo Station"; PA-200, no date.

*Primary Examiner*—Stella Woo
(74) *Attorney, Agent, or Firm*—Oliff & Berridge, PLC

(57) ABSTRACT

An image storage system includes: an image storage apparatus; and a supporting apparatus. And the image storage apparatus includes an input unit to which image information is input, a first communication unit, a management unit that executes management so that the input image information is transmitted from the first communication unit in automatic response to an input of the image information to the input unit, an information holding unit that holds the input image information until a transmission thereof is completed and then automatically discards the input image information after the transmission is completed in response to the management unit, an information storage unit at which related information corresponding to the image information having been transmitted is stored even after the transmission is completed, and an instruction unit that issues an instruction via the first communication unit with regard to processing to be executed on the image information based upon the related information stored at the information storage unit. On the other hand the supporting apparatus includes a second communication unit, an image storage unit at which the image information from the first communication unit having been received at the second communication unit is stored, and a processing unit that executes processing on images stored at the image storage unit based upon the instruction received at the second communication unit from the first communication unit.

40 Claims, 30 Drawing Sheets

U.S. PATENT DOCUMENTS

| | | | | |
|---|---|---|---|---|
| 6,785,423 | B1* | 8/2004 | Joshi et al. | 382/235 |
| 6,930,709 | B1* | 8/2005 | Creamer et al. | 348/211.3 |
| 2001/0043273 | A1* | 11/2001 | Herrod et al. | 348/220 |
| 2002/0021359 | A1* | 2/2002 | Okamoto | 348/222 |
| 2002/0032911 | A1* | 3/2002 | Tanaka et al. | 725/153 |
| 2002/0069237 | A1* | 6/2002 | Ehara | 709/200 |
| 2002/0071043 | A1* | 6/2002 | Suzuki | 348/231 |
| 2002/0093678 | A1* | 7/2002 | Skidgel et al. | 358/1.15 |
| 2002/0105658 | A1* | 8/2002 | Jackson et al. | 358/1.2 |
| 2003/0009568 | A1* | 1/2003 | McIntyre | 709/229 |
| 2003/0157960 | A1* | 8/2003 | Kennedy | 455/556 |

FOREIGN PATENT DOCUMENTS

| | | |
|---|---|---|
| JP | A-05-075766 | 3/1993 |
| JP | A-05-153282 | 6/1993 |
| JP | A-07-066919 | 3/1995 |
| JP | A-07-087432 | 3/1995 |
| JP | A-07-182366 | 7/1995 |
| JP | A-07-282077 | 10/1995 |
| JP | A-11-032285 | 2/1999 |
| JP | A-2001-197429 | 7/2001 |
| JP | A-2001-218137 | 8/2001 |

* cited by examiner

FIG. 11

| IMAGE ID | HEADER PORTION DATA | | | ORIGINAL IMAGE DATA | THUMBNAIL DATA |
|---|---|---|---|---|---|
| | FILE NO. | EDIT OBJECT | OTHER | | |
| 1 | 123101101501 | 0 | ×× | ×××× | ××× |
| 2 | 123101101502 | 0 | ×× | ×××× | ××× |
| 3 | 123101101601 | 0 | ×× | ×××× | ××× |
| 4 | 123401101601 | 0 | ×× | ×××× | ××× |
| 5 | 123401101602 | 0 | ×× | ×××× | ××× |
| 6 | 123401101603 | 0 | ×× | ×××× | ××× |
| 7 | 123701101601 | 0 | ×× | ×××× | ××× |
| 8 | 123401101801 | 0 | ×× | ×××× | ××× |
| 9 | 123401101802 | 0 | ×× | ×××× | ××× |
| 10 | 123401102001 | 123101101501 | ×× | ×××× | ××× |
| 11 | 123401102002 | 123401101601 | ×× | ×××× | ××× |
| 12 | 123401102101 | 0 | ×× | ×××× | ××× |
| 13 | 123401102102 | 0 | ×× | ×××× | ××× |
| 14 | 123401102103 | 0 | ×× | ×××× | ××× |
| 15 | 123401102104 | 0 | ×× | ×××× | ××× |
| 16 | 123401102105 | 0 | ×× | ×××× | ××× |
| 17 | 123401102106 | 0 | ×× | ×××× | ××× |
| 18 | 123101102101 | 0 | ×× | ×××× | ××× |
| 19 | 123101102102 | 0 | ×× | ×××× | ××× |
| 20 | 123701102101 | 0 | ×× | ×××× | ××× |
| 21 | 123101102301 | 0 | ×× | ×××× | ××× |
| 22 | | | | | |
| 23 | | | | | |

FIG. 12

| HISTORY RECORD ID | OPERATION DATE | FILE NO. | CLASSIFICATION | OPERATOR | PARTNER | CONDITIONS |
|---|---|---|---|---|---|---|
| 1 | 011016 | 123101101501 | VIEW | 1231 | — | — |
| 2 | 011016 | 123101101501 | TRANSMISSION | 1231 | 1234 | PRINT EDIT |
| 3 | 011016 | 123101101601 | VIEW | 1231 | — | — |
| 4 | 011016 | 123401101601 | VIEW | 1234 | — | — |
| 5 | 011016 | 123401101602 | VIEW | 1234 | — | — |
| 6 | 011016 | 123401101603 | VIEW | 1234 | — | — |
| 7 | 011016 | 123401101602 | INTERNAL HIGH QUALITY IMAGE PRINT | 1234 | — | — |
| 8 | 011016 | 123701101601 | TRANSMISSION | 1237 | 1234 | NOT ALLOWED |
| 9 | 011017 | 123101101501 | QUICK IMAGE PRINT | 1234 | — | — |
| 10 | 011017 | 123101101501 | EXTERNAL PRINT | 1234 | — | — |
| 11 | 011018 | 123401101801 | QUICK IMAGE PRINT | 1234 | — | — |
| 12 | 011018 | 123401101802 | QUICK IMAGE PRINT | 1234 | — | — |
| 13 | 011019 | 123401101601 | SEARCH | 1234 | — | — |
| 14 | 011019 | 123401101603 | SEARCH | 1234 | — | — |
| 15 | 011019 | 123401101601 | VIEW | 1234 | — | — |
| 16 | 011019 | 123401101601 | INTERNAL HIGH QUALITY IMAGE PRINT | 1234 | — | — |
| 17 | 011020 | 123401102001 | EDIT | 1234 | — | — |
| 18 | 011020 | 123401102002 | EDIT | 1234 | — | — |

FIG. 14

| SEA-RCH ID | SEARCH DATE | SEARCH COND-UCTOR | SEARCH CONDITIONS ||||||| RESULTS OF SEARCH EXECUTION |
|---|---|---|---|---|---|---|---|---|---|
| | | | OPERA-TION DATE | FILE | CLASSIFICA-TION | OPER-ATOR | PART-NER | CONDI-TIONS | |
| 1 | 01 1019 | 1234 | 01 1016 | — | NOT PRINTED | 1234 | — | — | 123401101601 123401101603 |
| 2 | 01 1021 | 1231 | — | 1231 01101501 | — | — | — | — | 123101101501 123401102001 |
| 3 | 01 1021 | 1234 | — | 1234 01102001 | — | — | — | — | 123101101501 123401102001 |
| 4 | 01 1021 | 1234 | 01 0801~ 1021 | — | RECEIVED | — | 1234 | — | 123101101501 123701101601 123401102001 123401102002 |
| | | | | | EDITED | 1234 | — | — | |
| 5 | 01 1023 | 1234 | — | — | RECEIVED | 1231 or 1237 | 1234 | PRINTED | 123101101501 |
| 6 | 01 1023 | 1234 | 01 1018~ 1023 | — | UNDERGONE QUICK IMAGE PRINT | 1234 | — | — | 123401101801 123401101802 |
| 7 | 01 1023 | 1234 | ~98 1231 | — | EXTERNALLY PRINTED | 1234 | — | — | 123495061801 123497021002 |
| 8 | 01 1025 | 1231 | — | — | VIEWED AND TRANSMITTED | 1231 | — | — | 123101101501 |

FIG. 18
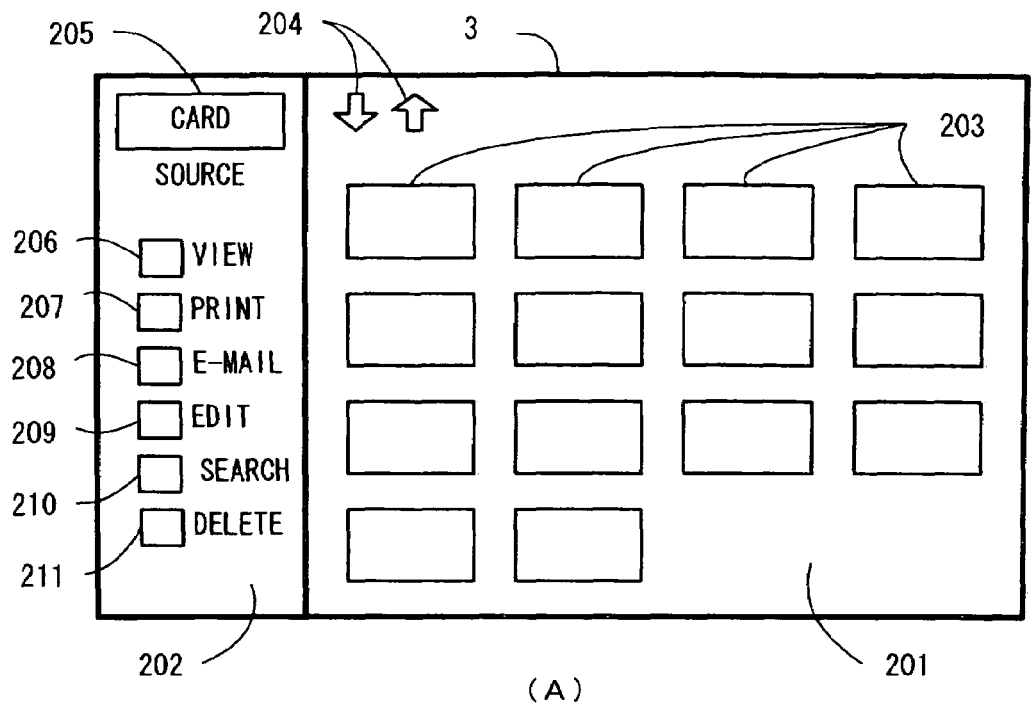
(A)
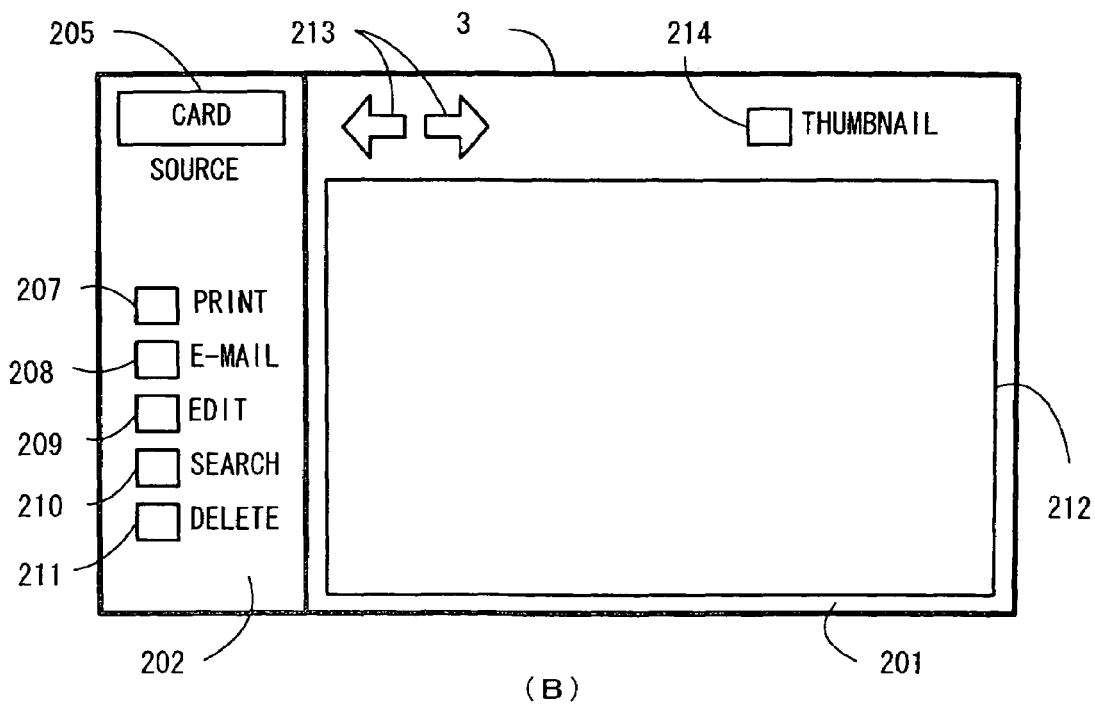
(B)

FIG. 19
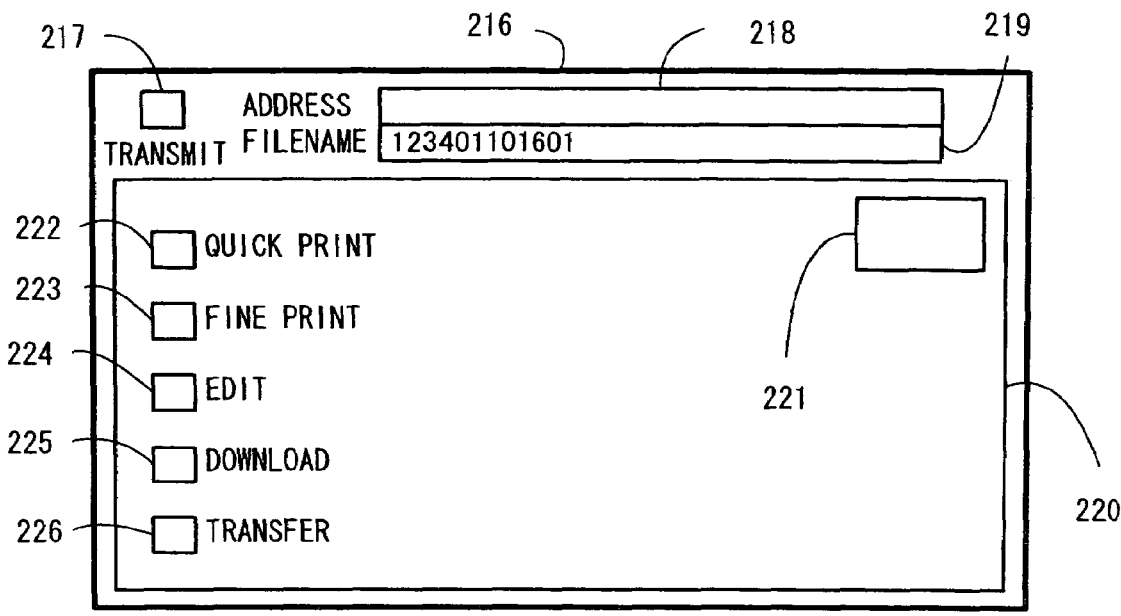
(A)
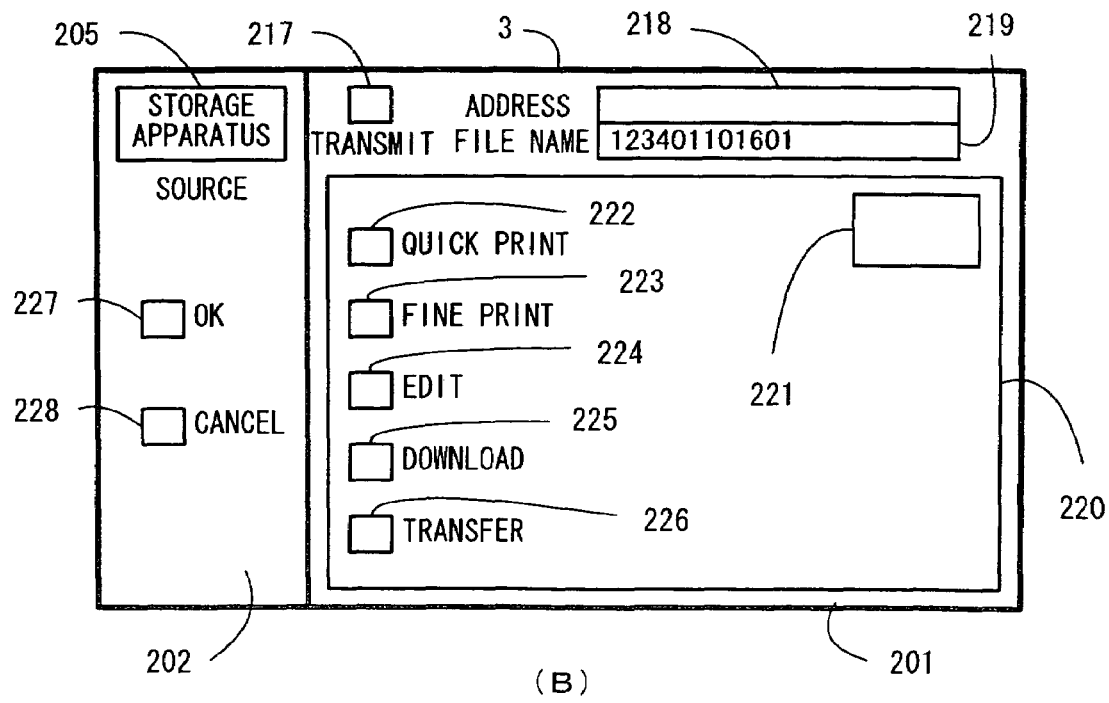
(B)

FIG. 20
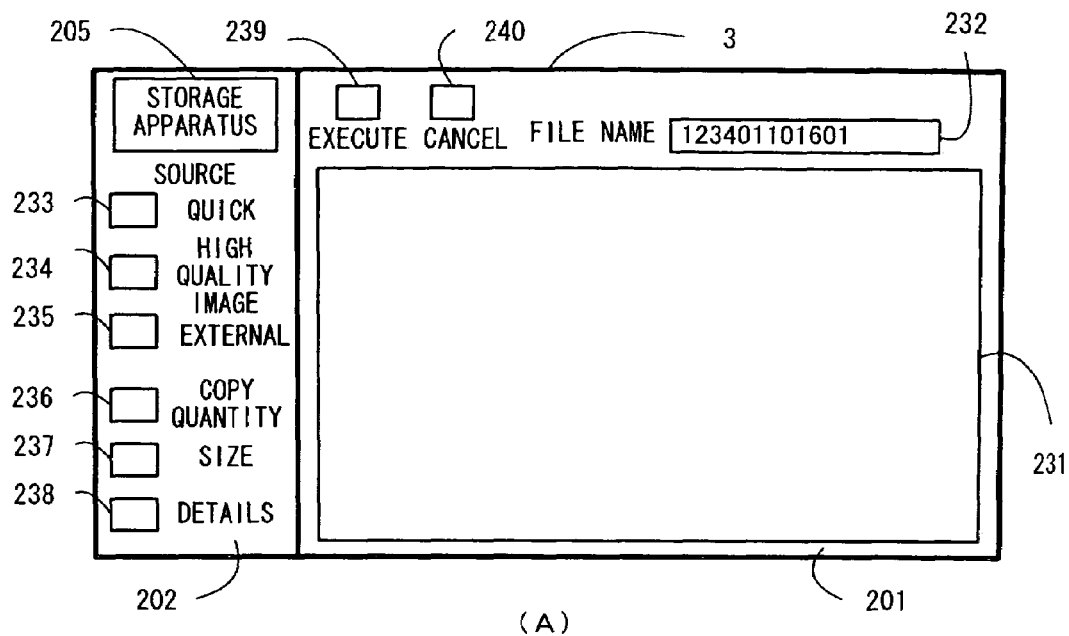
(A)
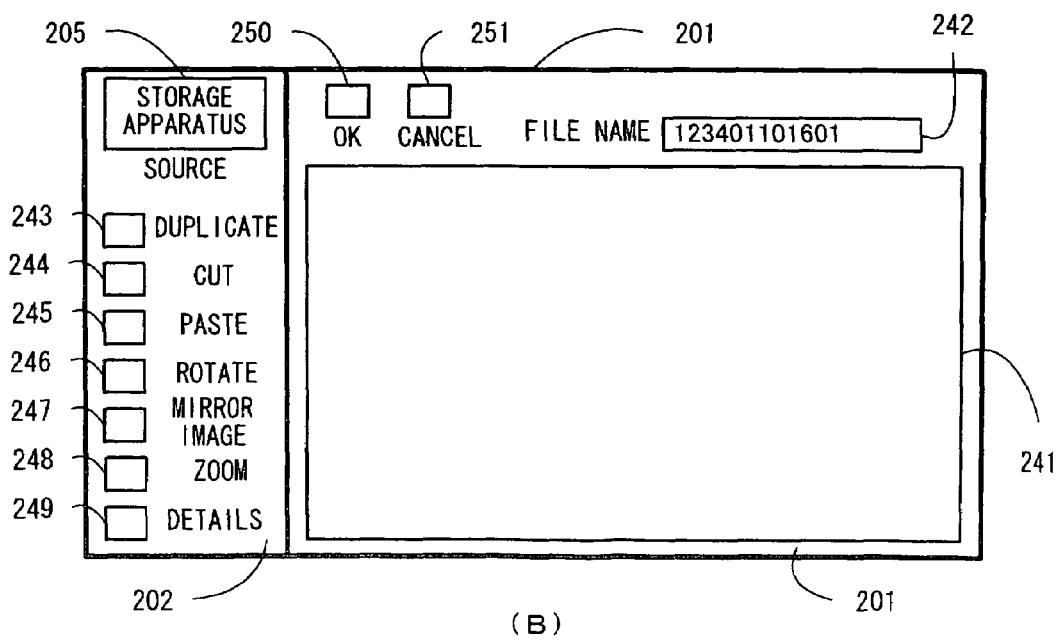
(B)

FIG. 24

| INTEGRATED MANAGEMENT ID | MANAGEMENT DATA ||||| STORAGE IMAGE DATA | THUMBNAIL DATA |
|---|---|---|---|---|---|---|---|
| | INPUT DATE | ORIGINATOR | SERVER NAME | SERVER FILE NO. | UNIVERSAL STANDARD | | |
| 1 | 011016 | — | SERVER I | 01123401101601 | Yes | ××× | ×× |
| 2 | 011016 | — | SERVER I | 01123401101602 | Yes | ××× | ×× |
| 3 | 011016 | — | SERVER I | 01123401101603 | Yes | ××× | ×× |
| 4 | 011016 | II | SERVER I | 01123101101501 | Yes | ××× | ×× |
| 5 | 011016 | — | SERVER III | N85693Q6 | No | ××× | ×× |
| 6 | 011016 | — | SERVER III | N85693Q7 | No | ××× | ×× |
| 7 | 011016 | III | SERVER I | 01123701101601 | Yes | ××× | ×× |
| 8 | 011018 | — | SERVER I | 01123401101801 | Yes | ××× | ×× |
| 9 | 011018 | — | SERVER I | 01123401101802 | Yes | ××× | ×× |
| 10 | 011020 | — | SERVER I | 01123401102001 | Yes | ××× | ×× |
| 11 | 011020 | — | SERVER I | 01123401102002 | Yes | ××× | ×× |
| 12 | 011020 | — | SERVER II | 05123401102001 | Yes | ××× | ×× |
| 13 | 011020 | — | SERVER II | 05123401102002 | Yes | ××× | ×× |
| 14 | 011020 | — | SERVER II | 05123401102003 | Yes | ××× | ×× |
| 15 | 011021 | — | SERVER I | 01123401102101 | Yes | ××× | ×× |
| 16 | 011021 | — | SERVER I | 01123401102102 | Yes | ××× | ×× |
| 17 | 011021 | — | SERVER I | 01123401102103 | Yes | ××× | ×× |
| 18 | 011021 | — | SERVER I | 01123401102104 | Yes | ××× | ×× |
| 19 | 011021 | — | SERVER I | 01123401102105 | Yes | ××× | ×× |
| 20 | 011021 | — | SERVER I | 01123401102106 | Yes | ××× | ×× |
| 21 | 011023 | — | SERVER III | P4296T3 | No | ××× | ×× |
| 22 | 011025 | — | SERVER II | 05123401102501 | Yes | ××× | ×× |
| 23 | 011025 | — | SERVER II | 05123401102502 | Yes | ××× | ×× |
| 24 | | | | | | | |
| 25 | | | | | | | |

FIG. 29
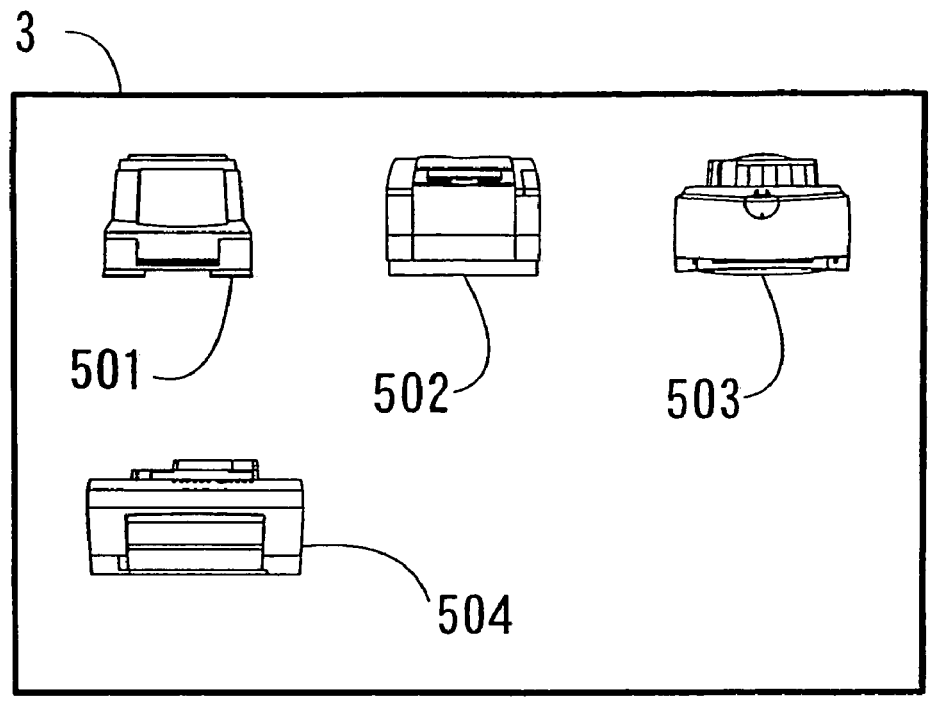
(A)
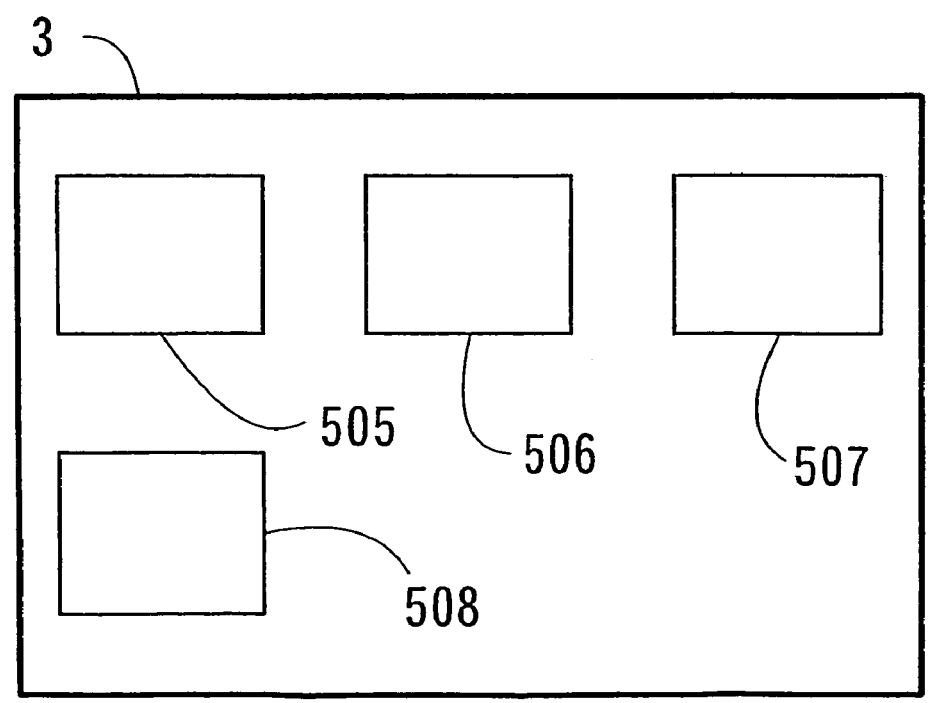
(B)

IMAGE STORAGE APPARATUS, IMAGE STORAGE SUPPORTING APPARATUS, IMAGE STORAGE SYSTEM, IMAGE MANAGEMENT APPARATUS AND IMAGE SAVING APPARATUS

INCORPORATION BY REFERENCE

The disclosures of the following priority applications are herein incorporated by reference:

Japanese Patent Application No. 2001-332555 filed Oct. 30, 2001

Japanese Patent Application No. 2001-349644 filed Nov. 15, 2001.

TECHNICAL FIELD

The present invention relates to an image storage apparatus, an image storage supporting apparatus, an image storage system, an image management apparatus and an image saving apparatus, and more specifically, it relates to storage and management of images photographed with a digital camera.

BACKGROUND ART

Various types of so-called image filing apparatuses and electronic album devices used in the storage of still image data obtained through photographing operations executed with digital cameras have been proposed to date. They include those disclosed in, for instance, Japanese Laid Open Patent Publication No. S63-142963, Japanese Laid Open Patent Publication No. H 7-87432, Japanese Laid Open Patent Publication No. H 7-282077, Japanese Laid Open Patent Publication No. H 7-182366 and Japanese Laid Open Patent Publication No. H 11-32285.

A concept of assigning an external image storage server to save and file images by transmitting the images photographed with a digital camera from the digital camera or a personal computer to the external image storage server has also been proposed.

However, when the user files images or manages images in an electronic album on his own apparatus, he may lose the image information due to displacement of or damage to the recording medium unless he manages the images in a very thorough manner. When he contracts an external image server to file images or to manage images in an electronic album, on the other hand, he must ensure that he transmits images promptly to the image server so that the images are stored in a timely manner for smooth management. In addition, he cannot use the images without accessing the image server.

Furthermore, since the image server often sets specific limits to the storage capacity allocated to each user, a user wishing to have a great number of images saved needs to contract a plurality of image servers. Also, a user may end up subscribing to services provided by a plurality of image servers without initially intending to employ a plurality of different image servers, if he signs up with random image servers without careful planning. When images are saved at a plurality of different image servers, the user may no longer be able to ascertain which images are stored at which image servers.

DISCLOSURE OF THE INVENTION

A desired object of the present invention is to provide an image storage system to be adopted in image filing or electronic album management of images, which ensures that images are stored with a high degree of reliability, that the stored images are saved with a high degree of security and that the images can be retrieved through a simple procedure of image filing, and an image storage apparatus and an image storage supporting apparatus constituting the system.

Another desired object of the present invention is to provide an image management apparatus that makes it possible to manage images in a well-organized manner even when a plurality of image servers are employed.

In order to achieve the objects described above, the image storage system according to the present invention comprises an image storage apparatus and an image storage supporting apparatus. The image storage apparatus comprises an input unit to which image information is input, a first communication unit, a management unit that executes management so that the input image information is transmitted from the first communication unit in automatic response to an input of the image information to the input unit, an information holding unit that holds the input image information until the transmission is completed and then, in response to the management unit, automatically discards the input image information after the transmission is completed, an information storage unit that stores related information corresponding to image information having been transmitted even after the transmission is completed and an instruction unit that issues an instruction via the first communication unit with regard to processing to be executed on the image information based upon the corresponding related information stored at the information storage unit. The supporting apparatus comprises a second communication unit, an image storage unit that stores the image information from the first communication unit which has been received at the second communication unit and a processing unit that executes processing on an image stored at the image storage unit based upon the instruction received at the second communication unit from the first communication unit.

With the configuration described above, in which image storage is assigned to the supporting apparatus, such as an external image server, it is possible to ensure that image information is transmitted to the supporting apparatus with a high degree of reliability in automatic response to an input of the image information to the image storage apparatus. Thus, an inadvertent failure to transmit image information having been input never occurs. In addition, since the related information corresponding to image data having been transmitted to the supporting apparatus is stored at the information storage unit after the transmission, instructions with regard to the image information such as a print instruction, a retrieve instruction or a transfer instruction can be issued by accessing the supporting apparatus based upon the stored information whenever necessary.

The related information may be created within the image storage apparatus based upon the image information input to the input unit, or the supporting apparatus may be assigned to create related information based upon the image information having been transmitted thereto and then to return the related information thus created.

In another mode of the invention, image information with a smaller information volume is created based upon the original image information and this image information with the smaller information volume is stored as the related information at the information storage unit of the image storage apparatus. In such a case, the image information with the smaller information volume which is stored at the information storage unit of the image storage apparatus can be utilized for normal purposes such as a simple image search and image viewing on a monitor. Since a desired number of sets of image information can be stored at the information storage unit in the image storage apparatus with the limited storage capacity in this manner and the image information with the smaller information volume provides images with an image quality high enough for viewing at a display unit of the image storage apparatus, the user does not need to access the supporting apparatus such as an image server each time he needs to use image information. He only needs to access the supporting apparatus when he needs a higher quality image for printing or the like.

In another mode of the invention, the image storage apparatus comprises an input instruction unit that issues an instruction for an individual input of the image information and a transmission instruction unit that issues an instruction for an image transmission, and images are managed for individual sets of image information so that if an instruction is issued by the input instruction unit, the input image information is transmitted to the supporting apparatus without any instruction from the transmission instruction unit. This enables highly specific management of individual images and, at the same time, it is ensured that a given image for which an input instruction is issued by the user having a particular interest in the image is transmitted to the supporting apparatus with a high degree of reliability.

To describe the invention realized in this mode in further detail, image information is transmitted to the supporting apparatus either in a first transmission mode in which transmission of each set of image information is started in response to an input instruction from the input instruction unit or in a second transmission mode in which a plurality of sets of image information are transmitted in a batch. More specifically, if an input instruction is issued while a connection with the supporting apparatus is in effect, the transmission is executed in the first transmission mode, whereas the transmission is executed in the second transmission mode if the connection with the supporting apparatus is not in effect, so as to save on communication fees by transmitting a plurality of sets of image information whenever the connection needs to be established anew. Furthermore, if the communication fee is charged based upon the data volume of image information to be transmitted, the communication fee does not change whether image information is transmitted individually or in a batch, and accordingly, the transmission is executed in the first transmission mode, whereas the transmission is executed in the second transmission mode if the communication fee is charged based upon the length of communication time.

In yet another mode of the invention, transmission management is implemented so that image information held at the information holding unit is transmitted to the supporting apparatus when the image information satisfies a predetermined condition. To describe the invention adopting this mode in further detail, the image information is transmitted even without satisfying the predetermined conditions when a predetermined time point arrives or a predetermined length of time elapses after the previous transmission. It is to be noted that the predetermined condition may be that the number of sets of image information held at the information holding unit has reached a predetermined value, that the grand total of the data volume of the image information held at the information holding unit has reached a predetermined value or the like. Through such management, the transmission is executed particularly efficiently in the second mode described above.

In order to achieve the objects described above, another aspect of the invention provides an image management apparatus having an information storage unit that transmits image information to one of a plurality of external recipients such as image servers to be saved therein and also stores related information with regard to the image information having been transmitted. The related information may be, for instance, display image information with a small file size corresponding to the transmitted image information. The image management apparatus according to the invention further comprises an operation unit through which an instruction with regard to the related information is issued regardless of to which of the plurality of external recipients the corresponding image information has been transmitted and an instruction unit that transmits an instruction issued through the operation unit to the corresponding external recipient in response to an operation at the operation unit. The instruction may be, for instance, a request for a printing operation to be executed based upon the image information corresponding to the related information.

According to the invention described above, regardless of at which external recipient the instruction-target image information is saved, the instruction is transmitted with a high degree of reliability to the correct external recipient based upon the related information stored at the information storage unit by executing a specific operation.

The instruction described above is transmitted to the external recipient at which the image information corresponding to the related information is saved, an external recipient capable of executing the instruction of or the like. In addition, if there are a plurality of recipients for which a given instruction is intended, the instruction may be simply transmitted to one representative external recipient who is then assigned to relay the instruction to the other external recipients. At this time, by selecting an external recipient capable of executing the instruction as the representative, the process of billing the user for the fees for the instruction execution can be carried out smoothly. Alternatively, the instruction may be transmitted to a predetermined single external recipient assigned to function as a liaison. In this case, an external recipient who does not have the image information corresponding to the related information saved therein or does not execute the instruction can be in appointed to function as a liaison whose sole role is to direct the instruction to the correct recipients. It is to be noted that the instruction may be directly transmitted from the image management apparatus individually to the plurality of external recipients instead of to a single representative recipient or to a single liaison.

In another mode of the invention, the related information stored at the information storage unit of the image management apparatus includes identification information used to identify the specific image, which is assigned based upon a universal or common standard commonly employed by the plurality of external recipients. To describe this mode in further detail, the related information also contains identification information used to identify the image management apparatus which is assigned in compliance with the universal standard and identification information used to identify the specific external recipient, which is assigned in compliance with the universal standard. Compliance with such a universal standard facilitates the specification of image information and an instruction transfer during communication between the image management apparatus and an external recipient, allows the plurality of external recipients to share image information and contract the execution of instructions to one another, and also accommodates a system with a given external recipient functioning as representative or a liaison with ease. Such identification information conforming to the universal standard may be assigned at the external recipient in compliance with the universal standard, or it may be assigned at the image management apparatus in compliance with the universal standard.

In another mode of the invention, the image management apparatus comprises a display unit at which related information with respect to image information is displayed regardless of to which specific external recipients the individual sets of image information have been transmitted. The related information is displayed so as to allow the user to select a desired set of related information from a plurality of sets of related information, for instance. The user will need to select a specific set of related information in this manner when issuing an instruction to the corresponding external recipient, or when viewing the image by using the related information constituted as display image information at the image management apparatus itself. Since all the related information is displayed at the display unit described above even if the individual sets of image information are saved at a plurality of different external recipients, the image information can be managed through a centralized system at the image management apparatus.

In yet another mode of the invention, the image management apparatus comprises a display unit at which all available services are displayed regardless of which of a plurality of external service providers offer the specific services when the user wishes to request a service for a stored image from one of the plurality of external service providers. In more specific terms, this display may take the form of a display of a service menu in a format that allows a selection of a given service through the operation unit. By using the display unit described above, an integrated management system, which offers the user the comfort of dealing with a single external service provider even when a plurality of external service providers are employed. It is to be noted that a decision-making unit that eliminates any unavailable services from the display in correspondence to individual images to receive services may be provided. Such a decision-making unit helps simplify the display by excluding unavailable services from the display.

In another mode of the invention, the image management apparatus comprises an information storage unit that transmits image information to one of a plurality of external recipients to be saved therein and stores related information with regard to the transmitted image information and a search unit that searches for related information at the information storage unit as the search target regardless of which external recipient the corresponding image information has been transmitted to. In this case, regardless of at which external recipient a specific image is saved, the image satisfying a search condition can be searched with a high degree of reliability. In addition, the results of such a search can be displayed no matter at which external recipient the image is saved.

In another mode of the invention, the image management apparatus comprises an operation unit through which an instruction is issued with regard to a plurality of sets of related information corresponding to image information saved at a plurality of external recipients and an instruction unit that transmits the instruction to the plurality of external recipients in response to an operation at the operation unit. Alternatively, the image management apparatus may include a selection operation unit through which a plurality of sets of related information corresponding to image information saved at a plurality of external recipients are selected and an instruction for the selected sets of related information is issued, a transmission operation unit through which a transmission instruction is issued to all the relevant external recipients and an instruction unit that transmits the instruction to the plurality of external recipients in response to an operation of the transmission operation unit. In this mode, when sending an instruction with regard to a plurality of sets of related information corresponding to image information saved at a plurality of recipients, for instance, the user only needs to issue the instruction with regard to the individual sets of related information or to perform a single transmission operation regardless of the specific intended recipients in order to send the instruction to all the external recipients which the instruction is to be sent without having to execute a transmission operation in correspondence to each of the plurality of external recipients.

In yet another mode of the invention, the image management apparatus comprises an operation unit through which an instruction with regard to related information is issued to all relevant external recipients, a conversion unit that converts the instruction to an instruction inherent to a specific external recipient and an instruction unit that transmits the instruction inherent to the external recipient in response to an operation at the operation unit. Since a plurality of external recipients normally operate within individual inherent instruction systems unless they all comply with a universal standard, separate instructions with identical contents, which are compatible with the different instruction systems, must be provided to the plurality of external recipients. However, by adopting the mode described above, only a single instruction needs to be issued for all the external recipients, as long as the instruction contents are identical.

In another mode of the invention, the image management apparatus comprises an information storage unit that transmits image information to one of a plurality of external recipients to be saved therein and stores related information corresponding to image information saved at the external recipients and a display unit at which information related to external recipients having accessible image information saved therein is displayed based upon the related information. More specifically, the display unit is controlled so that a new external recipient at which accessible image information is now saved for the first time is automatically added to the display at the display unit and the an external recipient at which there is no longer any accessible image information saved is automatically deleted from the display at the display unit. Alternatively, a plurality of external recipients may be displayed regardless of whether or not they hold accessible image information and external recipients having accessible image information saved therein may be displayed by adopting a display mode different from a display mode of other external recipients. As a further alternative, a plurality of external recipients may be displayed regardless of whether or not they hold accessible image information and the user may be enabled to issue an instruction exclusively for external recipients having accessible image information saved therein. By adopting this mode, an integrated management of a plurality of external recipients, for instance, is realized through a simple system.

An image saving apparatus constituting an external recipient may adopt various modes in correspondence to the different modes explained above. For instance, the image saving apparatus according to the present invention operates in conjunction with other image saving apparatuses by requesting an image transfer from another image saving apparatus when the target image information for which a received instruction is intended is not saved at the image saving apparatus or by requesting that another image saving apparatus execute an instruction which the image saving apparatus has received but cannot execute, in addition to managing images saved therein based upon related information conforming to a universal standard.

In another mode of the invention, the image saving apparatus comprises a decision-making unit that makes a decision as to whether or not an instruction having been received is appropriate. More specifically, the image saving apparatus feeds back the results of the decision to the instruction originator, and if an illegal instruction that would result in a copyright violation, for instance, has been issued, it reports the results of the decision to a third party.

BRIEF DESCRIPTION OF THE DRAWINGS

FIG. 11 is a chart of the structure of the data at the image unit in the large capacity storage unit of the image server;

FIG. 12 is a chart of the structure of the data at the history record unit in the large capacity storage unit of the image server;

FIG. 14 presents examples of history record data indicating a history of searches;

FIG. 18 shows the display layouts of the initial screen and the viewing screen adopted in the third embodiment;

FIG. 19 shows the display layouts of the mail file and the mail generating screen adopted in the third embodiment;

FIG. 20 shows the display layouts of the printing screen and the editing screen adopted in the third embodiment;

FIG. 24 is a chart of the structure of the image data managed by using an integrated management software program in the fifth embodiment;

FIG. 29 presents examples of the display layouts for the operation screens adopted in the image storage apparatus in a sixth embodiment; and FIG. 30 shows how the application program may be provided in a recording medium such as a CD-ROM or through a data signal on the Internet or the like.

BEST MODE FOR CARRYING OUT THE INVENTION

First Embodiment

Figure 1:
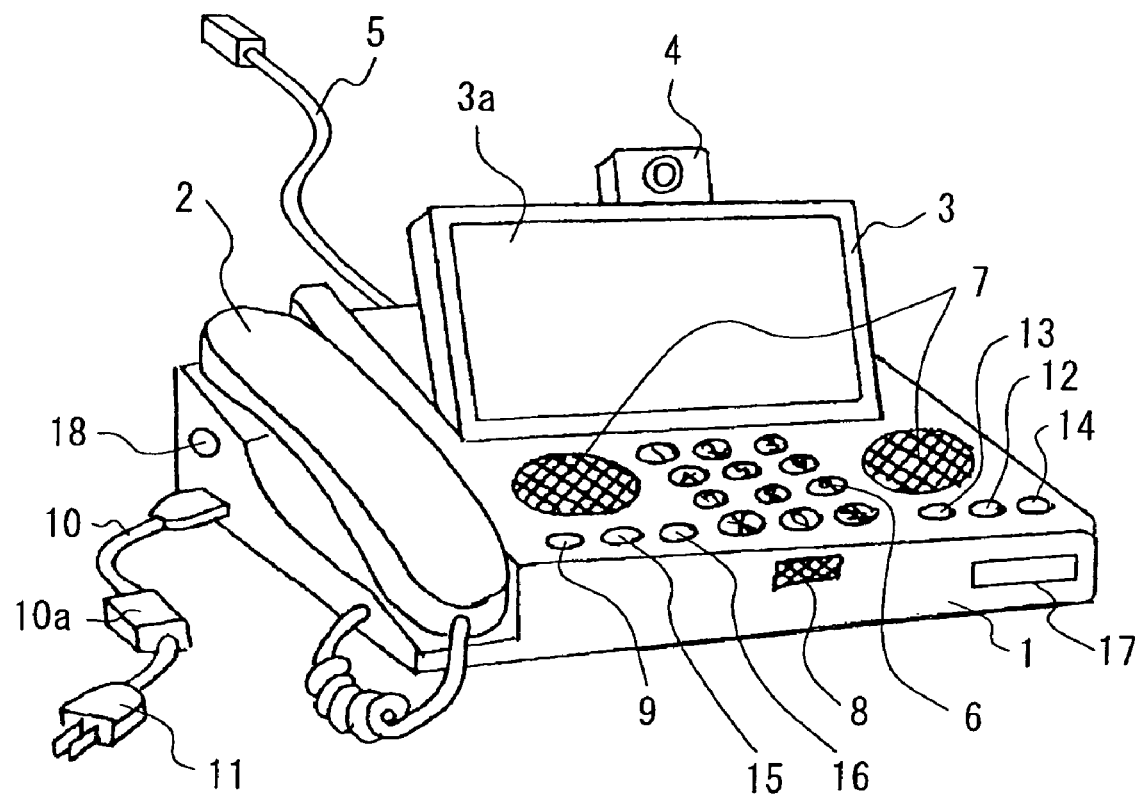
FIG. 1 is a perspective of the image storage apparatus achieved in a first embodiment of the present invention.

FIG. 1 is a perspective of the image storage apparatus achieved in the first embodiment of the present invention. The image storage apparatus according to the present invention, which is utilized primarily to store images photographed with a digital camera, is constituted as a telephone-integrated image storage apparatus in the first embodiment. The image storage apparatus in the first embodiment shown in FIG. 1 assumes a form substantially similar to that of a fax phone with a display screen and includes a receiver 2 connected to a main unit 1 thereof. The receiver 2 may be a so-called cordless receiver. As in the case of a standard telephone, an incoming call is connected as the receiver 2 is lifted to enable a telephone conversation. A large screen display unit 3 having an approximately 5-inch color high-definition liquid crystal display screen 3a can be rotated relative to the main unit 1, so as to be laid down along the main unit 1 or to be set upright, as shown in FIG. 1. A detachable camera unit 4 is mounted at the center of the upper end of the large screen display unit 3. While the camera unit 4 is a compact digital camera, it has a smaller number of pixels compared to a digital camera used to photograph images to be stored in the image storage apparatus and is used primarily for videophone applications, as detailed later.

As in the case of a standard fax phone, the telephone-integrated image storage apparatus shown in FIG. 1 can be used to conduct a telephone conversation or to execute fax communication via a telephone line connected via a modular jack. In addition, various types of services offered through personal computer communication or a portable telephone network can be received via the telephone line. For instance, the user can exchange electronic mail with another party by using a keypad 6 and the large screen display unit 3, receive music content distributed via the line to reproduce the music at stereo speakers 7. In addition, an image photographed with the camera unit 4 can be transmitted or the user can use the telephone-integrated image storage apparatus as a videophone by using the camera unit 4, an internal microphone 8 and the speakers 7. It is to be noted that during a video phone conversation, the dialogue can be conducted via the receiver 2 as well. When conducting a telephone conversation via the microphone 8 and the speakers 7 without lifting the receiver 2, a transmission/reception button 9 is pressed to receive an incoming call or to originate a call. A ring tone is generated through the stereo speakers 7 when an incoming call arrives as well.

A charging cord 10 is connected to a commercial source line through a plug 11 and includes an AC adapter 10a. The main unit 1, which includes an internal battery, can be carried around freely by disconnecting the plug 11 as long as the battery has been charged.

No display is brought up at the large screen display unit 3 and the power consumption of the entire image storage apparatus itself is minimized, in a call arrival wait state. As the receiver 2 is lifted, the transmission/reception button 9 is pressed, one of the keys 6 is pressed or one of a scroll dial 12, a left-shift button 13 and a right-shift button 14 is operated in this state, the image storage apparatus is started up immediately to enter an active state and a display is brought up on the large screen display unit 3. Regardless of how the image storage apparatus is started up, an initial menu screen is displayed at the large screen display unit 3.

The user rotates the scroll dial 12, which can be turned up/down, to scroll the screen up/down, perform a menu selection in up/down directions or to select an icon in up/down directions. In addition, a selection is confirmed and the like by pressing the scroll dial 12. Each time the left-shift button 13 is pressed once, the screen is scrolled to the left by a predetermined extent, the menu is shifted to the left, an icon is shifted to the left or the like. Each time the right-shift button 14 is pressed once, the screen is scrolled to the right by a predetermined extent, a menu is shifted to the right, an icon is shifted to the right or the like.

An end button 15 is operated to reset the image storage apparatus from the activated state to the call arrival wait state. The image storage apparatus may also be reset to the call arrival wait state through a manual operation performed by using the scroll dial 12. In addition, the image storage apparatus exits the active state and reenters the call arrival wait state when the receiver 2 having been used is lowered onto the main unit cradle.

A help button 16 is pressed to receive audio guidance when the user does not know how to operate the image storage apparatus.

While the explanation above focuses on the telephone functions of the image storage apparatus, the telephone-integrated image storage apparatus achieved in the first embodiment in FIG. 1 takes in (reads out) image data photographed with an external digital camera from a memory card as the memory card is taken out of the digital camera and inserted at a card slot 17 and stores the image data thus read out in the main unit 1 of the telephone-integrated image storage apparatus which includes a hard disk. The image data having been taken in may be displayed at the large screen display unit 3, may be printed out by using the print function of the fax machine or may be transmitted to another telephone-integrated image storage apparatus or an external image saving apparatus such as an image server that saves images as a service by using the telephone functions.

It is to be noted that the image data in the digital camera may be directly taken in from the digital camera by connecting the digital camera to a digital terminal 18 through a digital cord instead of by taking the memory card out of the digital camera and inserting the memory card at the card slot as described above.

In addition, if the main unit 1 also functions as a digital camera charging/data intake station, as disclosed in Japanese Laid Open Patent Publication No. 2000-341614, a stage for a digital camera should be provided at the top of the main unit 1 and a charging terminal for the digital camera and the digital terminal 18 should be disposed within the stage unit. In the structure, once the digital camera is set on the stage, the digital terminal 18 and the charging terminal are placed in direct contact with the corresponding terminals of the digital camera to enable an image intake and a charge.

Figure 2:
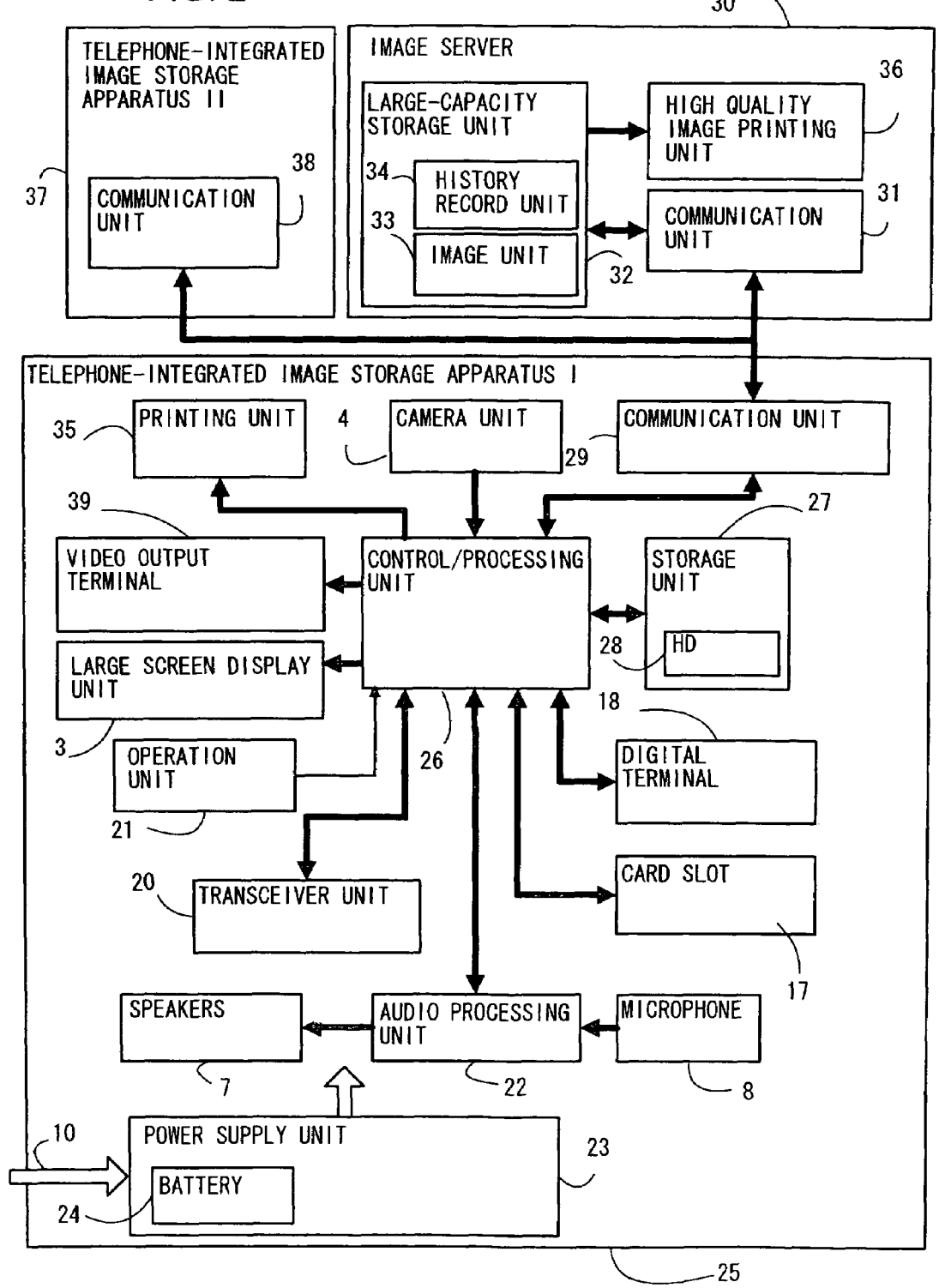
FIG. 2 is a block diagram, showing the overall configuration of the system achieved in the first embodiment.

FIG. 2 is a block diagram showing the overall configuration of the system achieved in the first embodiment. The same reference numerals are assigned to components described in reference to FIG. 1. It is to be noted that a transceiver unit 20 includes the receiver 2 in FIG. 1, whereas an operation unit 21 includes the keypad 6, the transmission/reception button 9, the scroll dial 12, the left-shift button 13, the right-shift button 14, the end button 15, the help button 16 and the like shown in FIG. 1. In addition, an audio processing unit 22 processes signals for the speakers 7 and the microphone 8. A power supply unit 23 connected to the charge cord 10 includes a battery 24 and supplies power to the entire telephone-integrated image storage apparatus 25.

In the telephone-integrated image storage apparatus 25 shown in FIG. 2, thumbnail data appended to all the image data in the memory card inserted at the card slot 17 or all the image data in a digital camera accessed via the digital terminal 18 are first taken in and temporarily saved into memory inside a control/processing unit 26.

These thumbnail data are displayed side-by-side at the large screen display unit 3, and as the user selects one of the thumbnail images through the operation unit 21 and performs an operation to indicate that he wishes to view the image corresponding to the selected thumbnail image, the image data corresponding to the selected thumbnail image are taken in from the memory card or the digital camera. Since the image data (hereafter referred to as "original image data") are in a compressed state, the control/processing unit 26 decompresses the original image data and displays the decompressed original image data over the entire screen at the large screen display unit 3. At the same time, the control/processing unit 26 culls or sub-samples pixels in the decompressed original data to lower the resolution to a level which is high enough for display over the entire screen of the large screen display unit 3 and also creates storage image data by compressing the sub-sampled data. It is to be noted that if a file structure having image data corresponding to a plurality of resolution levels provided for a single image is adopted for the original image data, this operation does not need to be executed. Under such circumstances, image data with a resolution level set high enough for display over the entire screen at the large screen display unit 3 among the plurality of sets of image data prepared in correspondence to the different resolution levels are used as the storage image data.

The storage image data are stored into a hard disk 28 at a storage unit 27. History records of various types of operations to be explained later are also stored into the storage unit 27. The original image data corresponding to the storage image data are transmitted to a communication unit 31 at an image server 30 through a communication unit 29, and the transmitted original image data are then stored into an image unit 33 at a large capacity storage unit 32. Thus, the original image data are taken in in response to an operation at the operation unit 21 performed to display the original image data at the large screen display unit 3, the corresponding storage image data are automatically generated and stored into the storage unit 27, and the original image data are transmitted to the image server 30 where they are stored into the large capacity storage unit 32. It is to be noted that the large capacity storage unit 32 at the image server 30 includes a history record unit 32 to be detailed later in addition to the image unit 33.

In addition, an operation similar to that described above is executed when one of the thumbnail images displayed at the large screen display unit 3 is selected with the operation unit 21 and an operation is performed to indicate that the image corresponding to the selected thumbnail image is to be printed at a printing unit 35. Namely, the control/processing unit 26 takes in the original image data corresponding to the selected thumbnail image from the memory card or the digital camera, decompresses the original image and provides the decompressed original image data to the printing unit 35 which is then engaged in a printing operation. At the same time, the control/processing unit 26 sub-samples pixels in the decompressed original data to lower the resolution to a level which is high enough for display over the entire screen at the large screen display unit 3 and then compresses the sub-sampled data to generate storage image data. The storage image data are stored into the hard disk 28 at the storage unit 27. In addition, the corresponding original image data are transmitted to the communication unit 31 at the image server 30 from the communication unit 29, and the transmitted original image data are stored into the large capacity storage unit 32. Thus, in response to an operation at the operation unit 21 performed to print the original image data at the printing unit 35, the original image data are taken in, the storage image data are automatically stored into the storage unit 27 and the original image data are transmitted to the image server 30 where they are stored at the large capacity storage unit 32.

Furthermore, an operation similar to that described above is executed when one of the thumbnail images displayed at the large screen display unit 3 selected with the operation unit and an operation is performed to request that the image data corresponding to the selected thumbnail image be printed at a high quality image printing unit 36, such as a silver halide printer located at the image server 30. Namely, the control/processing unit 26 takes in the original image data corresponding to the selected thumbnail image from the memory card or the digital camera, decompresses the original image and provides the decompressed original image data to the large screen display unit 3 which then displays the image data to allow the user to confirm the print request target image. At the same time, the control/processing unit 26 sub-samples pixels in the decompressed original data to lower the resolution to a level which is high enough for display over the entire screen at the large screen display unit 3 and then compresses the sub-sampled data to generate storage image data. The storage image data are stored into the hard disk 28 at the storage unit 27. In addition, the corresponding original image data are transmitted to the communication unit 31 at the image server 30 from the communication unit 29, and the transmitted original image data are stored into the large capacity storage unit 32. Subsequently, the original data at the large capacity storage unit 32 are decompressed and the high quality image printing unit 36 prints the decompressed original image data. Thus, in response to an operation at the operation unit 21 performed to engage the high quality image printing unit 36 at the image server 30 to print the original image data, the original image data are taken in, the storage image data are automatically generated and stored into the storage unit 27 and the original image data are transmitted to the image server 30 where they are stored at the large capacity storage unit 32.

A second telephone-integrated image storage apparatus 37 shown in FIG. 2 adopts a structure completely identical to that of the first telephone-integrated image storage apparatus 25 described above. For this reason, FIG. 2 does not include the illustration of its components other than a communication unit 38 in order to avoid an over complex drawing.

The operation described above is also executed when the user selects one of the thumbnail images displayed at the large screen display unit 3 through the operation unit 21 and performs an operation to indicate that the image data corresponding to the selected thumbnail image is to be transmitted to the telephone-integrated image storage apparatus 37. Namely, the control/processing unit 26 takes in the original image data corresponding to the selected thumbnail image from the memory card or the digital camera, decompresses the original image, sub-samples pixels in the decompressed original data to lower the resolution to a level which is high enough for display over the entire screen at the large screen display unit 3 and then compresses the sub-sampled data to generate storage image data. The storage image data are stored into the hard disk 28 at the storage unit 27 and the storage image data are also transmitted to the communication unit 38 of the telephone-integrated image storage apparatus 37 from the communication unit 29. The storage image data having been transmitted are stored into a hard disk at a storage unit at the telephone-integrated image storage apparatus 37. At the same time, the corresponding original image data are transmitted to the communication unit 31 at the image server 30 from the communication unit 29, and the transmitted original image data are stored into the large capacity storage unit 32. Thus, in response to an operation at the operation unit 21 performed to transmit a desired image to another telephone-integrated image storage apparatus the original image data are taken in, the storage image data are automatically generated and stored into the storage unit 27 and the original image data are transmitted to the image server 30 where they are stored at the large capacity storage unit 32. As described above, the storage image data instead of the original image data are exchanged between telephone-integrated image storage apparatuses.

A video output terminal 39 is a digital terminal through which the decompressed original image data are output to be viewed on a digital video monitor and digital signals similar to those output to the large screen display unit 3 are output through the video output terminal 39. The operation described above is also executed when the user performs an operation at the operation unit 21 to select one of the thumbnail images so as to display the corresponding original image at the digital video monitor connected to the video output terminal 39. Namely, the control/processing unit 26 takes in the original image data corresponding to the selected thumbnail image from the memory card or the digital camera, decompresses the original image and outputs the decompressed original image data to the video output terminal 39. At the same time, the control/processing unit 26 sub-samples pixels in the decompressed original data to lower the resolution to a level which is high enough for display over the entire screen at the large screen display unit 3 and then compresses the sub-sampled data to generate storage image data. The storage image data are stored into the hard disk 28 at the storage unit 27, the corresponding original image data are transmitted to the communication unit 31 at the image server 30 from the communication unit 29, and the transmitted original image data are stored into the large capacity storage unit 32. Thus, in response to an operation at the operation unit 21 performed to view a desired image on the digital video monitor connected to the video output terminal 39, the original image data are taken in, the storage image data are automatically generated and stored into the storage unit 27 and the original image data are transmitted to the image server 30 where they are stored at the large capacity storage unit 32.

As explained above, according to the present invention, in response to an operation at the operation unit 21 performed to view, print or transmit an image, the original image data are automatically taken in and also, the corresponding storage image data are stored into the hard disk 28 at the storage unit 27 within the telephone-integrated image storage apparatus 25. As a result, since an image with regard to which an operation is performed with any specific intent is stored into the storage unit 27 without fail, the image can be subsequently searched within the storage unit 27 when the image becomes needed later, and photographed images can be managed in a centralized system. This means that a solid and comprehensive database which does not become incomplete due to negligence can be assured for image data storage.

In addition, since the corresponding original image data are always stored into the image server 30 as backup for images stored at the storage unit 27, the original image data are preserved intact even if the hard disk 27 at the telephone-integrated image storage apparatus 25 on the user side becomes damaged.

It is to be noted that the history records of specific operations executed on specific images through the operation unit 21 are all automatically stored into the history record unit 34 at the large capacity storage unit 32 of the image server 30. This allows the user to access the image server and search for an image stored at the storage unit 27 by using a specific record stored at the history record unit 34 as a search key. In addition, memory contents at the history record unit 34 may be history records of operations involving the telephone-integrated image storage apparatus 37 and, in such a case, the history records can be shared with the telephone-integrated image storage apparatus 37. Accordingly, the history record unit 34 at the image server 30 can be accessed from the telephone-integrated image storage apparatus 37 to use the memory contents at the history record unit 34 as search key when searching for an image in the storage unit at the second telephone-integrated image storage apparatus received from the first telephone-integrated image storage apparatus 25. It is to be noted that once a history record is obtained by accessing the history record unit 34, the history record is saved at the storage unit 27 of the telephone-integrated image storage apparatus 25 or 37, and thus, the history record can be subsequently used as a search key without having to access the image server 30 again, as long as the history record does not need to be updated.

During the image viewing operation, the image printing operation or the image transmission operation described above, the storage image data and the original image data are not automatically stored if the same image has already been automatically stored through another operation. For instance, if the image has been previously viewed and the storage image data and the original image data have been automatically stored into the storage unit 27 and the large capacity storage unit 32 respectively as a result, a printing operation is simply executed by using the expanded or original data in response to a subsequent instruction to print the same image at the printing unit 35, and the storage image data and the original image data are not automatically stored again. However, a history record indicating that an instruction for the image to be printed has been issued is transmitted from the communication unit 29 to the communication unit 31 to be stored into the history record unit 34 at the large capacity storage unit 32.

It is to be noted that while the storage image data with the smaller file size is stored at the storage unit 27 of the telephone-integrated image storage apparatus 25 and the original image data are stored at the image server 30 as backup, the limits to the storage capacity of the storage unit 27 are substantially eliminated without resulting in an increase in the cost of the storage unit 27 through such storage designation. In addition, it lowers the communication cost by minimizing the frequency of communication between the image server 30 and the telephone-integrated image storage apparatus 25 and also by reducing the volume of image data exchanged between the telephone-integrated image storage apparatuses. Namely, while images are most frequently used at the telephone-integrated image storage apparatus 25 for image viewing at the large screen display unit 3, the level of the resolution of the storage image data at the storage unit 27 is high enough for full screen display at the large screen display unit 3 and thus, the quality of images constituted of the storage image data is high enough for viewing. For this reason, it is not necessary to obtain the original image data by accessing the image server 30. When images are exchanged through communication between the telephone integrated storage apparatuses, too, the resolution of the image data received on the receiving side only needs to be high enough for full screen display at the large screen display unit 3 on the receiving side. Thus, the sender side only needs to transmit the storage image data and it is not necessary to obtain the original image data by accessing the image server 30, resulting in a reduction in the communication cost.

It is to be noted that when a high-quality image needs to be printed at the printing unit 35 or when an image is viewed on the digital video monitor connected to the video output terminal 39, the resolution of the storage image data is not high enough, and accordingly, the user accesses the image server 30 to download the original image data at the large capacity storage unit 32 to a buffer memory in the control/processing unit 26 and the original image data thus downloaded are provided to the printing unit 35 or the video output terminal.

An image stored at the storage unit 27 can be edited on the telephone-integrated image storage apparatus 25, as well. When editing an image, the image to be edited is first called up from the storage unit 27 and is displayed at the large screen display unit 3. The user also accesses the image server 30 to specify the original image data saved at the image server 30 that correspond to the storage image data displayed at the large screen display unit 3. Then, the original image data are edited through an operation of the operation unit 21 by utilizing functions of the image server 30 while monitoring the editing results at the large screen display unit 3 in a state of continuous connection with the image server 30 without having to download the original image data to the telephone-integrated image storage apparatus 25. Upon completing the editing operation, the edited image is registered at the image server 30 as updated original image data, and new storage image data are generated in correspondence and stored into the hard disk 28 of the storage unit 27. Thus, while the editing operation appears to be executed at the telephone-integrated image storage apparatus 25 by operating the operation unit 21 while monitoring the image at the large screen display unit 3 in real time, the desired editing results are, in reality, achieved with the software at the image server 30 in response to the editing operation performed at the operation unit 21.

Figure 3:
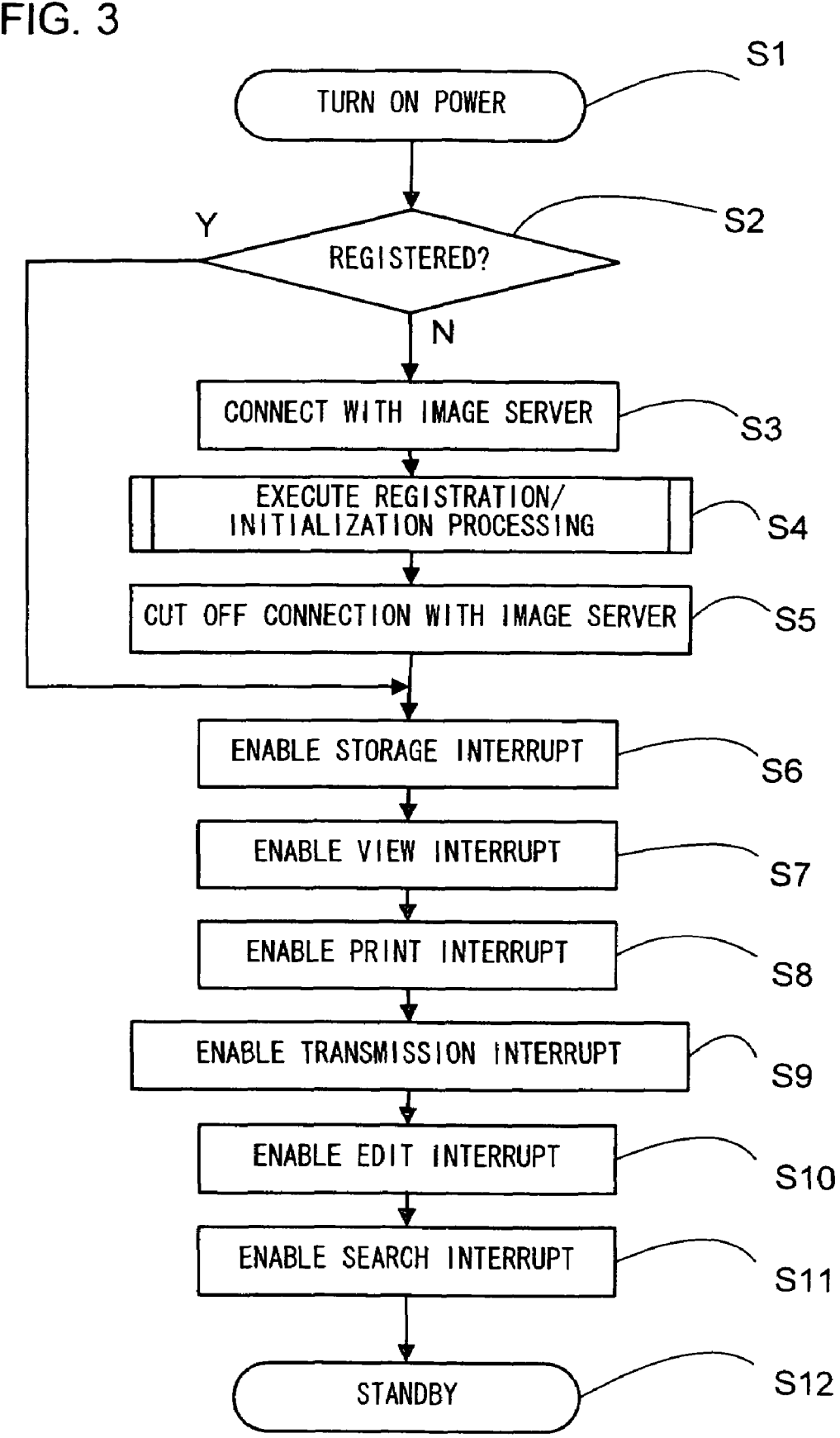
FIG. 3 presents a main flowchart of the processing executed at the image storage apparatus in the first embodiment.

FIG. 3 presents a main flowchart of the processing executed at the telephone-integrated image storage apparatus 25. After the power switch is turned on in step S1, a verification is executed in step S2 to ascertain whether or not the telephone-integrated image storage apparatus 25 is already registered at the server center. If the power switch of a newly purchased telephone-integrated image storage apparatus 25 has been turned on for the first time or if specific registration processing has not been completed yet, the operation proceeds to step S3 to automatically connect the telephone-integrated image storage apparatus 25 to the image server 30. Upon establishing a connection, specific registration/initialization processing is executed in step S4, and upon completing the registration/initialization processing, the connection with the image server 30 is cut off in step S5. The term "registration/initialization" in this context refers to registration of the telephone-integrated image storage apparatus 25 at the image server 30 and initialization of a series of functions which need to be completed to enable the two parties to work in conjunction for image storage and image search. For instance, if the telephone-integrated image storage apparatus 37 has not been registered/initialized when the telephone-integrated image storage apparatus 25 has been registered/initialized, problem-free sharing of image data and history record data by the telephone-integrated image storage apparatuses 25 and 37 via the image server 30 cannot be achieved. For this reason, the processing in step S2 through step S5 is executed to ensure that each new telephone-integrated image storage apparatus being used for the first time is registered/initialized without fail.

If, on the other hand, it is judged in step S2 that the telephone-integrated image storage apparatus 25 is already registered, various types of interrupts are enabled in step S6 through step S11 and then the operation enters a standby state in step S12.

Figure 4:
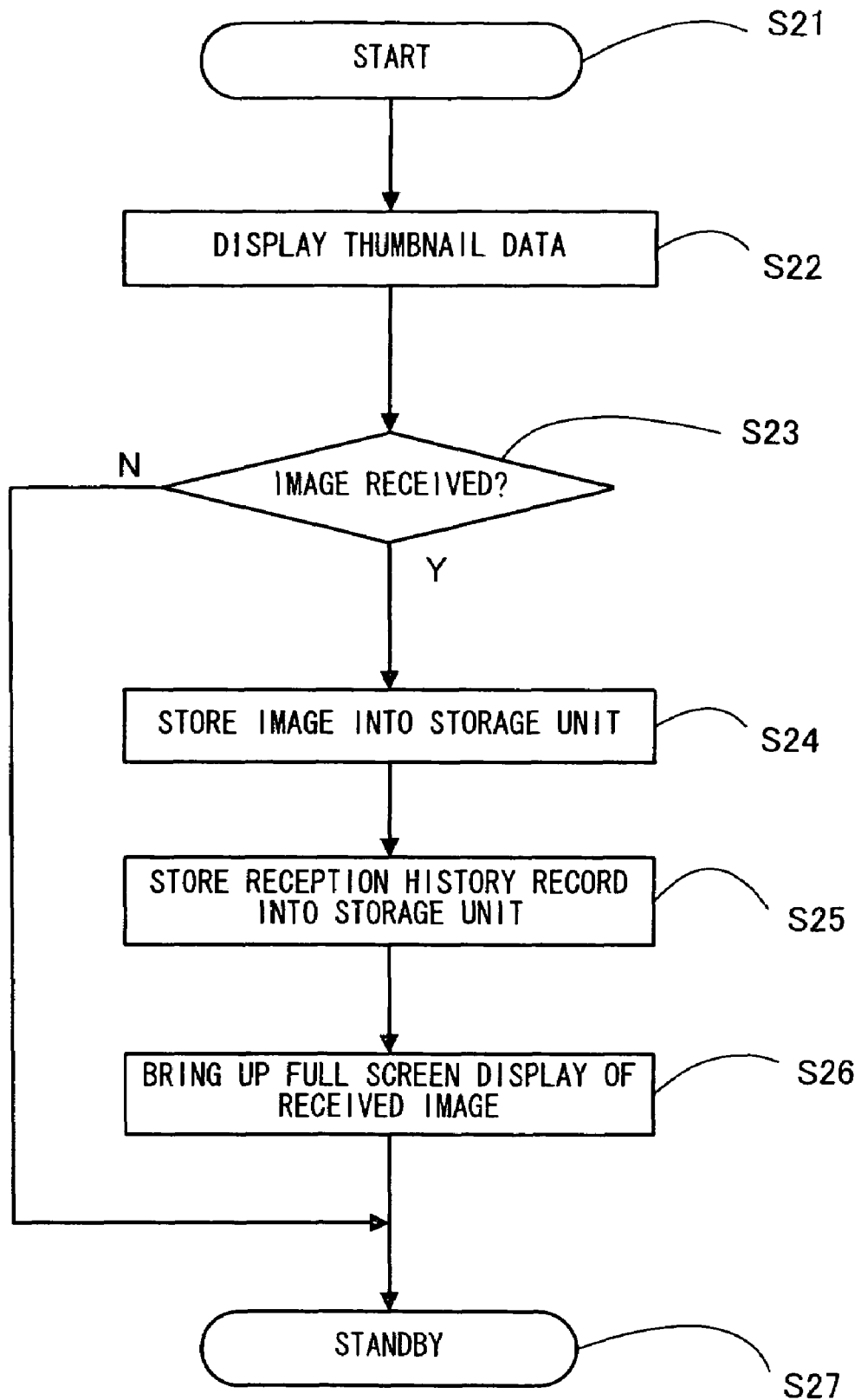
FIG. 4 presents a flowchart of the operation executed when a storage interrupt is applied.

FIG. 4 presents a flowchart of the operation executed when a storage interrupt is applied. The storage interrupt, which is applied when a memory card is inserted at the card slot 17, when the digital terminal 18 is connected to a digital camera or when an image is received from another telephone-integrated image storage apparatus such as the telephone-integrated image storage apparatus 37, starts in step S21.

In step S22, thumbnail data of the image data stored in the memory card or the digital camera are taken into the control/processing unit 26 and are then displayed together at the large screen display unit 3. When the storage interrupt is applied upon receiving storage image data from the telephone-integrated image storage apparatus 37 or the like, on the other hand, the thumbnail data of the received storage image data are displayed at the large screen display unit 3.

In step S23, a verification is executed to ascertain whether or not the storage interrupt has been applied upon receiving storage image data from another telephone-integrated image storage apparatus, and the received storage image data are immediately stored into the storage unit 27 in step S24 if it is decided that the interrupt has been applied upon receiving image data. In addition, a reception history record indicating the time of the reception of the storage image data, the sender of the storage image data and the like is stored into the storage unit 27 in step S25. Upon completing the processing described above, the received storage image data are decompressed and are displayed at the large screen display unit 3 in place of the thumbnail data having been on display up to then in step S26, before the operation proceeds to step S27 to wait in standby for the next operation. It is to be noted that if a plurality of sets of storage image data have been received, one set of storage image data among them is selected by following a predetermined rule and the selected storage image data are displayed over the entire display screen in step S26.

If, on the other hand, it is decided in step S23 that the interrupt has not been applied in response to an image reception, the storage interrupt has been applied by inserting a member card at the card slot 17 or by connecting the digital terminal 18 to a digital camera. In such a case, the operation jumps directly to step S27 to wait in standby for the next operation while sustaining the thumbnail display.

Figure 5:
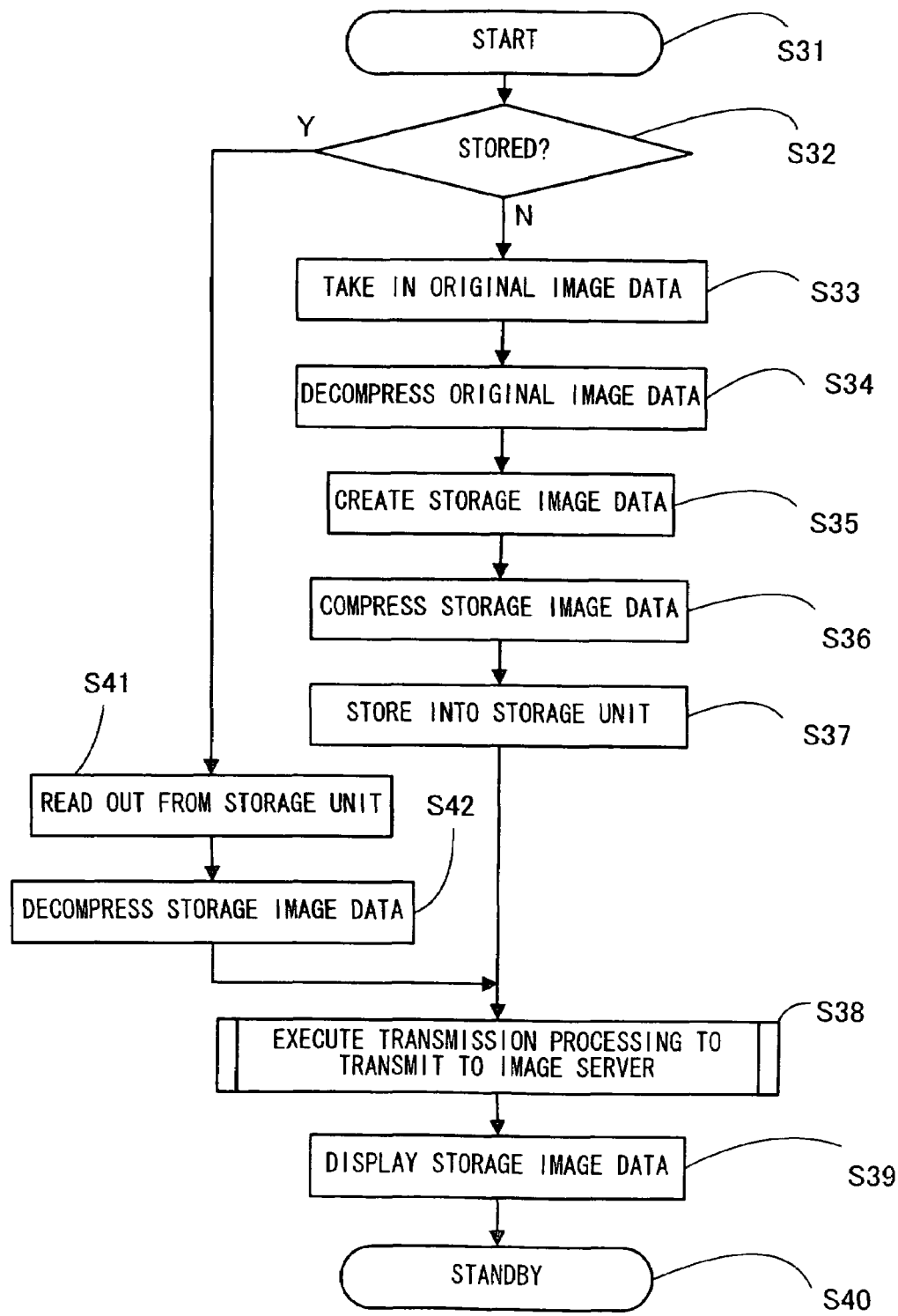
FIG. 5 presents a flowchart of the operation executed when a view interrupt is applied.

FIG. 5 presents a flowchart of the operation executed when a view interrupt is applied. The view interrupt is applied when an operation is performed at the operation unit 21 to select a thumbnail image for viewing, and the flow of the view interrupt starts in step S31. In step S32, a verification is executed to ascertain whether or not the storage image data corresponding to the selected thumbnail image are already stored in the hard disk 28 at the storage unit 27. If the storage image data are not yet stored, the selected thumbnail image corresponds to original image data in the memory card inserted at the card slot 17 or in the digital camera connected to the digital terminal 18, which have not been stored yet. Accordingly, the corresponding original image data are taken in from the memory card or the digital camera into the buffer memory of the control/processing unit 26 in step S33. The original image data taken in in step S33 are in a compressed state. In step S34, the original image data are decompressed and then the decompressed image data undergo sub-sampling processing in step S35, thereby generating storage image data. Then, the storage image data are compressed in step S36, and the compressed storage image data are stored into the hard disk 28 at the storage unit 27 in step S37. In step S37, record data indicating that the storage image data having been stored into the hard disk 28 have been viewed at the telephone-integrated image storage apparatus 25 are also stored into the storage unit 27.

In step S38, the original image data taken in in step S33 are transmitted in the compressed state from the communication unit 29 to the communication unit 31 at the image server 30, and a sequence of processing is started to store the original image data into the large capacity storage unit 32. In the transmission processing executed in step S38, the history record data indicating that the transmitted image data have been viewed at the telephone-integrated image storage apparatus 25 are also transmitted and are stored into the history record unit 34.

Then, in step S39, the storage image data generated in step S35 are displayed at the large screen display unit 3. It is to be noted that in the sequence described above, the transmission processing for transmitting the data to the image server starts in step S38 and that the transmission processing itself is continuously executed concurrently during the processing executed in step S39 and subsequent steps. This means that the operation does not proceed to step S39 upon completing the processing in step S38 and that the operation shifts into step S39 to display the storage image data at the large screen display unit 3 as soon as the processing in step S38 starts.

If, on the other hand, it is decided in step S32 that the storage image data corresponding to the selected thumbnail image have already been stored at the hard disk 28 of the storage unit 27, the storage image data are read out from the storage unit 27 into the control/processing unit 26 in step S41. At this time, a record indicating that the storage image data have been read out for purposes of viewing is stored into the storage unit 27. In step S42, the storage image data have been read out are decompressed before the operation proceeds to step S38. Under these circumstances, only history record data indicating that the storage image data read out from the storage unit 27 have been viewed at the telephone-integrated image storage apparatus 25 alone are transmitted to the image server 30 in the transmission processing executed in step S38 and the history record data transmitted to the image server 30 are then stored into the history record unit 34. Upon completing the processing described above, the storage image data decompressed in step S42 are displayed at the large screen display unit 3 in step S39.

Figure 6:
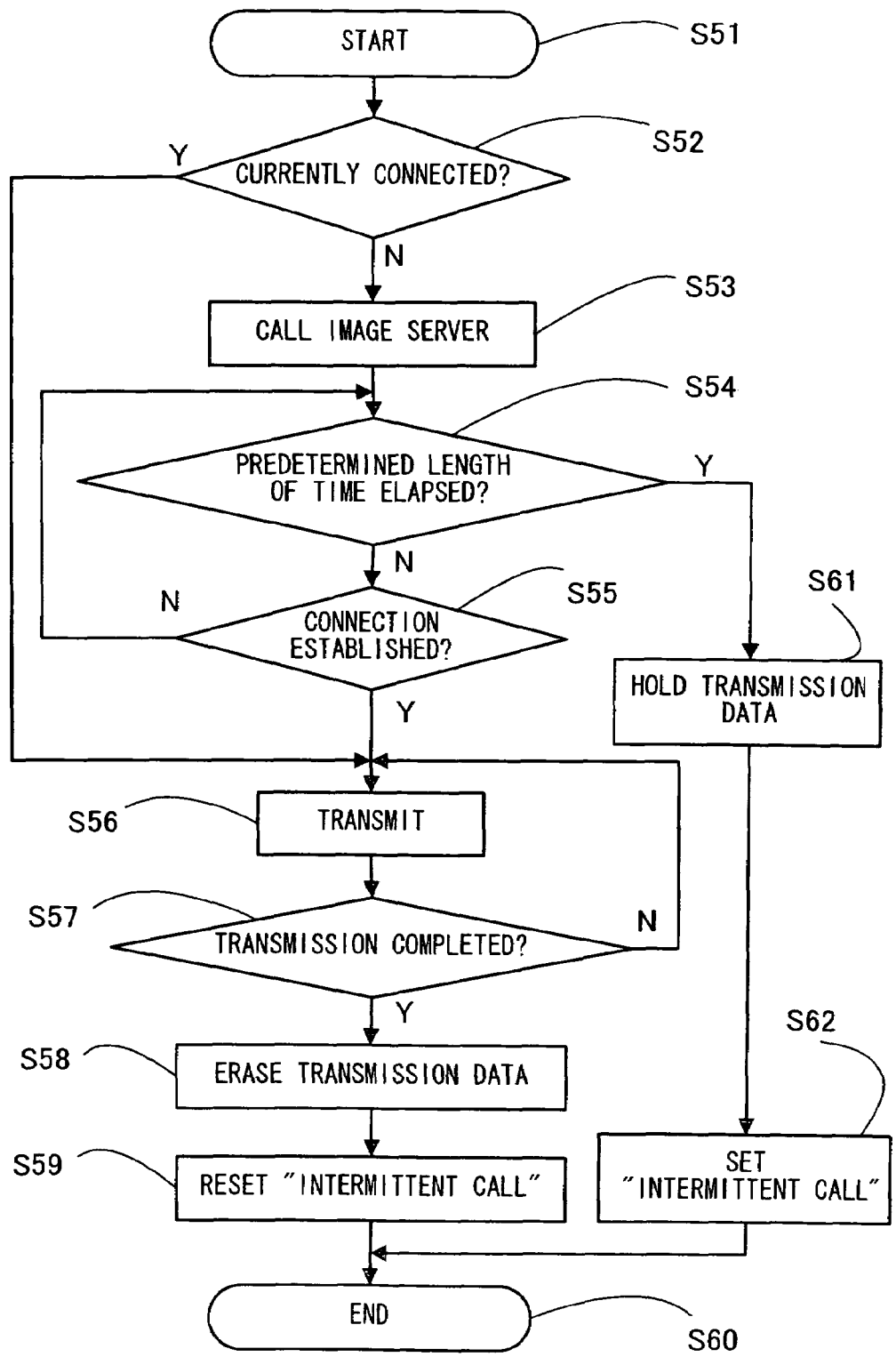
FIG. 6 presents a flowchart of the data transmission processing executed to transmit data to an image server.

FIG. 6 presents a flowchart of the data transmission processing executed to transmit data to the image server, showing in detail the contents of the processing executed in step S38 in FIG. 5 over a predetermined time interval when the "intermittent call" setting to be explained later is selected. After the processing flow starts in step S51, a verification is executed in step S52 to ascertain whether or not the telephone-integrated image storage apparatus 25 is currently connected with the image server 30. If it is not connected with the image server 30, a call is originated in step S53 to establish a telephone connection with the image server 30.

In step S54, a verification is executed to ascertain whether or not a predetermined length of time has elapsed after initiating the call, and if it is decided that the predetermined length of time has not yet elapsed, a verification is executed in step S55 to ascertain whether or not a telephone connection has been established. If it is decided about a telephone connection has not been established, the operation returns to step S54 and subsequently, the processing in step S54 and the processing in step S55 are repeatedly executed until the predetermined length of time elapses.

If it is decided in step S55 that a telephone connection has been established, a transmission of transmission data is executed in step S56. The transmission data may be the original image data having been taken in from the memory card or the digital camera and held at the control/processing unit 26 and the operation history record data or they may only include the operation history record data alone depending upon the situation. In step S57, a verification is executed to ascertain whether or not the transmission of the transmission data has been completed. If it is decided that the transmission has not been completed yet, the operation returns to step S56 and subsequently, the processing in step S56 and the processing in step S57 are repeatedly executed until the transmission is completed. Upon completing the transmission, the operation proceeds to step S38 to erase the transmission data from the control/processing unit 26. In addition, the "intermittent call" is reset in step S59 before the processing ends in step S60. It is to be noted that the "intermittent call" is reset in step S59 only when the "intermittent call" has been set, and if the "intermittent call" has not been set, the operation proceeds to step S60 without effecting any change in step S59.

If it is decided in step S52 that the telephone-integrated image storage apparatus 25 and the image server 30 are connected to each other, the operation skips to step S56 to immediately start the transmission of the transmission data.

In addition, if it is decided in step S54 that the predetermined length of time has already elapsed without a successful telephone connection having been established, the operation proceeds to step S61 to hold the transmission data at the control/processing unit 26. Then, the "intermittent call" is set in step S62 before the processing ends in step S60. It is to be noted that if it is confirmed that an instruction to hold the same transmission data has already been issued, the status remains unchanged in step S61. Likewise, if the "intermittent call" has already been set, the status remains unchanged in step S62. Such a situation occurs when the operation proceeds from step S54 to step S61 after failing to establish a telephone connection again following a previous connection failure.

When the "intermittent call" is set, the telephone-integrated image storage apparatus 25 automatically executes the flow starting in step S51 over predetermined time intervals. Thus, the processing in step S51 through step S55 and the processing in step S61 through step S60 are repeatedly executed over the predetermined time intervals until the operation proceeds from step S55 to step S56 and subsequent steps to transmit the transmission data, erase the transmission data and reset the "intermittent call". During this process, if there are any untransmitted original image data, they are held together with the corresponding storage image data within the telephone-integrated image storage apparatus 25 in step S61. Such data are first held in the buffer memory at the control/processing unit 26 and then are backed up at the storage unit 27 over predetermined time intervals. It is to be noted that if an instruction to erase the original image data is issued in step S58 in this situation, the original image data in the buffer memory at the control/processing unit 26 and the backup original image data at the storage unit 27 are both erased.

The transmission processing executed to transmit image data to the image server in the flowchart presented in FIG. 6 described above is also adopted in the flow of a print interrupt and the flow of a transmission interrupt to be explained below.

Figure 7:
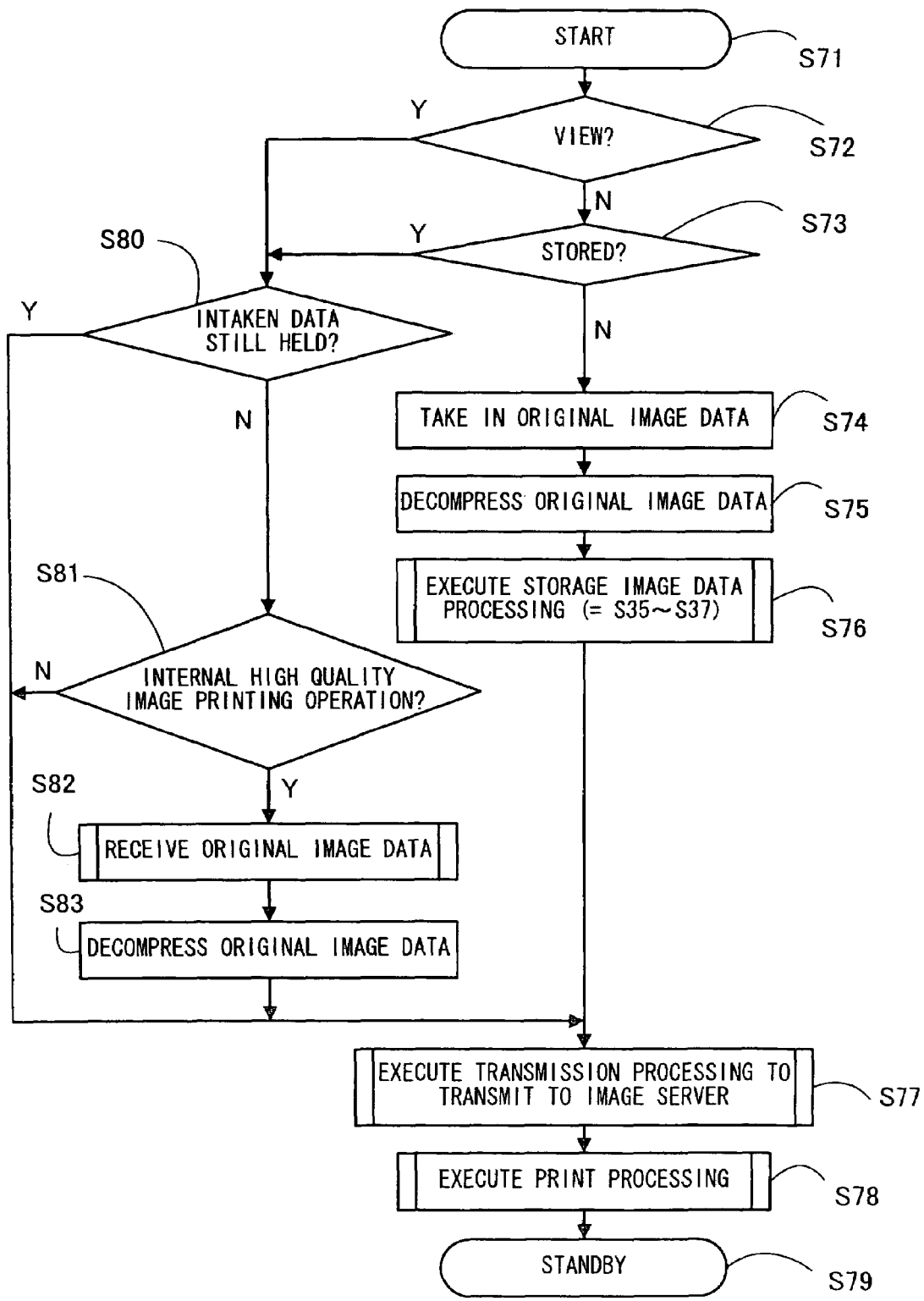
FIG. 7 presents a flowchart of the operation executed when a print interrupt is applied.

FIG. 7 presents a flowchart of the operation executed when a print interrupt is applied. The print interrupt is applied in response to a print instruction issued through the operation unit 21, and the print interrupt flow starts in step S71. It is to be noted that a setting for outside printing to be executed at the high quality image printing unit 36 of the image server 30 by using the original image data or a setting for internal printing to be executed at the printing unit 35 of the telephone-integrated image storage apparatus 25, and a setting for internal high quality image printing to be executed by using the original image data during an internal printing operation or a setting for quick image printing to be executed by using the storage image data during an internal printing operation, should be selected in advance through the operation unit 21 when issuing a print instruction.

In step S72, a verification is executed to ascertain whether or not the print instruction has been issued with an image on full screen display at the large screen display unit 3. If a negative decision is made, the print instruction has been issued by selecting one of the thumbnail images displayed at the large screen display unit 3. In such a case, the operation proceeds to step S73 to execute a verification to ascertain whether or not the storage image data corresponding to the selected thumbnail image have already been stored at the storage unit 27. If the corresponding storage image data are not stored at the storage unit, the selected thumbnail image corresponds to unstored original image data present in the memory card inserted at the card slot 17 or in the digital camera connected to the digital terminal 18, and accordingly, the original image data are taken into the buffer memory at the control/processing unit 26 from the memory card or the digital camera in step S74. In step S75, the original image data are decompressed. Details of the storage image data processing executed in step S76 are similar to those of the sub-sampling processing, the compression processing and the storage processing respectively executed in step S35, step S36 and step S37 in FIG. 5.

In step S77, the original image data taken in in step S74 and history record data indicating that a print instruction has been issued with regard to the original image data are transmitted to the image server. The transmission processing is executed as detailed in FIG. 6. It is to be noted that since the print instruction can be issued by selecting one of outside printing, internal high quality image printing and internal quick image printing, the history record data transmitted to the image server also indicate the selected setting for printing. In addition, the history record data are also stored into the storage unit 27 during the storage image data processing executed in step S76.

If the internal high quality image print setting has been selected, print processing executed by the printing unit 35 starts in step S78 by using the original image data decompressed in step S75. If, on the other hand, the quick image print setting has been selected, the printing unit 35 starts executing the print processing by using the storage image data. If the outside print setting has been selected, the high quality image printing unit 36 at the image server 30 starts executing the print processing. In any case, once the print processing starts, the operation proceeds to step S79 to enter a standby state. It is to be noted that in the sequence described above, the transmission processing for transmitting the data to the image server starts in step S77 and that the transmission processing itself is continuously executed concurrently during the processing executed in step S78 and subsequent steps, under normal circumstances. However, if the operation proceeds to step S77 via step S74 from step S73 as described above, the operation does not proceed to step S78 until the original image data are transmitted to the image server 30 and are completely stored into the image unit 33.

If, on the other hand, it is decided in step S72 that the print instruction has been issued with an image on full screen display at the large screen display unit 3, the print instruction has obviously been a issued following processing executed in response to a view interrupt. Namely, the processing shown in FIG. 5 has already been executed to direct the transmission of the corresponding original image data to the image server and the storage image data processing. Accordingly, the operation shifts to step S80 to execute a verification to ascertain whether or not the original image data having been taken in are still held in the telephone-integrated image storage apparatus 25. If they are not held in the telephone-integrated image storage apparatus 25, it means that the transmission processing executed to transmit the original image data to the image server 30 has been completed and thus the original image data have been erased in the telephone-integrated image storage apparatus 25. In this case, the operation proceeds to step S81 to execute a verification as to whether or not the internal high quality image print setting has been selected. Then, if it is decided that the internal high quality image print setting has been selected, a call is originated to connect with the image server 30 and receive the original image data from the image server 30 in step S82. The received original image data are decompressed in step S83. In this case, only history record data indicating a print instruction has been issued with regard to the received original image data alone are transmitted to the image server 30 in step S77. It is to be noted that the record indicating that a print instruction has been issued may be stored into the history record unit 34 in step S82 while communication with the image server 30 is ongoing. If the history record is stored in step S82, the history record data transmission processing in step S77 does not need to be executed. In step S78, the printing unit 35 executes print processing by using the original image decompressed in step S82.

If, on the other hand, it is decided in step 87 that the internal high quality image print setting has not been selected, either the outside print setting or the quick image print setting has been selected. At either of these settings, it is not necessary to direct the original image data to be transmitted from the image server 30 to the telephone-integrated image storage apparatus 25 and accordingly, the operation proceeds directly to step S77 to execute the print processing either at the high quality image printing unit 36 or the printing unit 35 in conformance to the specific instruction.

If it is decided in step S72 that the print instruction has been issued while the user was viewing an image and the operation accordingly proceeds to step S80 to decide that the intaken data are held in the telephone-integrated image storage apparatus 25, it means that although the storage image data processing has been completed, the original image data have not been transmitted to the image server due to a failure to establish a telephone connection or the like. In this situation, if the internal high quality image print setting has been selected, the original image data having been decompressed in the telephone-integrated image storage apparatus 25 can be utilized and, accordingly, the operation proceeds directly to step S77. Then, transmission processing to transmit history record data indicating that the print instruction has been issued with regard to the image being viewed is attempted as detailed in FIG. 6. If it is decided in step S55 that a successful connection with the image server 30 has been established, the original image data having been held as the transmission data and the viewing history record are transmitted together with the printing history record as transmission data in step S56. If, on the other hand, the outside print setting has been selected, print processing starts in step S78 upon completion of the transmission of the original image data to the image server 30.

The operation also proceeds to step S80 if it is decided in step S73 that the storage image data are already stored at the storage unit 27. Under these circumstances, the intaken data are hardly ever held at the storage unit 27 and it is usually necessary to execute the processing in steps S82 and S83 if it is decided in step S81 that the internal high quality image print setting has been selected. However, a verification is executed in step S80 to double check so as to allow the history record data alone to be transmitted in step S77 when it is not necessary to receive the original image data from the image server 30.

Figure 8:
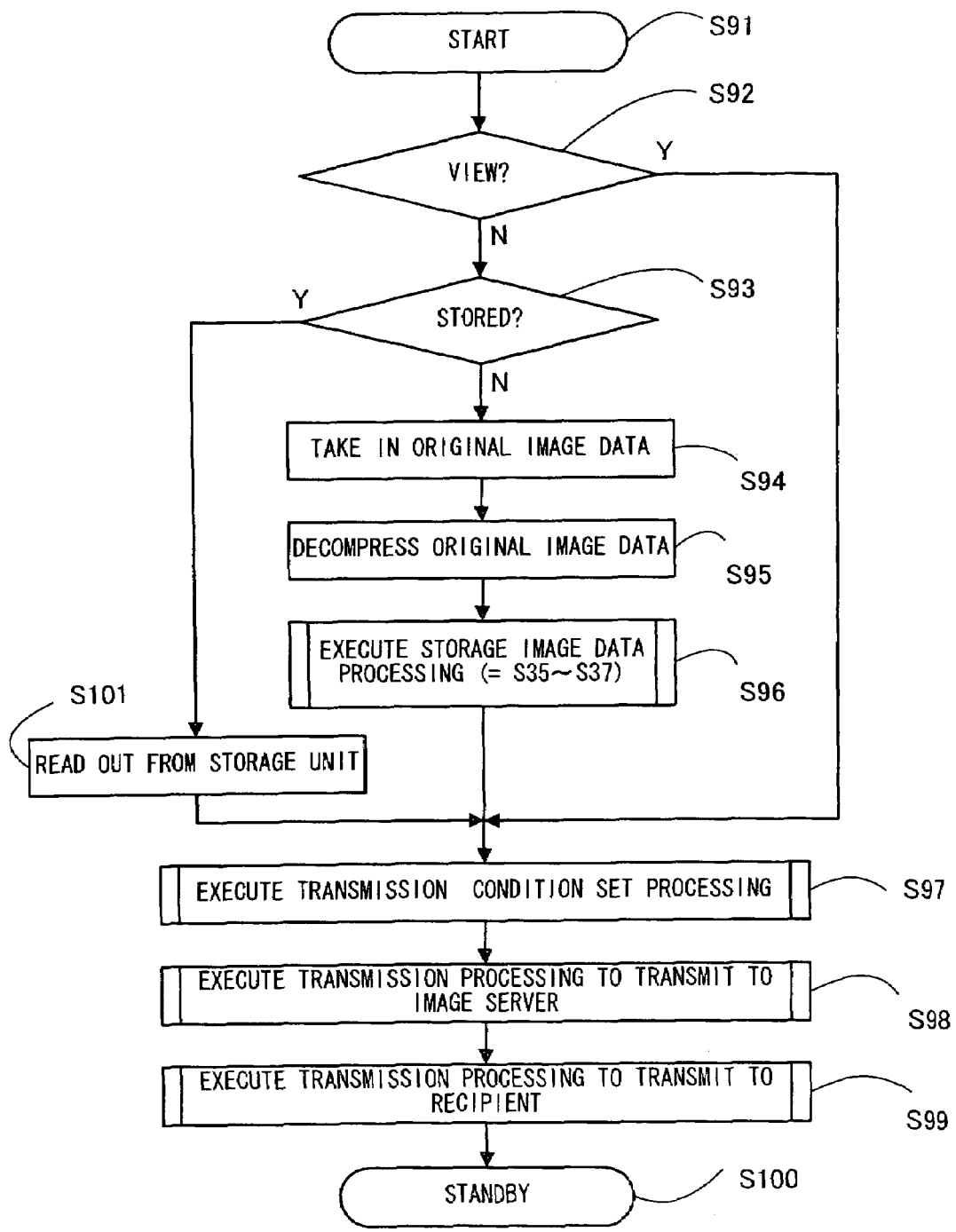
FIG. 8 presents a flowchart of the operation executed when a transmission interrupt is applied.

FIG. 8 presents a flowchart of the operation executed when a transmission interrupt is applied. The transmission interrupt is applied in response to a transmit instruction issued to transmit data to the telephone-integrated image storage apparatus 37 or the like through the operation unit 21 and the transmission interrupt flow starts in step S91. In step S92, a verification is executed to ascertain whether or not the transmit instruction has been issued while an image is on full screen display at the large screen display unit 3. If a negative decision is made, it means that the transmit instruction has been issued by selecting one of the thumbnail images displayed at the large screen display unit 3. In such a case, the operation proceeds to step S93 to execute a verification to ascertain whether or not the storage image data corresponding to the selected thumbnail image are already stored at the storage unit 27. If the corresponding storage image data are not already stored at the storage unit, the selected thumbnail image corresponds to unstored original image data present in the memory card inserted at the card slot 17 or in the digital camera connected to the digital terminal 18, and accordingly, the original image data are taken into the buffer memory at the control/processing unit 26 from the memory card or the digital camera in step S94. In step S95, the original image data are decompressed. Details of the storage image data processing executed in step S96 are similar to those of the sub-sampling processing, the compression processing and the storage processing respectively executed in step S35, step S36 and step S37 in FIG. 5.

In step S97, processing is executed to set transmission conditions as restrictions to be imposed for the telephone-integrated image storage apparatus 37 or the like, i.e., the recipient. The transmission conditions include those set with regard to rights to be granted to the telephone-integrated image storage apparatus 37 receiving the storage image data to access, download, print, edit, and transfer the corresponding original image data at the image server 30. These conditions are set through the operation unit 21 in advance prior to executing the transmit instruction. In step S97, processing is executed to generate transmission condition data to be used to ensure that these conditions are accurately communicated to the telephone-integrated image storage apparatus 37 and the image server 30.

In step S98, processing is executed to transmit the original image data taken in in step S94 and history record data indicating the transmit instruction issued with regard to the image data. This processing is executed as detailed in FIG. 6. It is to be noted that the history record data contain data specifying the recipient, e.g., the telephone-integrated image storage apparatus 37, and the transmission condition data. It is also to be noted that the history record data are stored into the storage unit 27 during the storage image data processing executed in step S96.

Immediately after completing the transmission processing executed to transmit the data to the image server 30, processing for transmitting the storage image data generated through the sub-sampling processing (equivalent to step S35 in FIG. 5) which is part of the storage image data processing executed in step S96 and the transmission condition data to the recipient, e.g., the telephone-integrated image storage apparatus 37 is started in step S99, and then the operation enters a standby state in step S100. This transmission processing is basically identical to the transmission processing executed to transmit the data to the image server detailed in FIG. 6, except that the processing is executed to transmit the data to a different recipient.

It is to be noted that the operation shifts from step S98 to step S99 when a successful connection with the image server 30 cannot be established in step S98 and the "intermittent call" is set in step S62 as well as when the transmission processing executed to transmit the data to the image server 30 in step S98 is completed. Namely, the processing in step S99 may be executed by making the most of the wait period elapsing until a call to the image server 30 is originated next when the "intermittent call" is set.

If, on the other hand, it is decided in step S92 that the transmit instruction has been issued while an image is on full screen display at the large screen display unit 3, the transmit instruction has obviously been issued following processing executed in response to a view interrupt. Namely, the processing shown in FIG. 5 has already been executed to direct the transmission of the corresponding original image data to the image server and the storage image data processing. In addition, the storage image data compressed in step S36 in FIG. 5 are held at the control/processing unit 26. Accordingly, the operation skips directly to step S97. In step S98, history record data with regard to the transmission including the transmission conditions alone are transmitted to the image server 30. Whenever a new history record is transmitted to the image server 30, the history record data with the same contents are also stored into the storage unit 27. This principle applies at all times in the implementation of the invention. Upon completing the processing in step S98, the compressed storage image data are transmitted to the telephone-integrated image storage apparatus 37 or the like together with the transmission conditions in step S99.

If it is decided in step S92 that the user was not viewing an image on full screen display at the time of the transmit instruction and also it is decided in step S93 that the storage image data corresponding to the selected thumbnail image are already stored at the storage unit 27, the storage data are read out from the storage unit 27 in step S101 before the operation proceeds to step S97. In addition, a history record indicating that an instruction to transmit the storage data having been read out has been issued is stored together with data indicating the recipient and the transmission conditions into the storage unit 27. In step S98, identical history record data with regard to the transmit instruction are also transmitted to the image server 30. In step S99, the storage image data read out in step S101 are transmitted to the telephone-integrated image storage apparatus 37 or the like while in the compressed state, together with the transmission conditions.

Figure 9:
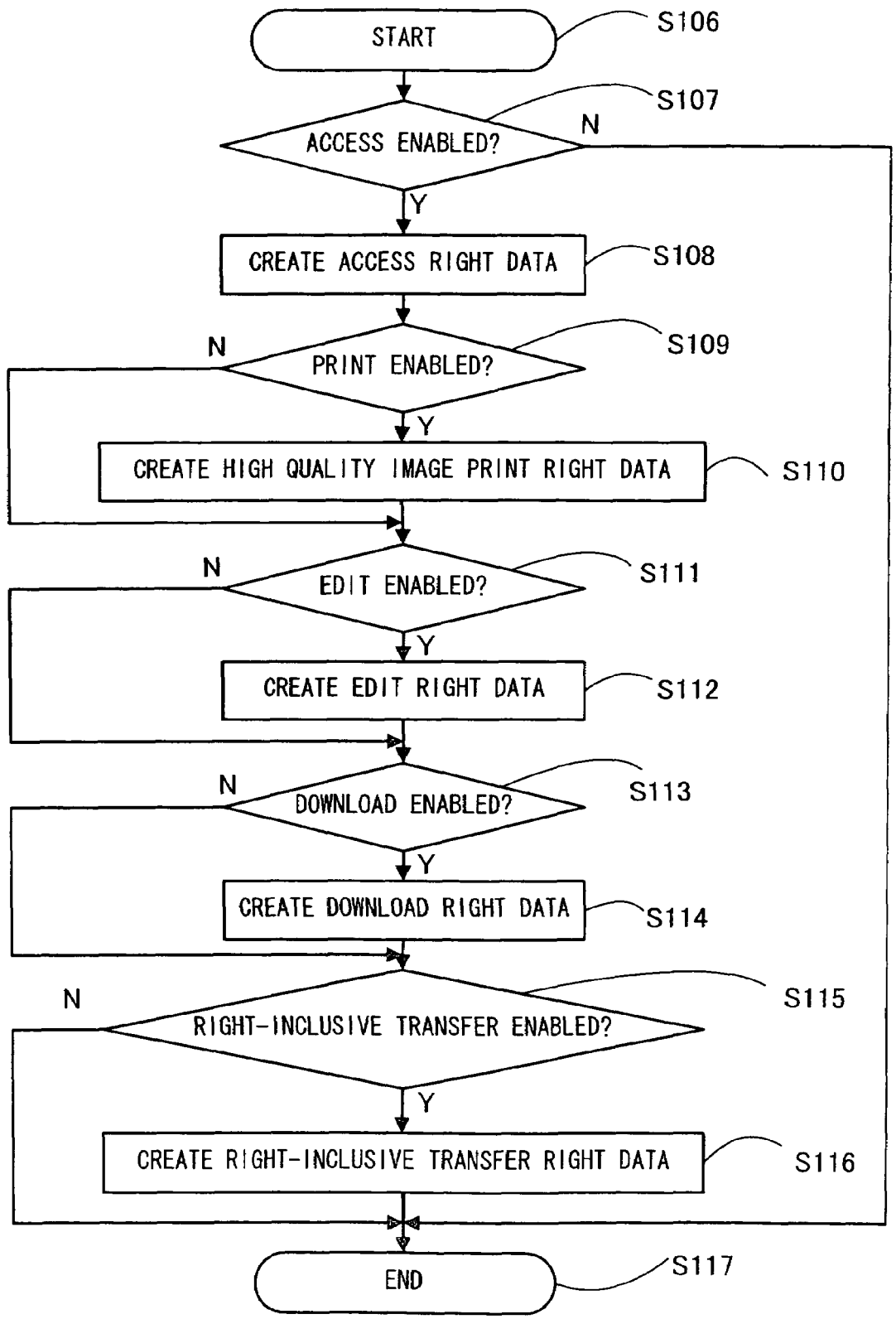
FIG. 9 presents a detailed flowchart of the transmission condition setting operation.

FIG. 9 presents a detailed flowchart of the transmission condition setting operation executed in step S97 in FIG. 8, during which transmission data indicating utilization conditions which are to be transmitted to the image server 30 and the recipient telephone-integrated image storage apparatus are generated based upon the settings selected through the operation unit 21 prior to the transmission. The following is an explanation of the flowchart presented in FIG. 9, given in reference to an example in which the storage image data are transmitted from the telephone-integrated image storage apparatus 25 to the telephone-integrated image storage apparatus 37.

After the processing flow starts in step S106 in FIG. 9, a verification is executed in step S107 to ascertain whether or not a setting that allows the telephone-integrated image storage apparatus 37 to access the corresponding original image data at the image server 30 based upon the received storage image data has been selected. If the access enabling setting has been selected, access right data are generated in step S108. These data are transmitted as transmission data to the image server 30 and the telephone-integrated image storage apparatus 37, and are also stored into the history record unit 34 at the image server 30. Without these access data, the telephone-integrated image storage apparatus 37 calling the image server 30, is denied access to the corresponding original data.

If the telephone-integrated image storage apparatus 37 has the access right, the operation proceeds to step S109 to execute a verification to ascertain whether or not a setting which allows the telephone-integrated image storage apparatus 37 to request that the corresponding original image data at the image server 30 be printed based upon the received storage image data has been selected. If the print request enabling setting has been selected, high quality image print right data are generated in step S110 before the operation proceeds to step S111. The high quality image print right thus generated are transmitted as transmission data to the image server 30 and the telephone-integrated image storage apparatus 37 and are also stored into the history record unit 34 at the image server 30. If it is decided in step S109 that the print request enabling setting has not been selected, the operation proceeds directly to step S111. It is to be noted that if no high quality image print right data are generated, the telephone-integrated image storage apparatus 37 is only allowed to perform a quick image printing operation on its own by using the received storage image data.

In step S111, a verification is executed to ascertain whether or not a setting which allows the telephone-integrated image storage apparatus 37 to access the corresponding original image data at the image server 30 and edit the original image data through a function of the image server based upon the received storage image data has been selected. If the edit enabling setting has been selected, edit right data are generated in step S112 before the operation proceeds to step S113. The edit right data thus generated are transmitted as transmission data to the image server 30 and the telephone-integrated image storage apparatus 37 and are also stored into the history record unit 34 at the image server 30. These edit right data allow the telephone-integrated image storage apparatus 37 to store the edited image as new original image data into the image unit 33 at the image server 30. If it is decided in step S111 that the edit enabling setting has not been selected, the operation proceeds directly to step S113. It is to be noted that if no edit right data have been generated, the original image data corresponding to the received storage image data cannot be altered from the telephone-integrated image storage apparatus 37.

In step S113, a verification is executed to ascertain whether or not a setting which allows the telephone-integrated image storage apparatus 37 to access and download the corresponding original image data at the image server 30 based upon the received storage image data has been selected. If the download enabling setting has been selected, down load right data are generated in step S114 before the operation proceeds to step S115. The download right data thus generated are transmitted as transmission data to the image server 30 and the telephone-integrated image storage apparatus 37 and are also stored into the history record unit 34 at the image server 30. These download right data allow the telephone-integrated image storage apparatus 37 to obtain the original image data themselves to subsequently utilize them freely. If it is decided in step S113 that the download enabling setting has not been selected, the operation proceeds directly to step S115. It is to be noted that if no download right data have been generated, the telephone-integrated image storage apparatus 37 cannot obtain the original image data.

In step S115, a verification is executed to ascertain whether or not a setting that allows the telephone-integrated image storage apparatus 37 to transfer the received storage image data together with any of the various rights set for the telephone-integrated image storage apparatus 37 to another telephone integrated storage apparatus has been selected. It is to be noted that this setting can be individually selected for each of the various rights. If a setting which allows at least one of the rights explained above to be transferred has been selected, rights inclusive transfer right data are generated in correspondence to the individual rights in step S116 before the processing flow ends in step S117. It is to be noted that the right-inclusive transfer right data thus generated are transmitted as transmission data to the image server 30 and the telephone-integrated image storage apparatus 37 and are also stored into the history record unit 34 at the image server 30. If the received storage image data are transferred together with the right-inclusive transfer rights data, the transfer recipient telephone-integrated image storage apparatus, too, is allowed to access the image server to utilize the original image data as achievable through the rights having been set, as is the telephone-integrated image storage apparatus 37. If, on the other hand, it is decided in step S115 that a setting which allows a right-inclusive transfer has not been selected with regard to any of the rights, the operation proceeds directly to step S117 to end the processing flow. It is to be noted that if no right-inclusive transfer right data have been generated, the rights set at the telephone-integrated image storage apparatus 25 remain exclusive to the telephone-integrated image storage apparatus 37.

While authorizing a recipient to exercise various rights by selecting specific settings as described above is effective when images are exchanged between individual users who know each other well, it is particularly advantageous in an application in which digital images are offered to paying customers as products. By offering various rights in different combinations and in a wide variety of business models, smooth distribution of digital images can be achieved.

Figure 10:
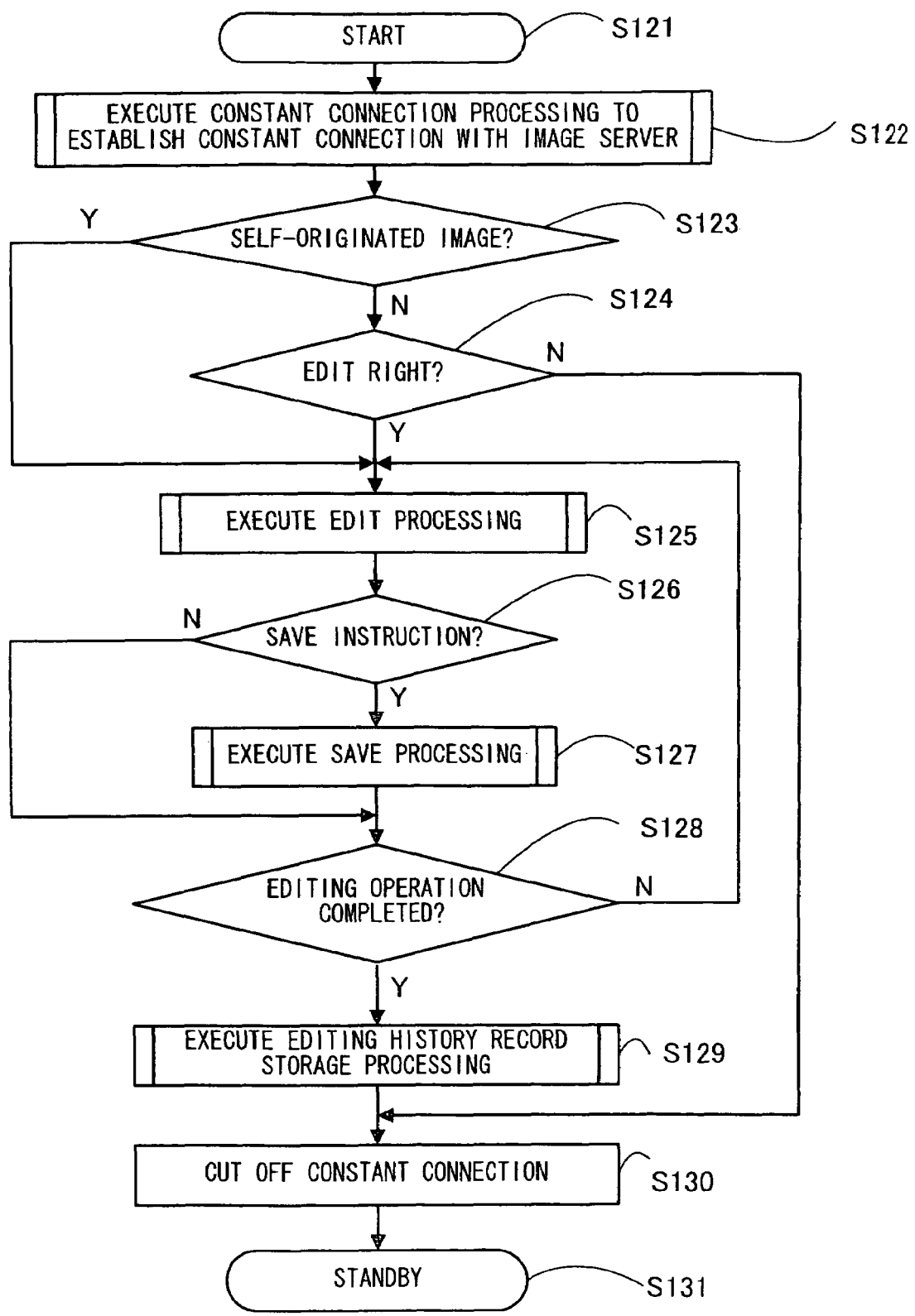
FIG. 10 presents a flowchart of the operation executed when an edit interrupt is applied.

FIG. 10 presents a flowchart of the operation executed when an edit interrupt is applied. The edit interrupt is applied in response to an instruction issued through the operation unit 21 to indicate that the image currently being viewed is to be edited and the processing flow starts in step S121. Since the edit operation is executed by using functions of the image server 30, processing is executed in step S122 to establish a continuous connection between the telephone-integrated image storage apparatus 25 and the image server 30. Details of this processing are similar to those of the processing executed in steps S51 through S55 in FIG. 6. Once a connection with the image server is established, a verification is executed in step S123 to ascertain whether or not the image to be edited is a self-originated image provided by the telephone-integrated image storage apparatus 25 itself to the image server 30. If it is decided that the image to undergo the edit processing is not a self originated image, original image data corresponding to storage image data received from another telephone-integrated image storage apparatus are to undergo the edit processing, and accordingly, a verification is executed in step S124 to ascertain whether or not the setting that confers the edit right on the telephone-integrated image storage apparatus 25 has been selected. If it is decided that the edit right has been granted, the operation proceeds to step S125. If it is decided in step S123 that a self generated image is to undergo the edit processing, the telephone-integrated image storage apparatus 25 naturally has the edit right and accordingly, the operation proceeds directly to step S125.

In step S125, with the telephone-integrated image storage apparatus 25 and the image server 30 in state of continuous connection, a desired editing effect is rendered onto the original image data at the image server 30 through the edit functions of the image server 30 by operating the operation unit 21 while monitoring the image displayed at the large screen display unit 3. In step S126, a verification is executed to ascertain whether or not an instruction to save the editing results has been issued through the operation unit 21. If the save instruction has been issued, the operation proceeds to execute save processing in step S127. During the save processing, the editing results are stored as new original image data into the image unit 33 at the image server 30 and also, the corresponding editing results displayed at the large screen display unit 3 of the telephone-integrated image storage apparatus 25 are stored as corresponding new storage image data into the storage unit 27. Once the save processing is completed, the operation proceeds to step S128. It is to be noted that if it is decided in step S126 that no save instruction has been issued, the operation proceeds directly to step S128.

In step S128, a verification is executed to ascertain whether or not an edit processing complete operation has been executed at the operation unit 21, and if it is decided that the edit processing has been completed, the operation proceeds to step S129. If, on the other hand, it is decided that the edit processing has not been completed yet, the operation returns to step S125 and subsequently, the processing in step S125 through step S128 is repeatedly executed until the edit processing is completed.

In step S129, storage processing is executed to store an editing record. During this processing, the editing history record is stored into the history record unit at the image server 30 and an identical history record is also stored into the storage unit 27 at the telephone-integrated image storage apparatus 25. Upon completing the editing history record storage processing, the operation proceeds to step S130 to cut off the continuous connection with the image server 30 before the operation enters a standby state in step S131. If, on the other hand, it is decided in step S124 that the edit right has not been granted, the operation skips directly to step S130 to immediately cut off the continuous connection with the image server 30.

FIG. 11 is a chart of the structure of the data at the image unit 33 of the large capacity storage unit 32 in the image server 30. Each set of data is constituted of an "image ID", "header portion data", "original image data" and "thumbnail data". The "image ID" is assigned in the order in which the specific image has been received so as to enable the internal management of images at the image server 30. The data in FIG. 11 were entered at the image unit 33 a period from Oct. 15, 2001 through Oct. 23, 2001.

"file No." in the "header portion data" is automatically attached to each received image, with the first four digits of the "file No." indicating the registration number of the telephone-integrated image storage apparatus from which the image was provided, e.g., "1234" representing the registration number of the telephone-integrated image storage apparatus 25 shown in FIG. 2. Accordingly, the image assigned with "ID 4" with the initial four digits in the "file No." indicating "1234" was provided by the telephone-integrated image storage apparatus 25. In addition, the first four digits "1231" in the "file No." of the data corresponding to "ID 1" constitute the registration number of the telephone-integrated image storage apparatus 37. The initial four digits "1237" in the "file No." of the data corresponding to "ID 7" constitute the registration number of a third telephone-integrated image storage apparatus (not shown).

In addition, the subsequent six digits in the "file No." indicate the date. For instance, "011015" in the "file No." corresponding to "ID 1" indicate "Oct. 15, 2001". The next two digits in the "file No." indicate the order in which the corresponding image was received on a particular day, and, for instance, "01" in the "file No." corresponding to "ID 1" indicate that the corresponding image was the first image received from the telephone-integrated image storage apparatus 37 on Oct. 15, 2001.

The "file No." attached to a given set of original image data by the image server based upon the numbering rules described above is immediately transmitted back to the telephone-integrated image storage apparatus to be attached to the corresponding storage image data and stored at the storage unit 27 as well to be used to identify the image when handling the image data or managing the history records subsequently.

It is to be noted that while the "file No." is constituted as a combination of the registration number of the telephone-integrated image storage apparatus, the date of image reception and the image number, the image may instead be managed by generating another type of header portion data constituted of the registration number of the telephone-integrated image storage apparatus and the data of the image reception separately from the "file No." and by combining these different types of data to identify the image data.

As mentioned earlier, image data resulting from editing a given set of original image data, too, are stored as new "original image data" at the image server 30. Then, the "file No." of the original image having undergone the edit processing is entered as information into an "edit object" field in the "header portion data", as in ID 10 and ID 11. The image data with "ID10" provided by the telephone-integrated image storage apparatus 25, were obtained by altering the image data corresponding to "ID 1" initially provided by the telephone-integrated image storage apparatus 37 through edit processing. The image data with "ID 11", on the other hand, were obtained by editing the image data corresponding to "ID 4" originating at the telephone-integrated image storage apparatus 25 itself. It is to be noted that the image data corresponding to "ID 1" through "ID 9" and "ID 12" through "ID 21" are unedited true original images, and accordingly, "O" indicating "original" is entered in the "edit object" field of the "header portion data" corresponding to each of these ID numbers.

In an "other" field of the "header portion data", other header portion information needed for data management is entered, the original image data in a compressed state are entered in an "original image data" field and the thumbnail image data are entered in a "thumbnail data" field.

FIG. 12 is a chart of the structure of the data stored at the history record unit 34 of the large capacity storage unit 32 in the image server 30. Each set of data shown in FIG. 12 includes a "history record ID", an "operation date", a "file No.", a "classification", an "operator", a "partner" and "conditions". The data in FIG. 12 were entered at the history record unit 34 at the of the image server 30 over a period between Oct. 16, 2001 through Oct. 18, 2001.

Among the history record IDs, the italicized "ID 3" through "ID 6", "ID 8", "ID 11" "ID 12", "ID 17" and "ID 18" respectively correspond to the image IDs 3 through 11 in FIG. 11, assigned to images newly stored into the image server 30. Accordingly, their operation dates match the dates indicated in the respective "file Nos.". In addition, in the "classification" field, the specific operation that resulted in the storage of each set of image data is indicated. For instance, "ID 4" through "ID 6" each indicate that the corresponding image data were transmitted to the image server 30 in response to a viewing operation initiated at the operation unit 21 and were stored into the image unit 33. The image data corresponding to "ID 11" were transmitted to the image server in response to a quick image printing operation and the image data corresponding to "ID 17" were transmitted to the image server in response to an operation at the operation unit 21 performed to edit the image data. In the "operator" field, the instigator of the operation is indicated in correspondence to each set of image data, and for instance, the history record with "ID 3" indicates that the operation was instigated at the telephone-integrated image storage apparatus 25.

In addition, if image data are newly stored in response to a transmission operation as indicated in the history record with "ID 8", the recipient of the transmitted data is recorded in the "partner" field. In the case of "ID 8", the image data were transmitted from a third telephone-integrated image storage apparatus to the telephone-integrated image storage apparatus 25. The transmission conditions are recorded in the "conditions" field, and "not allowed" entered in this field indicates that no rights to access the original image data at the image server 30 have been granted.

The history record IDs which are not italicized in FIG. 12 correspond to history records of subsequent operations executed on image data having already been stored. For instance, the history record corresponding to "ID 1" indicates that the original image data "12301101501" having been stored into the image unit on Oct. 15, 2001 were then viewed at the telephone-integrated image storage apparatus 37 on Oct. 16, 2001. In addition, the history record corresponding to "ID 2" indicates that the same image data were then transmitted to the telephone-integrated image storage apparatus 25 on the same day. The history record corresponding to "ID 2" also indicates that when the image data were transmitted, the telephone-integrated image storage apparatus 37 conferred the high quality image print right and the edit right on the telephone-integrated image storage apparatus 25.

Among the history records shown in FIG. 12, the history records pertaining to the telephone-integrated image storage apparatus 25, i.e., the records except for "ID 1" and "ID 3", were also stored into the storage unit 27 of the telephone-integrated image storage apparatus 25 itself.

In addition, of the history records shown in FIG. 12, the history records pertaining to the telephone-integrated image storage apparatus 37, i.e., records corresponding to "ID 1" through "ID 3", "ID 9", "ID 10" and "ID 17", were also stored into the storage unit at the telephone-integrated image storage apparatus 37. The history records "ID 9" and "ID 10", which pertain to operations performed at the telephone-integrated image storage apparatus 25, are stored into the storage unit at the telephone-integrated image storage apparatus 37 as well since the corresponding image data were initially provided by the telephone-integrated image storage apparatus 37. While the history record with "ID 17" pertains to an image provided by the telephone-integrated image storage apparatus 25, the image was first originated from the telephone-integrated image storage apparatus 37 and then was edited, as indicated in data corresponding to "ID 10" in FIG. 11.

As described above, a plurality of telephone-integrated image storage apparatuses are able to share image data exchanged via the image server 30 and in addition, share the history records indicating how the image data have been handled via the image server 30. This means that the plurality of telephone-integrated image storage apparatus are allowed to share an image database and history record data. As long as a given telephone-integrated image storage apparatus is part of the history of a set of image data, the telephone-integrated image storage apparatus can obtain the most recent handling record information by accessing the history record unit 34 at the image server 30 even if the data was not directly involved in an exchange of the data and the data resulted from an operation at another telephone-integrated image storage apparatus.

Figure 13:
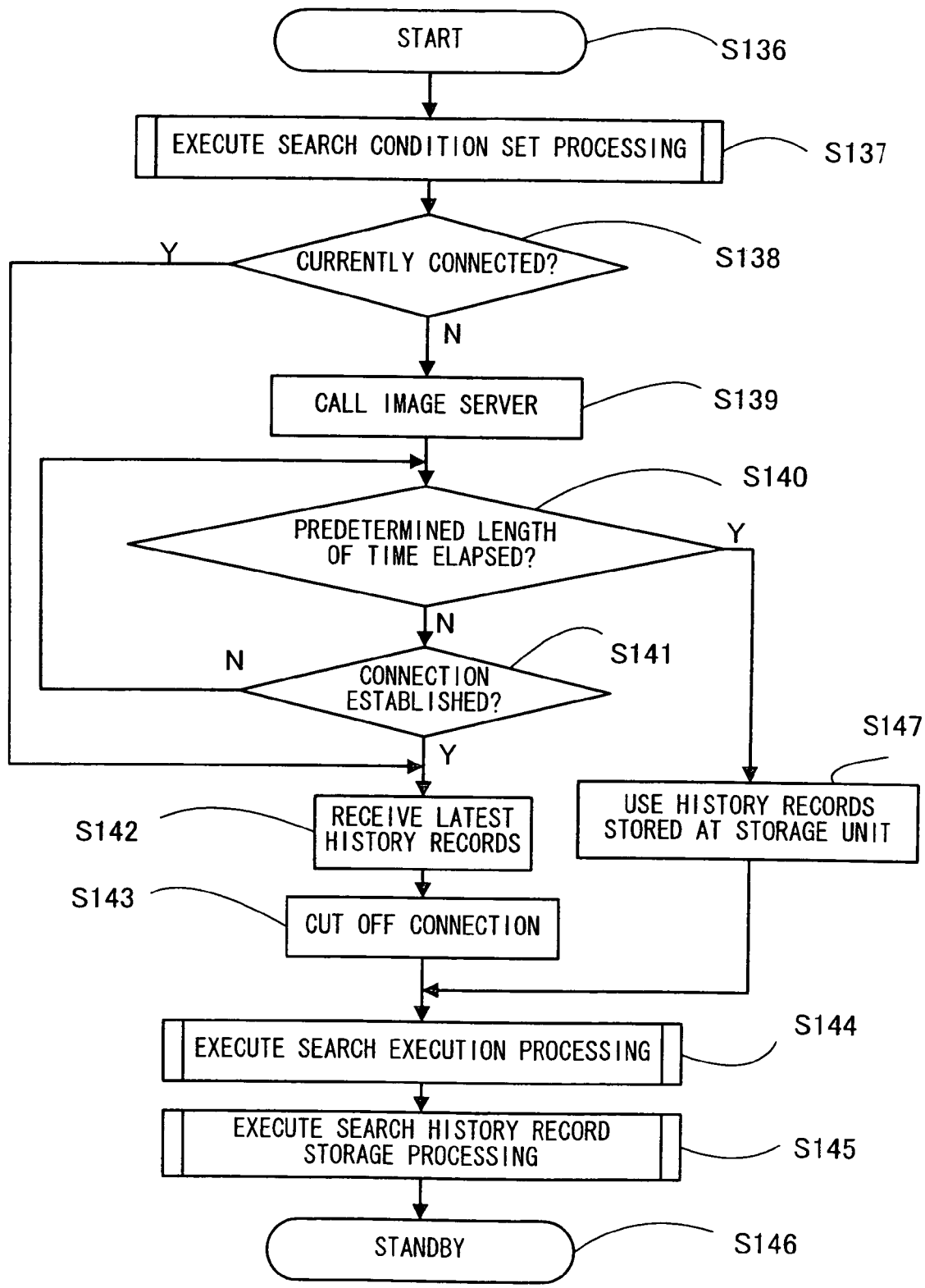
FIG. 13 presents a flowchart of the operation executed when a search interrupt is applied.

Images can be searched efficiently based upon history records stored at the history record unit 32 of the image server 30 or at the storage unit of the telephone-integrated image storage apparatus itself. FIG. 13 presents a flowchart of the operation executed when a search interrupt is applied. The search interrupt is applied in response to an instruction indicating that specific storage image data are to be searched at the storage unit 27 issued through the operation unit 21, and the flow of the search interrupt starts in step S136. In step S137, processing is executed through the operation unit 21 to set search conditions while monitoring the display at the large screen display unit 3.

Once the search conditions are set, a verification is executed in step S138 to ascertain whether or not the telephone-integrated image storage apparatus 25 is currently connected with the image server 30. If the telephone-integrated image storage apparatus 25 is not currently connected with the image server 30, a call is originated in step S139 to establish a telephone connection with the image server 30. In step S140, a verification is executed to ascertain whether or not a predetermined length of time has elapsed after originating the call, and if it is decided that the predetermined length of time has not yet elapsed, a verification is executed in step S141 to ascertain whether or not a telephone connection has been established. If a telephone connection has not been established, the operation returns to step S140, and subsequently, the processing in step S140 and the processing in step S141 are repeatedly executed until the predetermined length of time elapses.

If it is decided in step S141 that a telephone connection has been established, the most recent history records are received from the history record unit 34 at the image server 30 in step S142 to update the history records at the storage unit 27. It is to be noted that if there are any image data related to image data originally provided by the telephone-integrated image storage apparatus 25, at least the corresponding header portion data are also received and stored into the storage unit 27 at this time. Then, in step S143, the connection with the image server 30 is cut off.

In step S144, search execution processing is executed based upon the header portion data of the image data and the history record data at the storage unit 27 and the search conditions set in step S137, and the results of the search execution processing are displayed at the large screen display unit 3. In addition, processing is executed in step S145 to store a search history record that includes the results of the search. More specifically, the new search history record is stored into the storage unit 27 at the telephone-integrated image storage apparatus 25 and also, a similar search history record is transmitted as transmission data to the image server 30 through processing executed as shown in FIG. 6 to update the history records at the history record unit 34. Subsequently, the operation enters a standby state in step S146 to wait for an operation to be executed through the operation unit 21 in response to the search results.

If, on the other hand, it is decided in step S140 that the predetermined length of time has elapsed without successfully establishing a telephone connection, the operation proceeds to step S147 to use the header portion data in the image data and the history record data currently stored at the storage unit 27 for the search instead of attempting to update the data with the most recent history record data from the image server 30. Then, based upon the available data, the search is executed in step S144.

FIG. 14 presents a list of search-related history record data, and each set of history record data in FIG. 14 includes the "search conditions" set in step S137 in FIG. 13 and the results of the "search execution processing" executed in step S144 in FIG. 13, as well as information indicating the "search ID", the "search date" and the "search conductor" corresponding to the specific search.

The history record data with the search ID 1 pertain to a search conducted by the telephone-integrated image storage apparatus 25 on Oct. 19, 2001. The search conditions stipulate that there are history record data dated_Oct. 16, 2001 with regard to the search target, that the history record does not indicate "print" and that the history record relates to an operation performed at the telephone-integrated image storage apparatus 25. Two sets of image data, i.e., file No. "123401101601" and file No. "123401101603" were extracted by searching through the header portion data in the image information in FIG. 11 and the history record data shown in FIG. 12. While the history record data dated Oct. 16, 2001 in FIG. 12 include those with history record IDs 1 through 8, and there are only three images handled through operations at the telephone-integrated image storage apparatus 25, "ID 4" through "ID 7". Since the image assigned with the file No. "123401101602" among those three images was "printed" as its history record indicates and thus was excluded, and ultimately, the search results were obtained as indicated in FIG. 14.

The search records with "ID 2" and "ID3" in FIG. 14 indicate that the same two images related to each other, one pre-edit image and the other post-edit image, were extracted by conducting a search either from the telephone-integrated image storage apparatus 25 or from the telephone-integrated image storage apparatus 37.

The search record with "ID4" in FIG. 14 pertains to a search for image data which were either received or edited at the telephone-integrated image storage apparatus 25 with any history record data entered between Aug. 1, 2001 and Oct. 21, 2001.

The search record with "ID5" in FIG. 14 pertains to a search for image data that the telephone-integrated image storage apparatus 25 received together with the print right from the second or third telephone-integrated image storage apparatus. These search conditions excluded "123701101601" with regard to which the corresponding transmission conditions stipulated that no right to access the original image data at the image server 30 was granted from the search.

The search record with "ID6" in FIG. 14 pertains to a search of images having undergone a quick image print by the telephone-integrated image storage apparatus 25, and since the search conditions further restricted the search target to image data with a history record indicating an operation date on or after Oct. 18, 2001, "123101101501" with regard to which an operation was performed before October 18 was excluded.

The search record with "ID7" in FIG. 14 pertains to a search of image data conducted based upon a record indicating that an outside print was executed from the telephone-integrated image storage apparatus 25 on or before Dec. 31, 1998.

The search record with "ID8" in FIG. 14 pertains to a search of image data having been viewed at and transmitted from the telephone-integrated image storage apparatus 37, and "123101101601" which was only used for viewing was excluded from the search.

As described above, extraction of desired image data can be facilitated by setting appropriate search conditions with regard to the header portion data in the image data shown in FIG. 11 and the history record data shown in FIG. 12, even based upon a fairly vague memory of past operations and the like.

Furthermore, a record of such a search itself can be subsequently utilized as history record data. For instance, the history record indicating that two sets of image data, i.e., file Nos. "123401101601" and "123401101603", were extracted as a result of the search corresponding to the search ID 1 in FIG. 14 is included in the history records with "ID 13" and "ID14" in FIG. 12. Accordingly, it is possible to conduct a search at a later date based upon the user's memory of a "search conducted between a pair of dates from the telephone-integrated image storage apparatus 25" and, at the same time, an even more specific search can be conducted by selecting detailed search conditions indicated in the search record data shown in FIG. 14 as search conditions for the new search.

As described above, the past operation history records are automatically accumulated as search keys without having to attach special search keys or classifications to image data and thus, the foundation of the database search functions is not undermined even by negligence on the part of the user during a data storage operation.

Second Embodiment

Figure 15:
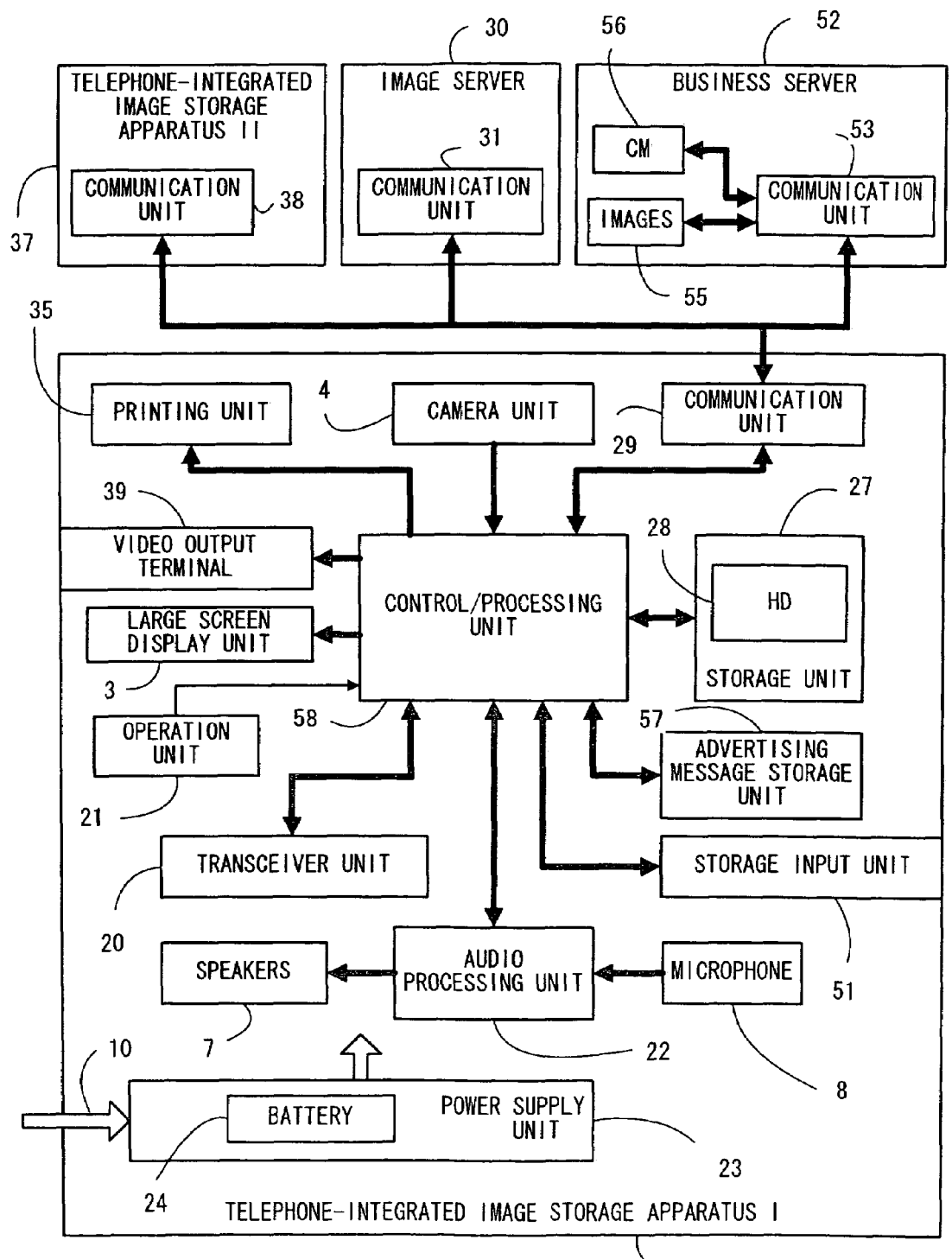
FIG. 15 is a block diagram showing the overall configuration of the system achieved in a second embodiment.

FIG. 15 is a block diagram showing the overall configuration of the system achieved in the second embodiment of the present invention and the same reference numerals are assigned to components similar to those in the first embodiment in FIG. 2 to preclude the necessity for a repeated explanation thereof. In addition, since the image server 30 in FIG. 15 adopt a structure completely identical to that of the image server in FIG. 2, a detailed illustration of its internal components is not included except for the communication unit 31. A storage input unit 51 in FIG. 15 is an integrated unit that includes the card slot 17 and the digital terminal 18 in FIG. 2, and its details are identical to those of the card slot 17 and the digital terminal 18.

The system achieved in the second embodiment in FIG. 15, includes a business server 52 which can be connected to the image server 30, the telephone-integrated image storage apparatus 37 and a telephone-integrated image storage apparatus 54 via a communication unit 53. At the business server 52, commercial images 55 are accumulated and, at the same time, advertising messages 56 with regard to utilization and the like of the images 55 are also stored. At an advertising message storage unit 57 of the telephone-integrated image storage apparatus 54, advertising messages 56 received from the business server 52 via the communication unit 29 are stored into memory. The advertising messages are then reproduced at the large screen display unit 3 and also, depending upon the situation, through the speakers 7 under control implemented by a control/processing unit 58.

In the configuration described above, the business server 52 connects with the telephone-integrated image storage apparatus 54 or the like on a regular basis, e.g., weekly, in accordance with a CM contract to update to the advertising messages at the advertising message storage unit 57. In addition, the advertising messages at the advertising message storage unit 57 can be updated through a connection initiated from the telephone-integrated image storage apparatus 54 as explained later. When the business server 52 is connected with the telephone-integrated image storage apparatus 54, the business server 52 executes processing to pay an advertisement reception bonus to the telephone-integrated image storage apparatus 54 based upon the results of the bill processing to be detailed later.

Figure 16:
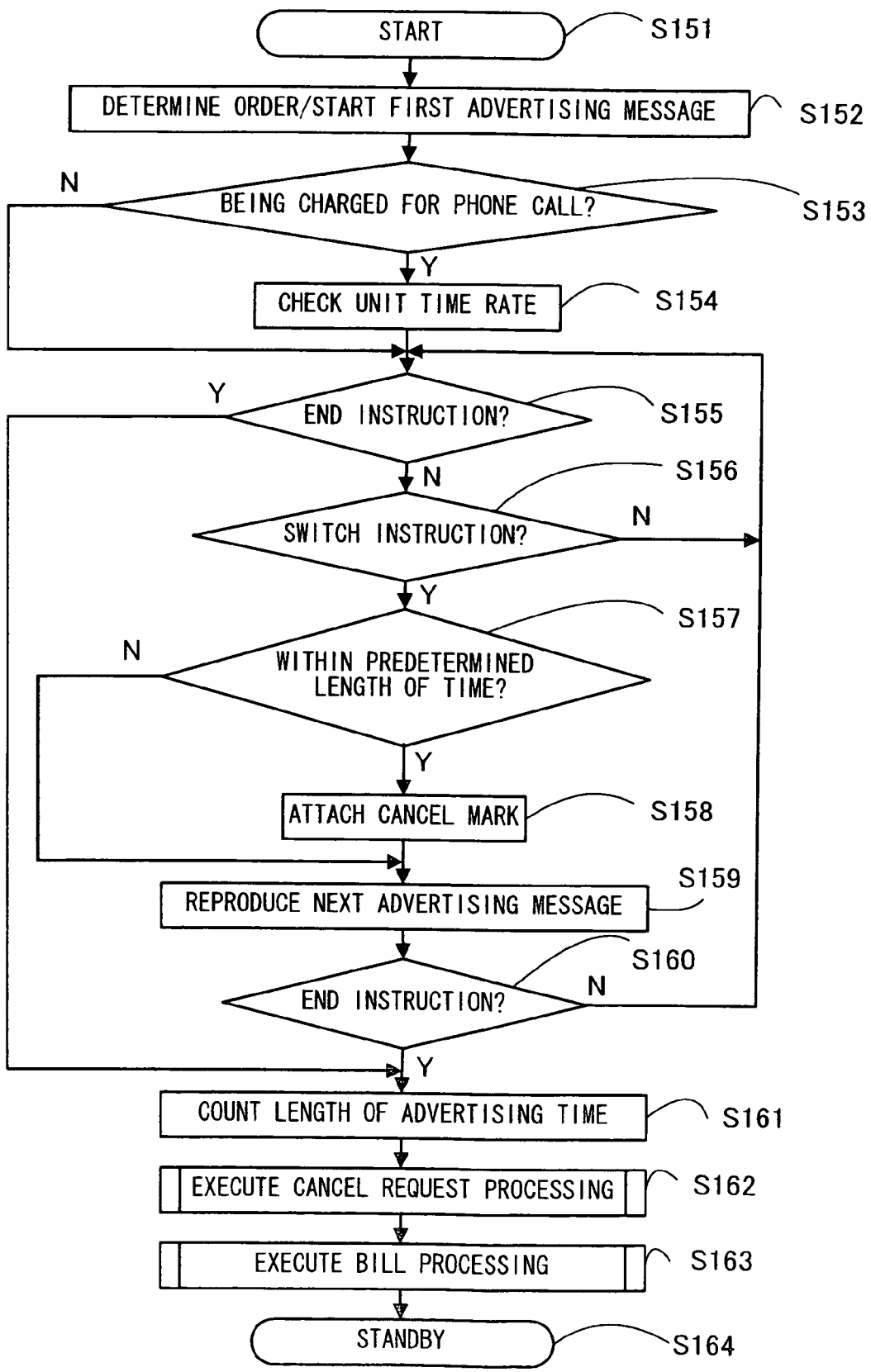
FIG. 16 presents a flowchart of a CM interrupt executed in the second embodiment.

FIG. 16 presents a flowchart of a CM interrupt executed in the second embodiment and an explanation is given on the function of the control/processing unit 58 related to the advertising message handling in reference to the flowchart. The CM interrupt in FIG. 16 is applied under the following circumstances. The CM interrupt is typically applied in response to a manual CM interrupt operation performed at the operation unit 21. While this operation may be performed whenever the user wishes, it is particularly useful to apply the CM interrupt when the user is put on hold during a phone call originated by the user and thus, the a call for which user is paying. As detailed later, if the user applies a CM interrupt and reproduces advertisements during a telephone call for which the user is paying, the business server 52 pays an advertisement reception bonus to the telephone-integrated image storage apparatus 54 in correspondence to the telephone charge corresponding to the length of time over which the advertisements are reproduced. This means that the business server purchases the time over which the user is put on hold during a telephone call for which the user is paying and the user can save on his telephone bills by taking advantage of the system. With a business model configured as described above, the business server 52 can provide an incentive for the user of the telephone-integrated image storage apparatus 54 to receive advertising messages.

In addition, instead of applying the CM interrupt through a manual operation as described above, the CM interrupt may be applied automatically by detecting silence during a telephone call or an on-hold state signaled by an on-hold chime sound transmitted from the other party during a phone call.

After the CM interrupt flow starts in step S151, numerous advertising messages stored in the advertising message storage unit are shuffled to determine the order of reproduction and an advertisement reproduction is started with the advertising message first in line in step S152. The advertising messages are shuffled so as to change the reproduction order randomly each time for novelty and also so as to allow an opportunity for a given advertising message to be exposed many times.

In step S153, a verification is executed to ascertain whether or not the CM interrupt has been applied while the user is being charged for a phone call. If it is decided that the user is being charged for a phone call, the unit time rate for the telephone call corresponding to and the location of the other party is checked and recorded in step S154. If, on the other hand, it is decided in step S153 that the user is not being charged for a telephone call, the operation skips step S154.

In step S155, a verification is executed to ascertain whether or not an instruction to end the advertisement reproduction has been issued. This end instruction is issued as the user manually operates the operation unit 21 when the other party comes back on line, terminating the on-hold state. Alternatively, an end instruction may be automatically issued by detecting that the telephone has exited a silent state or that there is no longer the on-hold chime sound transmitted from the other party.

If it is decided in step S155 that an end instruction has not been issued, the operation proceeds to step S156 to execute a verification as to whether or not an instruction to switch advertising messages has been issued. This switch instruction is issued by the user by manually operating the operation unit 21. If it is decided in step S156 that a switch instruction has not been issued, it means that the user wishes to keep viewing the same advertisement and, accordingly, the operation returns to step S155. Subsequently, the processing in step S155 and the processing in step S156 are repeatedly executed until an end instruction or a switch instruction is issued.

If it is decided in step S156 that a switch instruction has been issued, the operation proceeds to step S157 to execute a verification as to whether or not the switch instruction has been issued within a predetermined length of time after the reproduction of the particular advertising message started. The specific length of time may be, for instance, approximately 2 seconds. If the switch instruction has been issued within the predetermined length of time, it means an advertising message was reproduced for the first time but the user has no interest in the advertising message or that the advertising message has been previously reproduced and the user does not wish to view it again. In either case, the user does not wish to have the advertising message reproduced any longer. Accordingly, the operation proceeds to step S158 to attach a "cancel mark" to the advertising message, and then, the operation shifts into step S159 to reproduce the next advertising message. It is to be noted that the advertising message appended with the "cancel mark" is subsequently excluded when the advertising messages are shuffled in step S152 to determine the reproduction order at the particular telephone-integrated image storage apparatus 54. If, on the other hand, it is decided in step S157 that the switch instruction has been issued within the predetermined length of time, the operation proceeds to step S159 without attaching a "cancel mark" to the advertising message since there is a likelihood of the user wanting to view the message again.

In step S160, a verification is executed to ascertain whether or not an end instruction has been issued, and if it is decided that an end instruction has not been issued, the operation returns to step S155. Subsequently, the processing from step S155 through step S160 is repeatedly executed until an end instruction is issued. Once an end instruction is issued, the operation shifts to step S161 to count the length of advertising time period elapsing between the CM interrupt start and the end instruction and a length of advertising time period thus counted is recorded. It is to be noted that if it is decided in step S155 that an end instruction has been issued while the processing in step S155 and the processing in step S156 are being repeatedly executed in standby for a switch instruction to be verified in step S156, the operation promptly skips to step S161.

After obtaining the time count information in step S161, the operation proceeds to step S162 to execute cancel request processing. In the cancel request processing, a verification is executed to ascertain whether or not there is any advertising message having been appended with a cancel mark in step S158, and if it is decided that there is an advertising message appended with a cancel mark, a request is issued to replace the advertising message having the cancel mark with a new advertising message by promptly connecting with the business server 52. Since this processing benefits the business server 52, the telephone charge for connecting with the business server 52 under these circumstances is covered by the business server 52 on a pay-on-delivery basis.

Once the arrangement for the processing in step S162 is completed, the bill processing is executed in step S163. In the bill processing, a bill is calculated based upon the unit time rate information recorded in step S154 and the length of the advertising time period recorded in step S161. Then, when the telephone-integrated image storage apparatus 54 is connected with the business server the next time, the business server 52 is billed for the payment. While the benefits accrued by the business server by persuading the user to view advertising messages are unaffected whether the unit time rate is high or low, the business model described above is designed to psychologically increase the user's incentive to apply a CM interrupt during a phone call for which he is paying. Once the bill processing is underway, the operating flow enters a standby state in step S164. It is to be noted that the CM interrupt may be applied anytime, e.g., during a phone call initiated by the other party or when no telephone call is in progress, and the unit time rate is not recorded in step S154 in either of these cases. Under such circumstances, the unit time rate is regarded to be zero and the bill processing in step S163 is not executed.

It is to be noted that since the ultimate objective of the business server 52 is to ensure that the advertising messages are viewed by users under a variety of circumstances, a business model that offers extra incentive for applying a CM interrupt by rewarding users with advertisement reception bonuses for viewing advertising messages even when they are not being charged for the telephone connection may be adopted as well. In this business model, a mode of implementation different from that described above should be adopted so that it is assumed that a unit time rate matching a predetermined monetary value has been actually recorded even when no time unit rate has been recorded in step S154 so that the billing is executed accordingly in step S163. It is to be noted that this "predetermined monetary value" should be set so that it is clearly lower than the minimum unit time rate for telephone calls, in order to assure that the intention of the original incentive, i.e., when the user views advertisements, the on-hold time period which is normally wasted during a paid telephone call can be purchased by the business server remains effective.

If a customer requests a commercial image 55 in response to an advertising message, the business server 52 provides the image to the telephone-integrated image storage apparatus 54 for a fee. In this situation, the customer operating the telephone-integrated image storage apparatus 54 may be a business operator who uses images instead of a regular user. In addition, a business model in which commercial images are distributed from the image server 30 to the business server 52 in a tie-in between the image server 30 and the business server 52 may be adopted as well. In such an application, the image server 30 may save images originating from commercial image creators as well as images from regular users. Under such circumstances, the customer operating the telephone-integrated image storage apparatus 54 may be a commercial image creator. It is to be noted that the advertising messages 56 provided by the business server 52 do not need to advertise only image products and advertising messages may pertain to all types of general products.

Third Embodiment

Figure 17:
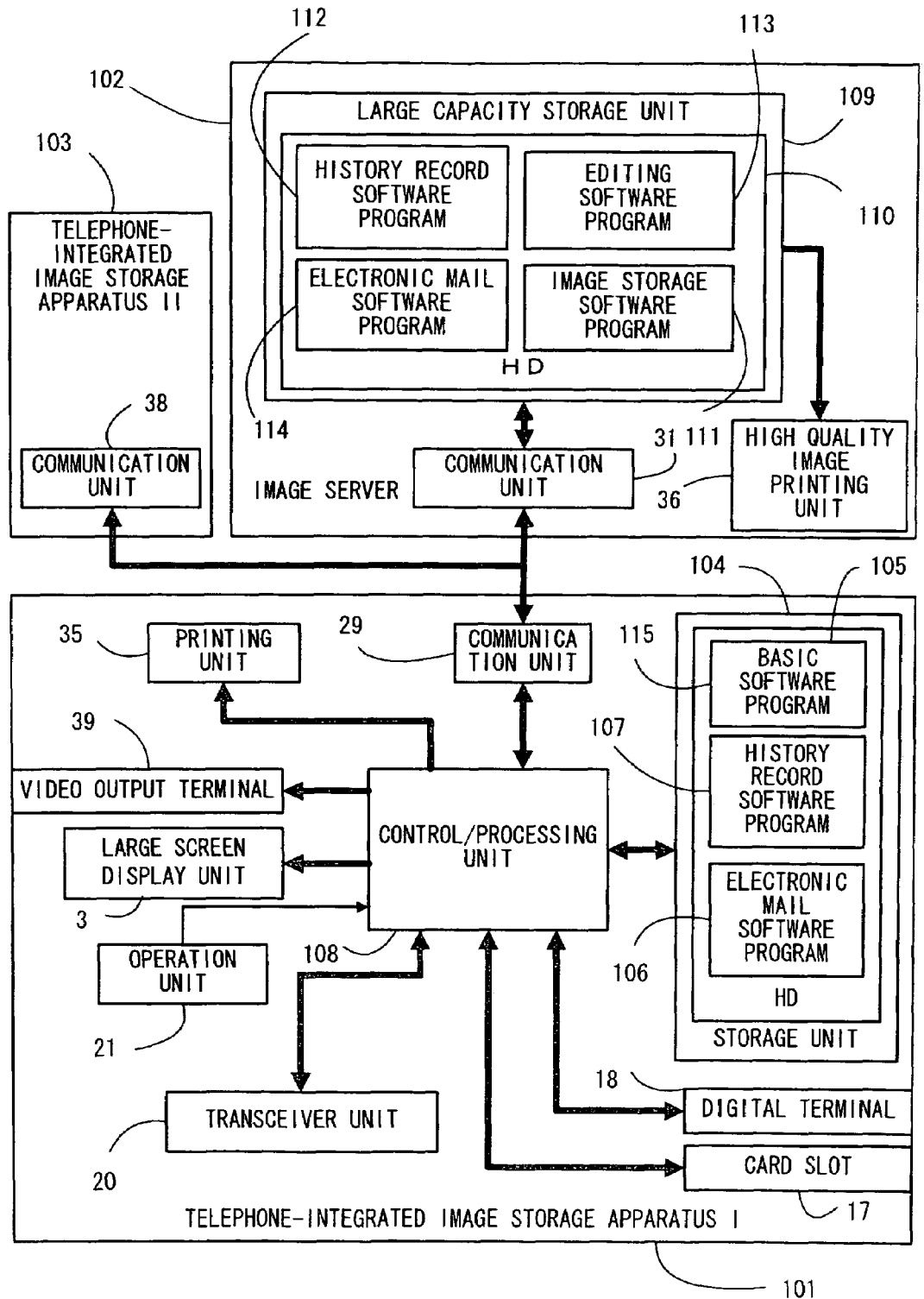
FIG. 17 is a block diagram showing the overall configuration of the system achieved in a third embodiment.

FIG. 17 is a block diagram showing the overall configuration adopted in the system in the third embodiment of the present invention, with the same reference numerals assigned to components identical to those in the first embodiment shown in FIG. 2 to preclude the necessity for a repeated explanation thereof. In addition, while the camera unit 4, the audio unit 22, the speakers 7, the microphone 8 and the power supply unit 23 are also included in the third embodiment, their illustration is omitted in FIG. 17. It is to be noted that since a second telephone-integrated image storage apparatus 103 adopts a structure identical to that of a telephone-integrated image storage apparatus 101, the structural elements of the telephone-integrated image storage apparatus 103 other than its communication unit 38 are not shown in the figure for simplification.

The third embodiment, which basically adopts a structure similar to that of the first embodiment, is characterized in that a mail software program that enables electronic mailing on the Internet is utilized to store and transmit storage image data and also to correlate the storage image data to the original image data.

A mail software program 106 is installed at a hard disk 105 of a storage unit 104 in the telephone-integrated image storage apparatus 101, and storage image data are stored into the hard disk 105 as an attachment file of a mail file in the mail software program 106. At the hard disk 105, a history record software program 107 is also installed to be used to manage the storage of a history record or the like of an operation executed on a mail file displayed at the large screen display unit 3 through the operation unit 21. The functions of the mail software program 106, the history record software program 107 and the like are processed by a control/processing unit 108.

A large capacity storage unit 109 at an image server 102 includes a large capacity hard disk 110 at which an image storage software program 111 that manages the storage of original image data and the like, a record software program 112 adopting a format matching that of the history record software program 107 at the telephone-integrated image storage apparatus 101 and an editing software program 113 are installed. At the hard disk 110 of the image server 102, a mail software program 114 adopting a format matching that of the history record software program 107 at the telephone-integrated image storage apparatus 101 is also installed to be used to create storage image data in correspondence to original image data newly stored into the image storage software program 111, attach the storage image data to a mail file and transmit the mail file to the telephone-integrated image storage apparatus 101. Thus, while the image server 102 has a function of creating storage image in the third embodiment other functions achieved in the third embodiment are basically identical to those of the first embodiment, It is to be noted that a basic software program 115 at the image storage apparatus is directly operated by the user at the telephone-integrated image storage apparatus 101 described above, and no screen display of the mail software program 106 or the history record software program 107 is brought up at the large screen display unit 3 except for individual mail files. For this reason, during the actual operation, the user does not need to open the mail software program 106 or the history record software program 107 for each specific operation and is only required to perform operations through the basic software program 107 which is brought up on display. In response to the user operations, the basic software program automatically operates the mail software program 106 and the history record software program 107 as instructed by the user.

FIGS. 18 through 20 show the layouts of display screens brought up on display at the large screen display unit 3 in the third embodiment. The following is an explanation of changes in the display screen layout occurring in the third embodiment, given in reference to an example in which a storage interrupt is applied as a memory card is inserted at the card slot 17.

FIG. 18(A) shows the initial screen of the basic software program 115 in FIG. 17, which is automatically displayed as the image storage function is manually activated or as the storage interrupt is applied as explained earlier in reference to FIG. 4. The screen shown in FIG. 18(A), which is displayed at the large screen display unit 3, includes an information screen 201 and an operation screen 202, with thumbnail images 203 displayed at the information screen 201. If there are a great number of thumbnail images 203 to be displayed, the screen can be scrolled vertically by selectively operating a scroll button 204 via the operation unit 21.

In the example, the initial screen shown in FIG. 18(A) is displayed in response to the storage interrupt applied by inserting a memory card and, accordingly a "card" indicator is ON at a data source display position 205 of the operation screen 202. In the operation screen 202, a view button 206, a print button 207, a mail button 208, an edit button 209 and a search button 210 are displayed and by selectively operating one of these buttons through the operation unit 21, an interrupt is applied to enable a desired operation. In addition, as one of the thumbnail images is selected via the operation unit 21 and a delete button 211 is operated, the corresponding image data are deleted from the data source indicated at the data source display position 205. In this example, the "card" indicator is ON and, accordingly, the corresponding image data are deleted from the inserted memory card. The various buttons displayed at the large screen display unit 3 are selectively operated via the operation unit 21 and their operations are not individually explained. It is to be noted that instead of operating the buttons via the operation unit 21 as described above, a graphical user interface (GUI) adopting a touch panel system may be used to enable the user to operate the buttons by directly touching them on the large screen display unit 3.

As one of the thumbnail images is selected through the operation unit 21 and the view button 206 is operated in the screen shown in FIG. 18(A), a view interrupt is applied to bring up the screen shown in FIG. 18(B). The image data corresponding to the selected thumbnail image are taken in from the memory card, undergo required processing such as decompression/sub-sampling and are displayed as an enlarged screen image 212 at the information screen 201, as shown in FIG. 18(B). Also, the original image data having been taken in are transmitted to the image server 102 and the corresponding storage image data are stored into the telephone-integrated image storage apparatus 101.

As a forward operation to bring up the next screen is performed with a screen forward button 213 while the screen shown in FIG. 18(B) is up, the image data corresponding to the next thumbnail image in the arrangement shown in FIG. 18(A) are taken in from the memory card, undergo the required processing such as decompression/sub-sampling and are displayed as an enlarged screen image 212. In addition, the original image data are transmitted and the storage image data are stored. It is to be noted that the screen shown in FIG. 18(B) with any enlarged screen image 212 displayed therein can be brought up by first operating a thumbnail button 214 to return to the screen in FIG. 18(A) selecting the desired thumbnail image and then operating the view button.

The layout of the screen shown in FIG. 18(B), which is up while the user is viewing the image is similar to that of the screen in FIG. 18(A) except that the layout in FIG. 18(B) does not include the view button 206, and by operating one of the buttons on display, the image being viewed can be printed, electronically mailed or edited. In addition, a search button 210 may be operated to directly jump from the viewing screen to the search screen, and the delete button 211 may be operated to delete the image data corresponding to the enlarged screen image 212.

FIG. 19(A) shows the layout of the display of a mail file created with the mail software program 114 at the image server 102 an transmitted to the telephone-integrated image storage apparatus 101. This mail file, having attached thereto storage image data created at the large capacity storage unit 109 based upon the original image data having been transmitted to the image server 102 in response to the storage interrupt, is created immediately in response to the transmission of the original image data to the image server 102 and is transmitted to the telephone-integrated image storage apparatus 101.

The mail file 216 contains a transmission button 217, an address field 218, a file name field 219, a message field 220 and the like, with the address field left blank and a file No. attached to the original image data by the image server 102 automatically entered in the file name field 219.

In addition, a thumbnail image 221 corresponding to the storage image data attached to the mail file 216 is displayed in the message field 220 and a quick print button 222, a fine print button 223, an edit button 224, a download button 225 and a transfer button 226 are also displayed in the message field 220. The thumbnail and the buttons in the message field 220 each constitute a link button. For instance, the thumbnail image 221 also functions as a link button used to link with the storage image data attached to the mail file and as the thumbnail image 221 is clicked, the storage image data are opened and displayed in an enlargement.

The link functions of the other buttons are individually described below. First, as the quick print button 222 is clicked, a quick printing operation is started by using the storage imaged it to attached to the mail file. As the fine print button 223 is clicked, a connection with the image server 102 is established and a printing operation is started at the high quality image printing unit 36 by using the corresponding original image data in the image storage software program 111. Furthermore, in response to a click of the edit button 224, too, a connection with the image server 102 is established and the editing software program for the corresponding original image data is started up in the image storage software program 111. In addition, in response to a click of the download button 225, a connection with the image server 102 is established to start downloading the corresponding original image data in the image storage software program 111. If, on the other hand, the transistor button 226 is clicked, the mail software program 106 at the telephone-integrated image storage apparatus 101 copies the mail file and creates a transfer file.

As soon as the mail file in FIG. 19(A) formatted as described above is received, the mail software program 106 stores the mail file into the hard disk 105. As a result, when the initial screen shown in FIG. 18(A) is brought up through a manual operation subsequently, "storage apparatus" indicator comes ON at the data source display area 205 and thumbnail images corresponding to the mail files stored in the mail software program 106 are displayed in the layout shown in FIG. 18(A) starting with the thumbnail image corresponding to the mail file most recently stored into the mail software program 106. It is to be noted that if one of the thumbnail images a corresponding to image data having been previously stored in the hard disk 105 is selected and the view button 206 is operated in the screen shown in FIG. 18(A), the corresponding image data are displayed as an enlarged screen image by adopting the format shown in FIG. 18(B) instead of the mail format layout in FIG. 19(A) although the image data were originally stored in the mail file format. The display formats in this situation only differs from FIG. 18(B) in that the "storage apparatus" indicator is ON in the data source display area 205.

It is to be noted that storage image data transmitted from the telephone-integrated image storage apparatus 103 also adopt a mail file format similar to that shown in FIG. 19(A), and as soon as storage image data are received they are stored into the hard disk 105 by the mail software program 106. Once the data are stored, they are viewed in the display formats shown in FIGS. 18(A) and 18(B), as described above.

As described above, as long as the user is operating the basic software program, image data are not displayed as an image in the original mail file layout in FIG. 19(A) regardless of whether the image data have been received from the image server 102 or from the telephone-integrated image storage apparatus 103.

FIG. 19(B) shows the layout of the display screen brought up as the mail button 208 is operated in order to electronically mail the image currently being viewed in the screen shown in FIG. 18(B). A copy of the mail file corresponding to the image data having been viewed in the screen in FIG. 18(B) is displayed as a new mail adopting the mail layout in FIG. 19(A) in the information screen 201 at the large screen display unit 3. In this situation, as long as an operation is performed within the information screen 201, the function of the mail software program 106 is engaged.

The e-mail address of a telephone-integrated image storage apparatus 103 is entered in the address field and the transmission conditions are set in this state. The transmission conditions are set by deleting from the message field 220 a button corresponding to a function that the user does not with to confer. For instance, if the user is willing to grant print rights with regard to an image to be transmitted at this time but does not wish to grant edit rights, download rights or right-inclusive transfer right, the user deletes the edit button 224, the download button 225 and the transfer button 226 from the message field 220. As a result, as each in the message field is cleared, the links from these buttons are canceled, disabling any download of the original image data corresponding to the received image by the recipient.

Once the mail address is entered and the conditions are set, the user operates an OK button 227 in the operation screen 202. Without first operating the OK button 227, the transmission button 217 cannot be operated, to prevent an inadvertent transmission of the image data before deleting any rights the user does not wish to grant. In response to an operation at the operation unit 217, the transmission of the mail file starts, and once the transmission is completed, the mail mode ends and the display returns to the immediately preceding screen. In this example, the display returns to the screen shown in FIG. 18(B). It is to be noted that the user may operate a cancel button 228 in the operation screen 202 without transmitting the image to exit the mail mode. Processing for indicating whether or not the mail being created is to be saved is executed as directed by the mail software program.

As the transmission is executed, the data in the information screen 201 in FIG. 19(B) i.e., the data in FIG. 19(A) are transmitted as an electronic mail to the telephone-integrated image storage apparatus 103 via the transmission unit 29 by the mail software program 106. However, since the telephone-integrated image storage apparatus 103, too, has the basic software program 115 installed therein, the received image is displayed by assuming the layouts shown in FIG. 18(A) and FIG. 18(B) or FIG. 19(B), and the raw original layout shown in FIG. 19(A) is not brought up on display. Since restrictions have been imposed on the rights granted with regard to the received image, the edit button 224, the download button 225 and the transfer button 226 are not displayed at the telephone-integrated image storage apparatus 103 in the display layout shown in FIG. 19(B), and the edit button 209 is not displayed in the layout in FIG. 18(B), either.

It is to be noted that even when the basic software program is not installed on the receiving side, the image can be attached and corresponding link buttons can be set by the display function and the various link functions available in a general mail software program format. In such a case, the data are displayed in the original mail file format shown in FIG. 19(A) on the receiving side. In addition, as long as a right has been granted, the corresponding link button is displayed in the message field 220 and thus, the recipient with the download right is allowed to obtain the original image data by clicking the download button 225 in FIG. 19(A).

Furthermore, even when the basic software program is not installed on the receiving side, as described above, images are transmitted by attaching one image to a single mail file and, as a result, a mail filename, a sender name, a transmission date, a recipient name and a reception date are automatically assigned in conformance to the general purpose mail software format to each image. Thus, an image search can be conducted by using the mail search function of the general purpose mail software program based upon these data, as well.

FIG. 20(A) shows the layout of the display screen brought up on display as the print button 207 is operated to print the image being viewed in the screen shown in FIG. 18(B). Image data identical to those of the enlarged screen image 212 being viewed in the screen in FIG. 18(B) are displayed as an enlarged screen image 231 in the information screen 201. In addition, the file No. assigned by the image server 102 is automatically entered in a file name field 232.

The first three buttons displayed in the operation screen 202 are used to select a specific type of printing operation. Namely, a quick print button 233 operated to select a printing operation executed by using the storage image data, a high quality image print button 234 operated to select a printing operation executed within the telephone-integrated image storage apparatus by using the original image data and an outside print button 235 operated to select a printing operation executed at the image server 102 by using the original image data are displayed. However, if the access right is not granted with regard to the target image, only the quick printing operation is enabled, and in such a case, only the setting for a quick print is displayed instead of displaying the three buttons. In addition, if the download right has not been granted, the high-quality image print button 234 is not displayed, and if the high image quality right has not been granted, the outside print button 235 is not displayed.

In the operation screen 202, a print copy quantity setting button 236, a print paper size setting button 237 and a detail setting button 238 operated to open a screen in which more detailed printing conditions can be set are displayed as well.

Once the various settings are selected in the operation screen 202, the user operates an execute button 239 to start the printing operation. The printing operation can be canceled by operating a cancel button 240.

FIG. 20(B) shows the layout of the display screen brought up on display as the edit button 209 is operated to edit the image being viewed in the screen shown in FIG. 18(B). Image data identical to those of the enlarged screen image 212 being viewed in the screen in FIG. 18(B) are displayed as an enlarged screen image 241 in the information screen 201. In addition, the telephone-integrated image storage apparatus 101 enters a state of continuous connection with the image server 102, and the image server 102 is assigned for the actual execution of the editing operations directed at the large screen display unit 3.

In the operation screen 202, the various edit buttons 243 to 248 corresponding to individual functions of the editing software program 113 at the image server 102 are displayed. In addition, a detail setting button 249 operated to open an operation screen in which a more detailed editing operation can be executed is included in the display. As the editing operation is completed and an OK button 250 is operated, the edited image is stored by the image storage software program 111 as new original image data before the continuous connection with the image server 102 is cut off. The continuous connection with the image server 102 can also be cut off by operating a cancel button 251. If the connection with the image server 102 is cut off by operating the cancel button 251, the image being edited is not saved as new original image data.

All the operations of the various buttons shown in FIGS. 18 to 20 are stored as history record data in the history record software program 107 in the telephone-integrated image storage apparatus 101. In addition, any operation executed in conjunction with the image server 102 is also stored into the history record software program 112 as well. The history record software program 107 and the history record software program 112 exchange information on a regular basis to share the records with each other. Namely, a record of operations performed at the telephone-integrated image storage apparatus 101 are taken in to the image server 102 almost simultaneously. A history record related to an image from the telephone-integrated image storage apparatus 101 which is obtained by the image server 102 following an operation performed at, for instance, the telephone-integrated image storage apparatus 103 or a history record of an operation executed with a function of the image server 102 itself with regard to an image originating from the telephone-integrated image storage apparatus 101, too, is downloaded from the history record software program 112 to the history record software program 107 almost simultaneously.

Fourth Embodiment

Figure 21:
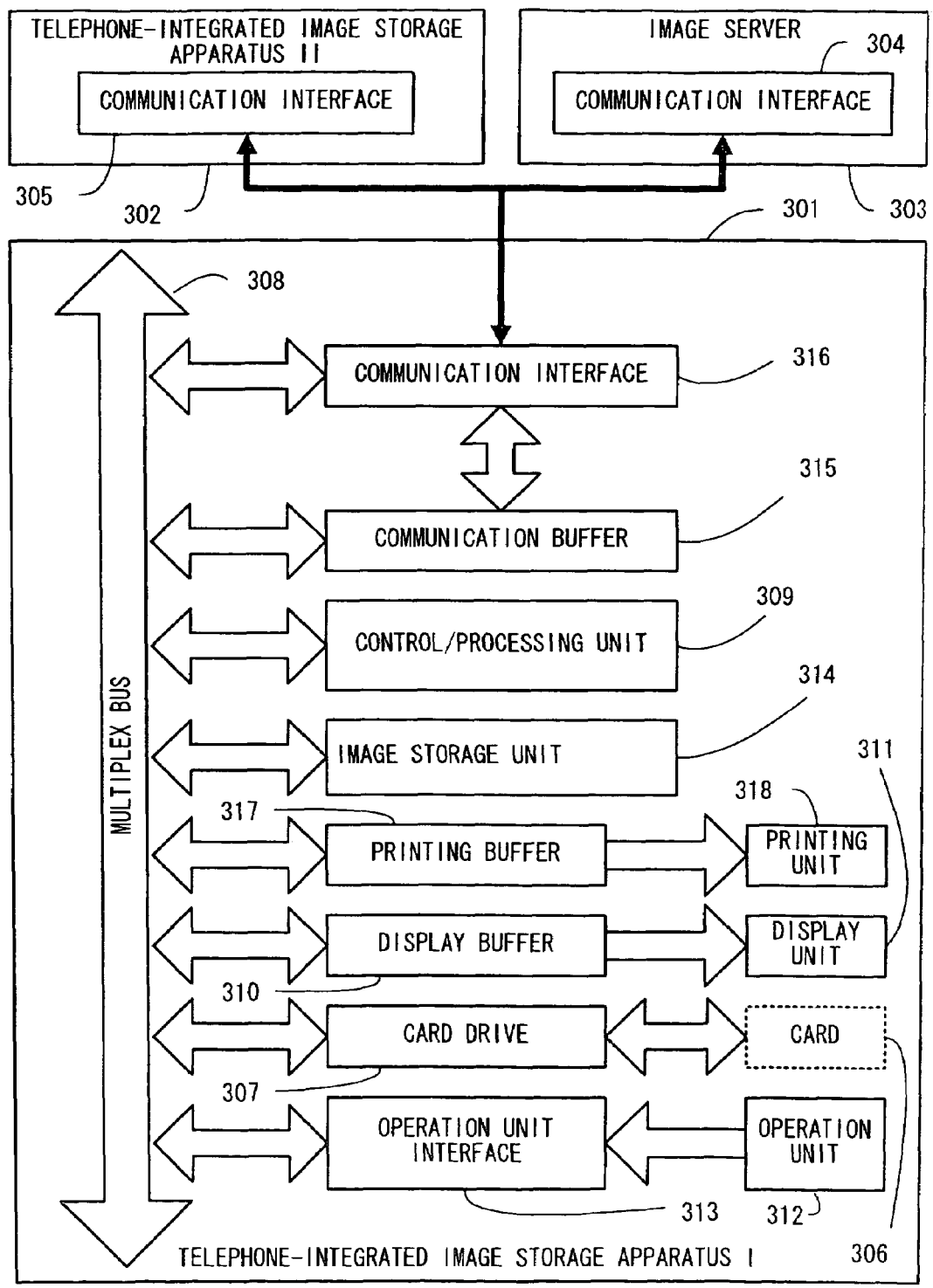
FIG. 21 is a block diagram showing the overall configuration of the system achieved in a fourth embodiment.

FIG. 21 is a block diagram showing the overall configuration adopted in the system in the fourth embodiment of the present invention, which is basically similar to the first embodiment shown in FIG. 2, including the utilization of operation history records. It differs from the first embodiment in that a telephone-integrated image storage apparatus 301 and a second telephone-integrated image storage apparatus 302 handle image data in their original form instead of handling storage image data. While the illustration presented in FIG. 21 adopts a format different from that of FIG. 2 so as to clarify the difference, the corresponding structural features are the same.

It is to be noted that while the telephone-integrated image storage apparatus 301 in the fourth embodiment includes structural features corresponding to the transceiver unit 20, the video output terminal 39, the digital terminal 18, the camera unit 4, the audio unit 22, the speakers 7, the microphone 8 and the power supply unit 23 shown in FIG. 2, these components are not explained here and FIG. 21 does not include their illustration. In addition, while an image server 303, too, includes structural elements corresponding to the large capacity storage unit 32 and the high quality image printing unit 36 in FIG. 2, FIG. 21 does not include any illustration of structural elements other than a communication interface 304 and their explanation is omitted. Since the second telephone-integrated image storage apparatus 302 assumes a structure completely identical to that of the telephone-integrated image storage apparatus 301, its structural features other than a communication interface 305 are not shown in FIG. 21 and their explanation is omitted.

The operation executed when viewing an image in the fourth embodiment is explained in reference to FIG. 21. First, as a memory card 306 is inserted at the card slot, thumbnail data in the memory card are output to a multiplex bus 308 from a card drive 307 within the card slot with predetermined timing and the output thumbnail data are taken into a control/processing unit 309. It is to be noted that at the multiplex bus 308, an address bus and a data bus are multiplexed. The thumbnail data having been processed at the control processing unit 309 are output to the multiplex bus 308 with predetermined timing, are taken into a display buffer 310 and are then displayed at a display unit 311.

As a thumbnail image is selected and an operation indicating that the user wishes to view the image corresponding to the selected thumbnail image is performed at an operation unit 312, data corresponding to the operation are output with predetermined timing to the multiplex bus 308 from an operation unit interface 313 and the output data are taken into the control processing unit 309. In response, the control processing unit 309 issues an instruction for the card drive 307 to output the original image data corresponding to the thumbnail image from the memory card 306 to the multiplex bus 308 with predetermined timing, and the original image data thus output are taken in. Then, the original image data having been taken in are decompressed and are output to the multiplex bus 308 with predetermined timing. The output data are taken into the display buffer 310 and displayed at the display unit 311.

Next, the control processing unit 309 implements control to output the same original image data again from the memory card 306 to the multiplex bus 308 with predetermined timing, and also, it issues an instruction for an image storage unit 314 to take in the output original image data and store them. The control processing unit 309 then implements control to output the same original image data from the memory card 306 again to the multiplex bus 308 with predetermined timing and issues an instruction for a communication buffer 315 to take in the output original image data. In response to an instruction issued by the control processing unit 309, the original image data having been taken into the communication buffer 315 are transmitted to the communication interface 304 at the image server 303 via a communication interface 316.

It is to be noted that while the original image data are output from the memory card 306 to the multiplex bus 308 three times in succession in the explanation given above, the entire output may be completed all at once. Namely, as the original image data to be taken into the control processing unit 309 are output from the memory card to the multiplex bus 308, the original image data may also be taken into the image storage unit 314 and the communication buffer 315 concurrently. This principle also applies when printing an image and transmitting an image as detailed below.

Next, the operation executed to print an image in the fourth embodiment is explained. As one of the thumbnail images displayed at the display unit 311 is selected and an operation indicating that the user wishes to print the image corresponding to the selected thumbnail image is performed at the operation unit 312, the data corresponding to the operation are output with predetermined timing to the multiplex bus 308 from the operation unit interface 313 and the output data are taken into the control processing unit 309. In response, the control processing unit 309 issues an instruction for the card drive 307 to output the original image data corresponding to the thumbnail image from the memory card 306 to the multiplex bus 308 with predetermined timing and the original image data thus output are taken in. Then, the original image data having been taken in are decompressed and are output to the multiplex bus 308 with predetermined timing and the output data are taken into a print buffer 317 and are printed at a printing unit 318.

Next, the control processing unit 309 implements control to output the same original image data again from the memory card 306 to the multiplex bus 308 with predetermined timing, and also, it issues an instruction for the image storage unit 314 to take in the output original image data and store them. The control processing unit 309 then implements control to output the same original image data from the memory card 306 again to the multiplex bus 308 with predetermined timing and issues an instruction for the communication buffer 315 to take in the output original image data. In response to an instruction issued by the control processing unit 309, the original image data having been taken into the communication buffer 315 are transmitted to the communication interface 304 at the image server 303 via the communication interface 316.

Now, the operation executed to transmit an image in the fourth embodiment is explained. As one of the thumbnail images displayed at the display unit 311 is selected and an operation indicating that the user wishes to transmit the image corresponding to the selected thumbnail image to the telephone-integrated image storage apparatus 305 is performed at the operation unit 312, data corresponding to the operation are output with predetermined timing to the multiplex bus 308 from an operation unit interface 313 and the output data are taken into the control processing unit 309. In response, the control processing unit 309 issues an instruction for the card drive 307 to output the original image data corresponding to the thumbnail image from the memory card 306 to the multiplex bus 308 with predetermined timing and also issues an instruction for the image storage unit 314 to take them in for storage.

Next, the control processing unit 309 then implements control to output the same original image data from the memory card 306 again to the multiplex bus 308 with predetermined timing and issues an instruction for the communication buffer 315 to take in the output original image data. In response to an instruction issued by the control processing unit 309, the original image data having been taken into the communication buffer 315 are transmitted to the communication interface 305 at the recipient telephone-integrated image storage apparatus 302 and the communication interface 304 at the image server 303 via the communication interface 316.

It is to be noted that the original image data will have already been taken into the image storage unit 314 and the communication buffer 315 and the original image data will also have already been transmitted to the image server 303 from the communication interface 316 if a printing operation is instructed through the operation unit 312 while the original image data are being viewed at the display unit 311, and that the data intake and transmission are not executed again under such circumstances. In addition, if a transmission operation is instructed through the operation unit 312 under similar circumstances, the original image data are not taken into the image storage unit 314 and the image is only transmitted to the telephone-integrated image storage apparatus 305 by skipping the transmission to the image server 303. This principle is similar to that adopted in the first embodiment.

Figure 22:
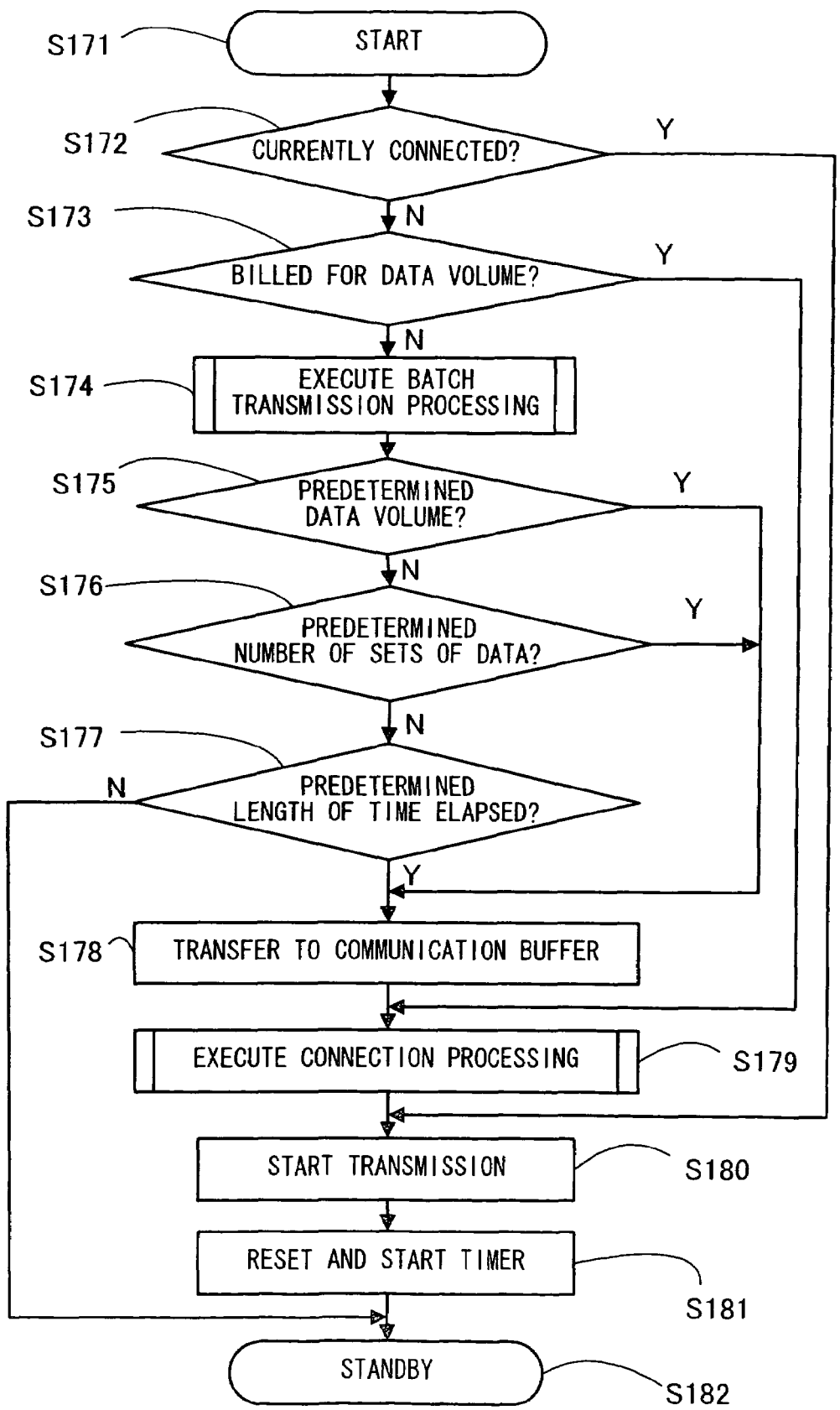
FIG. 22 presents a flowchart of the operation executed when a transmission interrupt is applied to transmit data to an image server in the fourth embodiment.

FIG. 22 presents a flowchart of the operation executed by the control processing unit 309 when a transmission interrupt is applied to transmit image data to the image server in the fourth embodiment described above. The image server transmission interrupt is applied each time new original image data are output to the multiplex bus 308 shown in FIG. 21. In addition, the image server transmission interrupt is applied when it is decided that a predetermined length of time has elapsed since the last transmission based upon the results of the time count at a timer which is to be referred to in the explanation of step S181 later. When the predetermined length of time is set to, for instance, 12 hours, original image data directed to batch transmission processing in step S174 to be explained later are transmitted to the image server 303 at least twice a day regardless of the volume of accumulated data or the number of sets of accumulated data.

After the transmission interrupt flow starts in step S171 as the transmission interrupt is applied to transmit data to the image server, a verification is executed in step S172 to ascertain whether or not the telephone integrated image storage apparatus 301 is currently connected with the image server 303. If it is decided that it is not currently connected with the image server 303, a verification is executed in step S173 to ascertain whether or not the billing contract under which the communication system bills the telephone-integrated image storage apparatus 301 is a data volume-based billing contracts through which the telephone-integrated image storage apparatus 301 is billed based upon the volume of communicated data. If it is decided that the telephone-integrated image storage apparatus 301 is not under a data volume-based billing contract, it means that the telephone-integrated image storage apparatus 301 is to be billed based upon the length of communication time and accordingly, the batch transmission processing is executed in step S174 in order to save the communication fee. Through the batch transmission processing, a plurality of sets of original image data are temporarily saved at the control processing unit 309 for a batch transmission instead of immediately transmitting each set of original image data.

In step S175, a verification is executed to ascertain whether or not the current transmission interrupt has resulted in the volume of accumulated original image data temporarily saved at the control processing unit 309 reaching a predetermined volume. if it is decided that the volume of the accumulated data has not reached the predetermined volume, another verification is executed in step S176 to ascertain whether or not the number of sets of accumulated original image data has reached a predetermined value. If it is decided that the number of sets of accumulated original image data has not reached the predetermined value, a verification is executed in step S177 to ascertain whether or not the current image server transmission interrupt has been applied after the predetermined length of time elapsed on the timer.

If it is decided in step S177 that the transmission interrupt has resulted from the predetermined length of time having elapsed at the timer, the original image data is set for batch transmission processing and are transferred in a batch to the communication buffer 315 from the control processing unit 309 via the multiplex bus 308 in step S178. Then, in step S179, processing is executed to connect with the image server 303. Once a connection is established, the transmission of the original image data starts in step S180. In addition, in step S181, the timer is reset to clear the time count and start a new time count so as to enable the next image server transmission interrupt to be applied when the predetermined length of time elapses following the current transmission. Then, the operation waits in standby in step S182.

If, on the other hand, it is decided in step S172 that the telephone-integrated image storage apparatus 301 is currently connected with the image server 303 when the transmission interrupt is applied, the operation immediately skips to step S180 to start the transmission. In addition, if it is decided in step S173 that the telephone-integrated image storage apparatus 301 is under the data volume-based billing contract, the communication fee will not be saved by executing the batch transmission processing, and accordingly, the operation skips immediately to step S179 to start the processing to connect with the image server 303.

Also, if it is decided in step S175 that the volume of the accumulated or original image data has exceeded the predetermined volume or if it is decided in step S176 that the number of sets of accumulated original image data has exceeded the predetermined value, the operation immediately skips to step S178 to transfer the original image data having been set for batch transmission processing to the communication buffer 315 and in step S179, the processing to connect with the image server 303 is started.

It is to be noted that the image server transmission interrupt in the fourth embodiment described above may also be applied at a predetermined time point (e.g., at 5 am when there is little communication traffic). In such a case, a verification should be executed in step S177 to ascertain whether or not the predetermined time point has arrived resulting in the image server transmission interrupt, as well, and the operation should proceed to step S178 if an affirmative decision is made.

Fifth Embodiment

Figure 23:
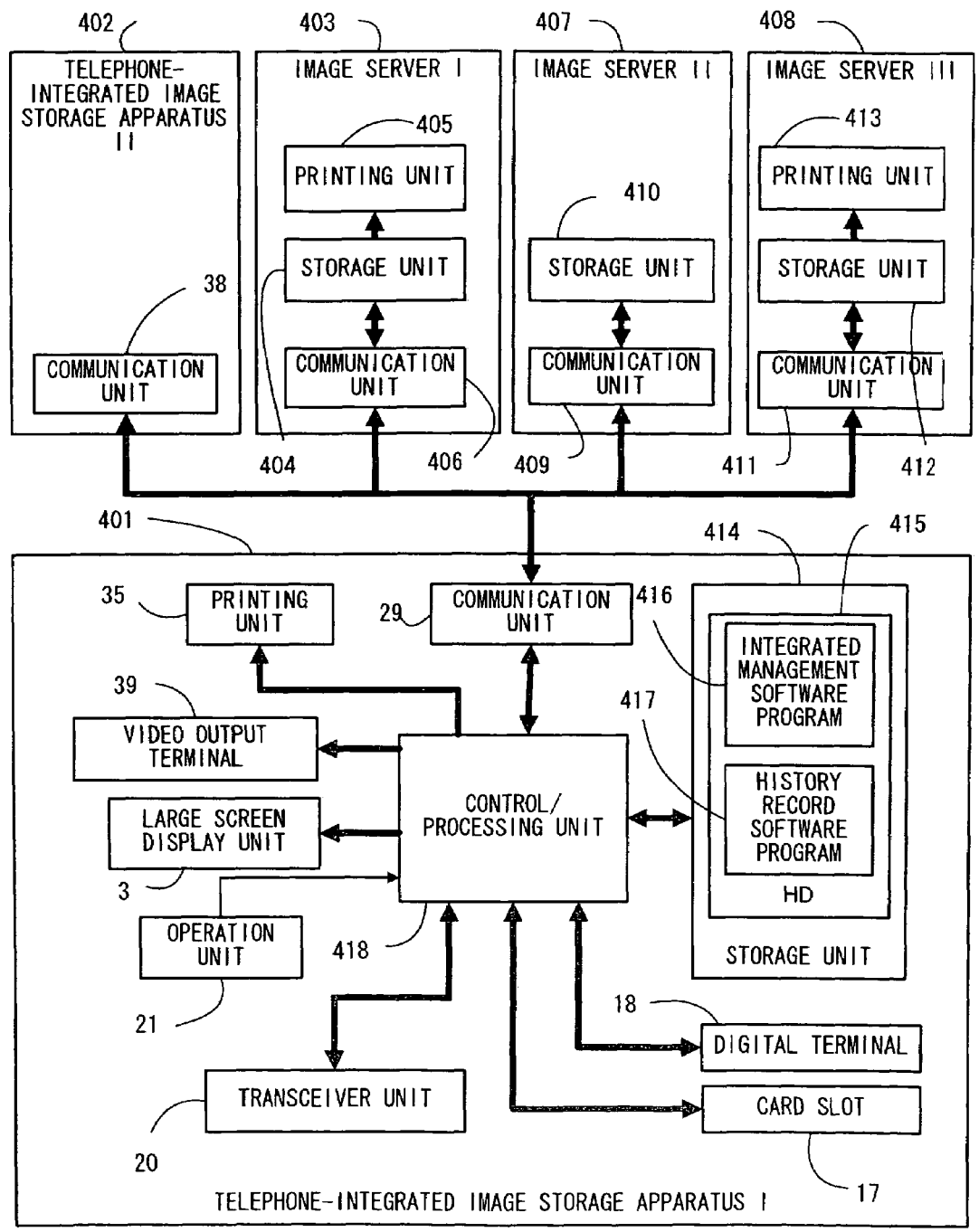
FIG. 23 is a block diagram showing the overall configuration of the system achieved in a fifth embodiment.

FIG. 23 is a block diagram showing the overall configuration adopted in the system in the fifth embodiment of the present invention. In FIG. 23, the same reference numerals are assigned to elements identical to those in the first embodiment shown in FIG. 2 to preclude the necessity for a repeated explanation thereof. In addition, while the camera unit 4, the audio processing unit 22, the speakers 7, the microphone 8 and the power supply unit 23 in FIG. 2 are also included in a telephone-integrated image storage apparatus 401 in the fifth embodiment, their illustration is not included in FIG. 23 and they are not explained repeatedly either. It is to be noted that since a second telephone-integrated image storage apparatus 402 adopts a structure identical to that of the telephone-integrated image storage apparatus 401, its structural features other than a communication unit 38 are not included in the figure for simplification. While a storage unit 404 at an image server 403 has a structure identical to that of the large capacity storage unit 32 in FIG. 2, it is simply referred to a sa "storage unit" in the description of the fifth embodiment and the image unit 33 and the history record unit 34 within the storage unit 404 are not shown in the figure. Also, a printing unit 405 that adopts a structure identical to that of the high quality image printing unit 36 at the image server 30 in FIG. 2 is simply referred to as a "printing unit". The image server 403 communicates with the telephone-integrated image storage apparatus 401 and other apparatuses in the system via a communication unit 406 similar to the communication unit 31 shown in FIG. 2.

In the fifth embodiment, which basically assumes a structure similar to that of the first embodiment, images are transmitted from the telephone-integrated image storage apparatus 401 to other image servers as well as the image server 403. As examples of the other image servers, a second image server 407 and a third image server 408 are shown in the figure. The second image server 407 does not have a printing unit although it includes a communication unit 409 similar to the communication unit at the first image server 403 and a storage unit 410 that manages images in compliance with a universal or common standard with which the first image server 403 also complies. The third image server 408, on the other hand, includes a communication unit 411 similar to that at the first image server 403, while its storage unit 412 executes image management in conformance to its own standard and its printing unit 413 is capable of providing special services such calendar creation.

At a hard disk 415 in the storage unit 414 of the telephone-integrated image storage apparatus 401, an integrated management software program 416 is installed. The integrated management software program 416 provides a high level of ease of use which allows the user to handle image data as if they were all stored at the storage unit 414 without having to remember specific image servers to which individual original images have been transmitted from the telephone-integrated image storage apparatus 401. In addition, a history record software program 417 stores in memory operation history records including information indicating which image servers the individual operations were performed in conjunction with. The functions of these software programs installed in the hard disk 415 are utilized by a control/processing unit 418.

The telephone-integrated image storage apparatus 401 may use a plurality of image servers under the following circumstances. First, if the image servers each offer a free image save service with a volume limit, the user of the telephone-integrated image storage apparatus 401 may use the plurality of image servers in combination without exceeding any of the free storage limits. In addition, even a paying user with sufficient storage capacity secured, he may still use a plurality of image servers for diverse services. If the telephone-integrated image storage apparatus 401 is shared by family members, a plurality of image servers may be used by the family members with different personal needs. The fifth embodiment enables centralized image management with the integrated management software program 416 even when a plurality of image servers are used under such circumstances.

FIG. 24 shows the structure of image data managed with the integrated management software program 416 at the storage unit 414 of the telephone-integrated image storage apparatus 401, and each set of image data includes a "integrated management ID", "management data", "storage image data" and "thumbnail data". The "integrated management ID", which is attached to each set of image data related to the telephone-integrated image storage apparatus 401 to enable a centralized management, is assigned in the order in which the specific images is stored at the telephone-integrated image storage apparatus 401.

The "management data" include various continents, i.e., an "entry date", an "originator", a "server name", a "server file No." and a "universal standard". For instance, the management data corresponding to the integrated management ID 1 includes the "entry date" indicating that the image data were stored on Oct. 16, 2001, and the "originator" field left blank indicating that the image was not received from the outside for storage but was originated at the telephone-integrated image storage apparatus 401 itself and was then stored. In addition, the "server name" indicates that the corresponding original image is saved at the first image server 403. It is to be noted that the first image server 403 assigns a "server file No." to each set of original image data saved in compliance with the universal standard. For instance, "01123401101601" obtained by attaching a code "01" assigned to the first image server to the beginning of the "file No." corresponding to the image ID 4 in FIG. 11 serves as the "server file No." corresponding to the integrated management ID 1 in FIG. 24. The code "01" assigned to the first image server is registered as universal ID information which as shared in the entire system, and the code is valid over the entire system as long as the universal standard is upheld.

The meaning of the third and subsequent digits in the "server file No.", i.e., "123401101601", has already been explained in reference to the file numbers in FIG. 11. It is to be noted that as explained earlier in reference to FIG. 11, instead of managing a plurality of types of information under a single "server file No.", the different types of information may be separately managed. "Yes" entered in the "universal standard" field indicates that the image data corresponding to the "integrated management ID 1" are managed in compliance with the universal standard.

The telephone-integrated image storage apparatus 401 identifies the original image data in correspondence to the "integrated management ID 1", ascertains its "server file No." based upon the conversion table in FIG. 24 and then accesses the image server 403, 407, 408 or the like. The image server 403, 407, 408 or the like having been accessed executes processing as instructed by the telephone-integrated image storage apparatus 401 on the original image data identified in correspondence to the "server file No.".

The "originator" of the image corresponding to the "integrated management ID 4" in FIG. 24 is the second telephone-integrated image storage apparatus 402 and thus the image was received from the outside and stored. In addition, the "server name" indicates that the image is saved at the first image server 403. The first two digits of the "server file No." i.e., "01", too, indicate the code assigned to the first image server 403, and the subsequent four digits are "1231" indicating the registration number of the second telephone-integrated image storage apparatus 402. This means that when images are managed among apparatuses in compliance with the universal standard adopted in the system, information indicating the same "originator" and the same "server name" as those separately entered as part of the management data is also included in the "server file No." of each image as long as the image has not been transferred by a party other than the party that registered the image.

The management data contain the "originator" and the "server name" separately entered in addition to the "server file No." so that the image can be managed smoothly even when it has been transferred and so that even image servers which do not comply with the universal standard can be managed with the integrated management software program 416 as part of this system. For instance, in the case of the image corresponding to the "integrated management ID 5" in FIG. 24, the original image data were transmitted from the first telephone-integrated image storage apparatus 401 to the third image server 408 which does not comply with the universal standard and assigns its own "server file No." to each set of original image data. Even under these circumstances, an integrated management is enabled by using the "integrated management ID" assigned at the telephone-integrated image storage apparatus 401 and adopting the data structure shown in FIG. 24.

The image data corresponding to the "integrated management ID 12" in FIG. 24 were taken in and stored within the first telephone-integrated image storage apparatus 401 itself and the corresponding original image is stored at the second image server 407. Since the second image server 407 manages images in compliance with the universal standard, the first two digits in the "server file No." are "05" which is the code assigned to the second image server 407. The subsequent four digits are "1234" indicating the registration number of the first telephone-integrated image storage apparatus 401. In short, the registration number of the first telephone-integrated image storage apparatus 401, i.e., "1234" is consistently used regardless of at which image server the image is saved, as long as compliance with the universal standard is maintained. The registration number is registered as common identification information valid in the entire system and can be used by all the image servers within the system.

While the "server file No." in FIG. 24 is assigned on the image server side in the explanation given above, the server file No. may instead be assigned on the telephone-integrated image storage apparatus side. However, the telephone-integrated image storage apparatus will need information with regard to the numbering rules to be followed when assigning the "server file No." and information with regard to the updated codes (e.g., "01" assigned to the first image server 403) currently assigned to the individual image servers within the system managed in compliance with the universal standard in such a case. In addition, the last two digits in the "server file No." will indicate the order in which the image was transmitted from the telephone-integrated image storage apparatus 401 instead of the order in which the image was received at the image server. Moreover, the following processing needs to be executed for the third image server 408 or the like, which does not comply with the universal standard. Namely, the "server file No." assigned at the telephone-integrated image storage apparatus 401 in compliance with the universal standard as described above needs to be converted to the file number inherent to the third image server when communicating with the third image server 408 by providing a conversion table in the integrated management software program 416.

Figure 25:
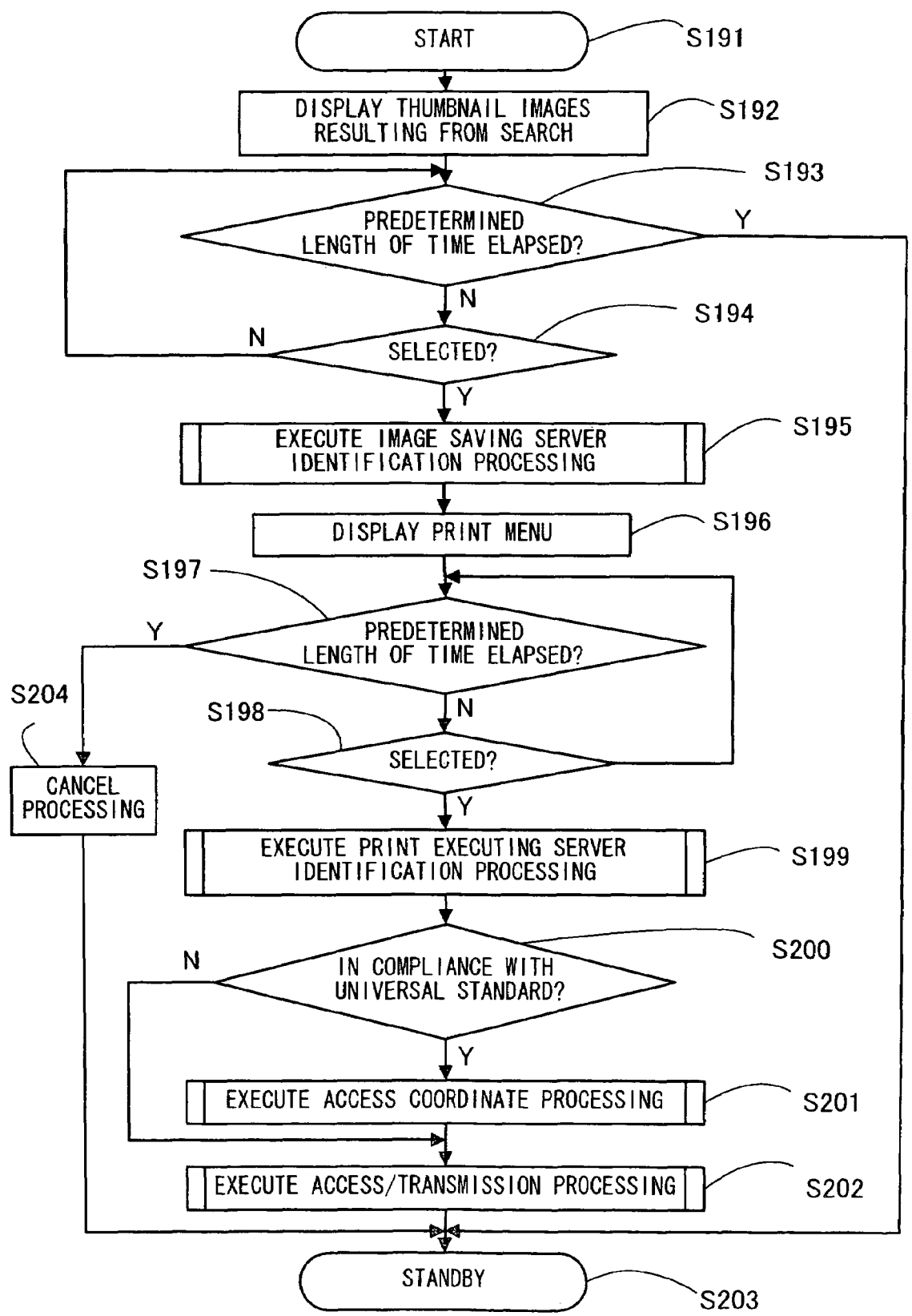
FIG. 25 presents a flowchart of the operation executed at the telephone-integrated image storage apparatus during print processing in the fifth embodiment.

FIG. 25 presents a flowchart of print processing executed at the telephone-integrated image storage apparatus 401 by using original image data corresponding to a thumbnail image among thumbnail images displayed after conducting an image search in the fifth embodiment.

After the results of a search executed in order to print an image are obtained and the processing flow starts in step S191, thumbnail images corresponding to all the image data hit through the search are displayed in step S192. It is to be noted that all the images assigned with integrated management IDs are searched during the search operation. In other words, the search is conducted over a plurality of image servers. In addition, unless specific search conditions are set, original image data are searched irrespective of at which image servers they are saved. For this reason, the original image data corresponding to the thumbnail images displayed in step S191 based upon the search results may be saved at a plurality of image servers.

It is to be noted that if a specific image server at which the desired original image data are saved is known in advance, the search may be executed by incorporating the identity of the image server in the search key. In such a case, the original image data corresponding to the thumbnail images displayed in step S191 based upon the search results are all saved at the image server satisfying the search conditions.

In step S193, a verification is executed to ascertain whether or not a predetermined length of time has elapsed after the thumbnail image display was brought up on display, and if it is decided that the predetermined length of time has not elapsed, a verification is executed in step S194 to ascertain whether or not a thumbnail image has been selected. If a specific thumbnail image has not been selected, the operation returns to step S193 and subsequently, the processing in step S193 and the processing in step S194 are repeatedly executed until the predetermined length of time elapses. It is to be noted that the user can select a desired thumbnail image regardless of at which image server the corresponding original image data are saved.

If it is decided in step S194 that a thumbnail image has been selected, processing is executed in step S195 to identify the image server at which the corresponding original image data are saved and the identification results are saved. In the following step S196, a menu of printing functions available in the system is displayed. This print menu includes all the services provided by all the image servers participating in the system, instead of listing only the services available at the image server identified instep S195. However, any service that cannot be offered in conjunction with the original image data corresponding to of the thumbnail image, the selection of which has been verified in step S194, is not included in the display. For instance, if the resolution of the original image data is low, there is no point in displaying a high resolution print service offered at a high resolution level greatly exceeding the resolution of the original image data and, accordingly, the high resolution print service is excluded from the menu. In addition, there is no point in displaying a high quality image print service if a high quality image print right has not been granted with regard to the image, and accordingly, the high quality image print service is excluded from the menu displayed in step S196 at as well.

In step S197, a verification is executed to ascertain whether or not a predetermined length of time has elapsed after the menu display was brought up, and if it is decided that the predetermined length of time has not yet elapsed, a verification is executed in step S198 to ascertain whether or not a selection has been made in the menu. If it is decided that a selection has not been made, the operation returns to step S197, and subsequently, the processing in step S197 and the processing in step S198 are repeatedly executed until the predetermined length of time elapses. It is to be noted that a desired service can be selected in the menu completely irrespective of at which specific image server the service is available. Thus, even a service that cannot be provided by the image server having saved therein the original image data can be considered as an option.

If it is decided in step S198 that a selection has been made in the menu, processing is executed in step S199 to identify an image server capable of executing the printing operation corresponding to the service selected in the menu and the results of the identification are saved. If there are a plurality of image servers capable of executing the service selected in the menu, they are ranked in the order of preference. This order is automatically determined based upon user preferences specified in advance, by giving top priority to the optimal convenience to be achieved in original image data transfer or the optimal convenience to be achieved in print delivery, or based upon the availability of the service at the individual servers.

In step S200, a verification is executed to ascertain whether or not all the image servers identified in step S195 step S199 are in compliance with the universal standard. If it is decided that they are all in compliance with the universal standard, access coordinate processing is executed in step S201. If the original image data are saved at an image server other than the image server that is to execute the printing operation, for instance, one of the image servers is specified as the representative server to be accessed through this processing. As a result, since the involved image servers in compliance with the universal standard exchange information needed to execute the printing operation and the printing operation is executed accordingly, the telephone-integrated image storage apparatus 401 only needs to access a single image server. If the telephone-integrated image storage apparatus 401 appoints in advance an image server to function as a liaison, this liaison image server is always specified as the server to be accessed in the access coordinate processing executed in step S201 and the liaison image server provides all the directions for the involved image servers to execute the operation as ordered by the telephone-integrated image storage apparatus 401. If, on the other hand, a liaison image server is not appointed in advance, the image server to execute the printing operation is appointed to function as the access liaison, since it is more logical to appoint the image server to execute the final processing as the liaison from the viewpoint of fee collection.

In step S202, processing to access the selected accessee and transmit to the details of the order is started, and then, the operation waits in standby in step S203. It is to be noted that if it is decided in step S200 that an image server which is not in compliance with the universal standard is involved, the print execution cannot be directed by fully engaging the integrated system functions and, accordingly, the operation skips step S201 and executes processing to access all the individual image servers identified in step S195 and step S199 and transmit the details of the order to them. In this case, the overall execution of the image printing operation is coordinated by the integrated management software program 416.

It is to be noted that if it is decided in step S193 that the predetermined length of time has elapsed without a thumbnail image selection, the operation jumps to step S203 to enter a standby state. In addition, if it is decided in step S197 that the predetermined length of time has elapsed without a selection having been made in the menu, the operation proceeds to step S204 to cancel the identification processing executed in step S195 to identify the image server having the image saved therein and then the operation jumps to step S203 to enter a standby state.

Figure 26:
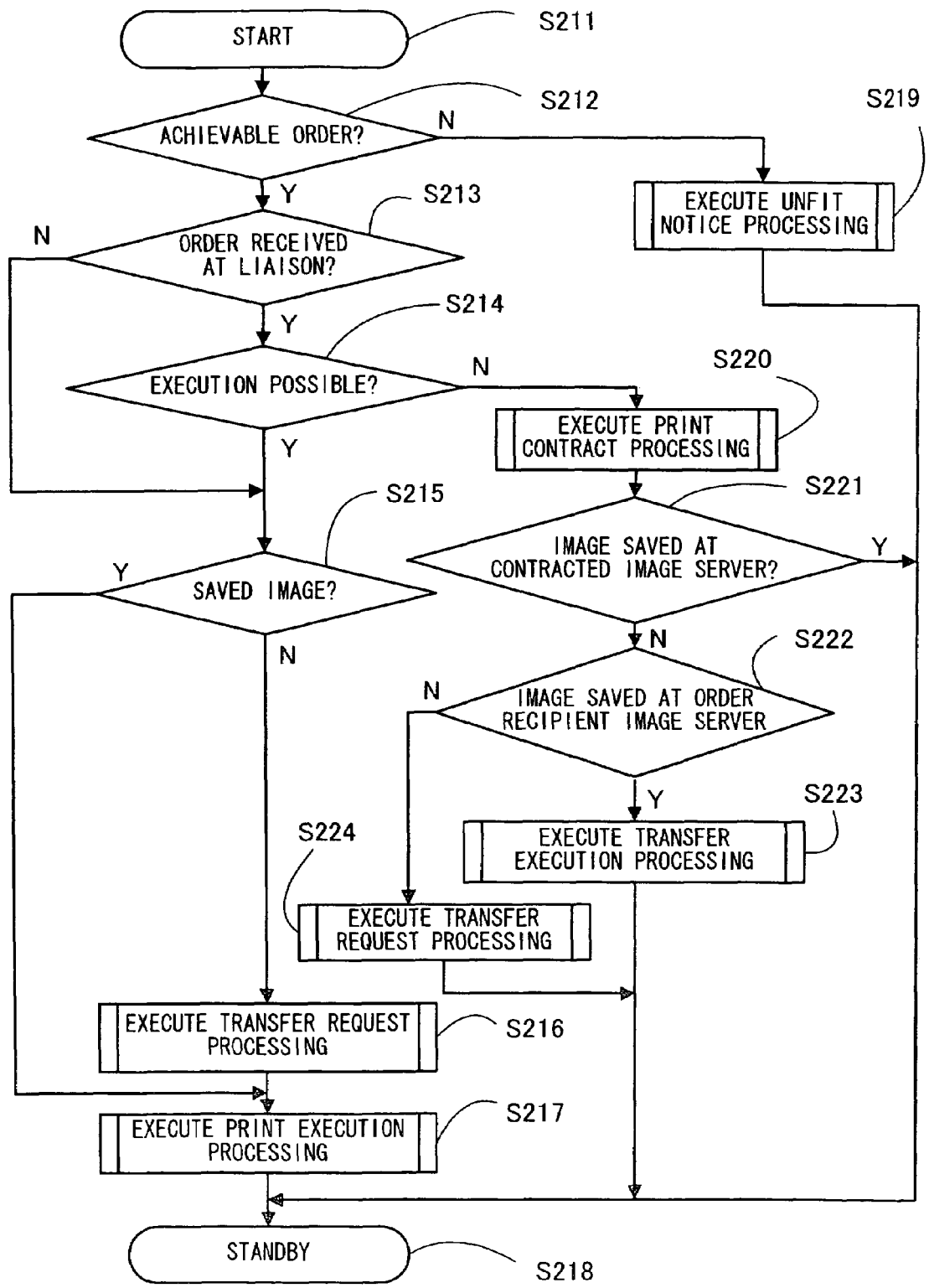
FIG. 26 presents a flowchart of the operation executed at an image server in compliance with the universal standard in the fifth embodiment.

FIG. 26 presents a flowchart of the operation executed at the first image server 403 or the second image server 403 in compliance with the universal standard in the fifth embodiment. After the operational flow starts in step S211 as the image server receives a print order from the telephone-integrated image storage apparatus, a verification is executed in step S212 to ascertain whether or not the order is an achievable order. The verification as to whether or not the order is "achievable" is executed to ascertain whether or not the order has been placed by a party having the print right granted with regard to the specific image, whether or not the order has been placed to print an image that can be printed without violating the copyright or the like. In addition, the order is a double checked to ensure that an inappropriate printing operation has not been ordered, e.g., a high resolution print order placed for original image data with low resolution.

If it is decided that the order is an achievable order, a verification is executed in the following step S213 to ascertain whether or not the order has been placed to a liaison. When an order is "placed to a liaison", the image server receiving the order has been appointed to function as a liaison with regard to the particular order. If the order has been placed to the liaison, the operation proceeds to step S214 to execute a verification as to whether not the order can be filled at the image server having received the order. This verification needs to be executed, since there is a possibility that in the case of an order received at the liaison, the order may not be achievable at the liaison server. If it is decided that the order can be filled at the liaison server, the operation proceeds to step S215 to execute a verification to ascertain whether or not the original image data to be printed are saved at the liaison image server itself.

If it is decided in step S215 that the original image data to be printed are not saved at the image server having received the order, the operation proceeds to step S216 to execute transfer request processing to request a data transistor from another image server at which the original image data to be printed are saved. Then, once the original image data are obtained, print execution processing is executed in step S217 and then the operation enters a standby state in step S218. If, on the other hand, it is decided in step S215 that the original image data to be printed are saved image server having received the order, the operation immediately proceeds to step S217 to start the print execution processing on the original image data held at the image server having received the order.

If it is decided in step S212 that the order is not an achievable order, processing is executed in step S219 to issue an "unfit" notice. There are two types of "unfit" notice processing. One of them is processing through which a notice indicating that order cannot be filled is issued to the party having placed the order. The other type of "unfit" notice processing is executed to report an illegal act such as a copyright violation to a third party such as a regulating authority or the like. After the "unfit" notice processing is completed, no further action is taken with regard to the particular order and, and instead, the operation jumps to step S218 to wait in standby.

In addition, if it is decided in step S213 that the order has not been placed to the liaison, it means that the order has been placed to an image server capable of executing the printing operation. Accordingly, the operation immediately proceeds to step S215 since an order is never placed to an image server not capable of filling the order unless the image server has been appointed to function simply as a liaison.

In the case of an order transmitted to the liaison, if it is decided in step S214 that the order cannot be filled at the image server having received the order, processing is executed in step S220 to entrust another image server within the system that is capable of filling the order to execute the printing operation. In addition, a verification is executed in step S221 to ascertain whether or not the image server to execute the printing operation has saved therein the original image data to be printed. If it is decided that the original image data are not saved at the image server assigned to execute the printing operation, a verification is executed in step S222 to ascertain whether or not the original image data are saved at the image server having received the order. If the data are saved at the image server having received the order, processing is executed in step S223 to transfer the original image data to the image server assigned to execute the printing operation. If, on the other hand, the original image data to be printed are not saved at the image server having received the order, and the operation shifts to step S224 to execute transfer request processing to request a transfer of the original image data to be printed from another image server having the original image data saved therein to the image server assigned to execute the printing operation. If it is decided in step S221 that the image server assigned to execute the printing operation has saved therein the original image data to be printed, no further coordination is necessary and, accordingly, the operation jumps directly to step S218. If the image server acting as liaison cannot fill a print order it has received, the image server fulfills its responsibility as the liaison by directing another image server within the system to fill the order as described above.

Figure 27:
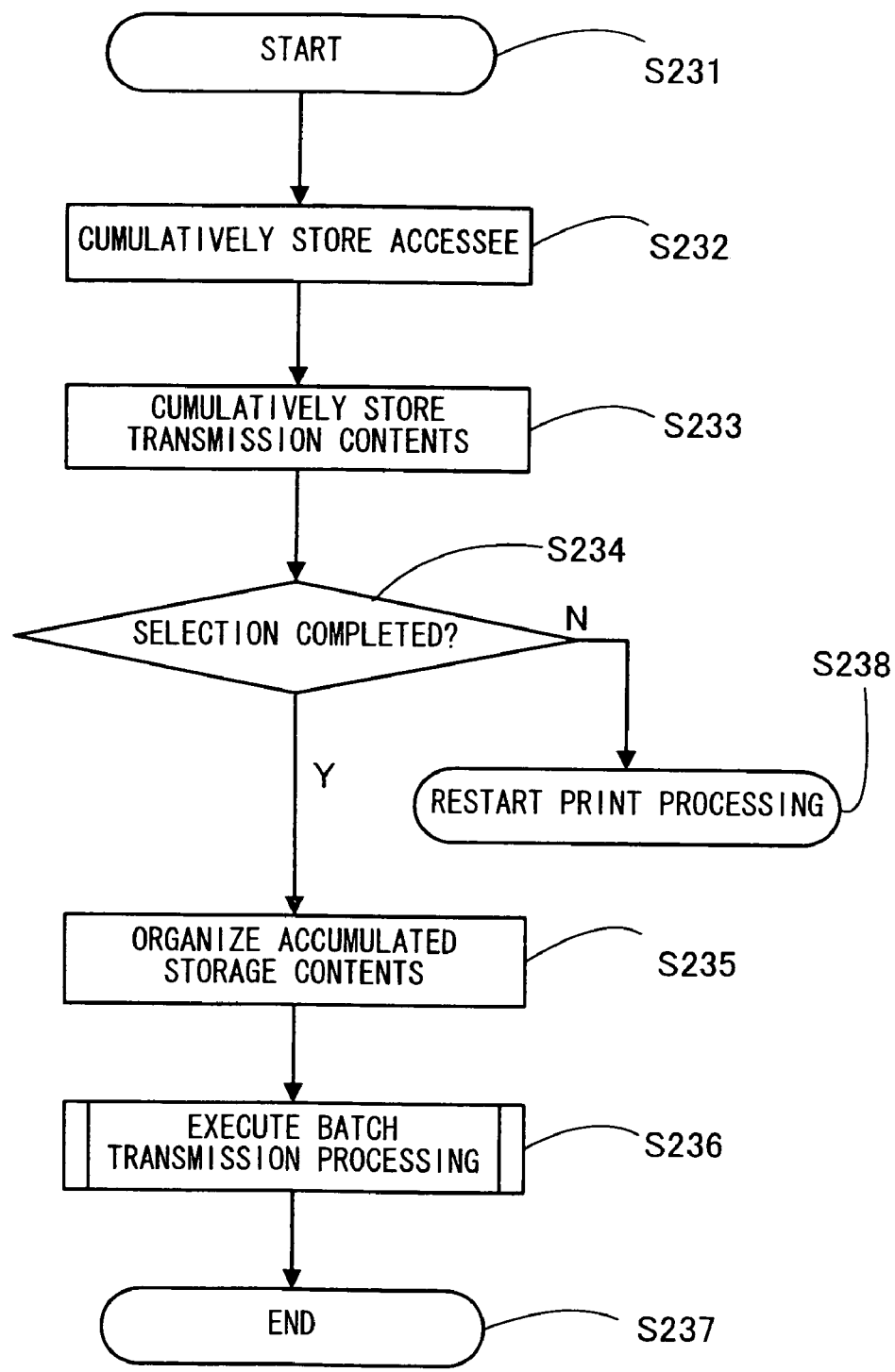
FIG. 27 presents a detailed flowchart of the access/transmission processing in FIG. 25.

FIG. 27 presents a detailed flowchart of the access/transmission processing executed in step S202 in FIG. 25, which is also effective when processing an order to have a plurality of images printed. As the operation proceeds to step S202 in FIG. 25, the flow shown in FIG. 27 starts in step S231, and then the accessee is cumulatively stored into memory in step S232. The meaning of the term "cumulative" storage is to be explained later. Next, in step S233, the details of the menu selection made in step S198 are cumulatively stored in memory. The details of the menu selection stored at this time include instructions with regard to the image quality, the paper size, the number of copies to be made, the color tone adjustment and the like.

In step S234, a verification is executed to ascertain whether or not an instruction indicating that all the thumbnail images corresponding to images to be printed have been selected has been issued. If it is decided that all the thumbnail images have been selected, the accumulated storage contents are organized in step S235 and then batch transmission processing is executed in step S236 before ending the access/transmission processing in step S237. The meanings of the terms "organize the cumulative storage contents" and "batch transmission" are also to be explained later.

If it is decided in step S234 that an instruction indicating that the thumbnail selection has been completed has not been issued, there is still a thumbnail image to be selected for the printing operation. Accordingly, an instruction is issued in step S238 to restart the print processing. In response, the print processing in FIG. 25 restarts in step S191. In step S192, thumbnail images are displayed again based upon the results of the search. The display is similar to the display initially brought up in step S192.

As described above, until it is determined in step S234 in FIG. 27 that an instruction indicating a thumbnail selection completion has been issued, the processing in step S191 through step S202 in FIG. 25 is repeatedly executed and a thumbnail image is selected each time step S194 is executed. Each time the processing is executed, the accessee and the details of instructions to be transmitted to the accessee are cumulatively stored into memory respectively in step S232 and in step S233 in correspondence to the new image selected in step S194.

In step S235, the data "cumulatively" stored as described above are organized to group together images to be handled at the individual recipients and group together identical instructions to be transmitted. In addition, in step S236, the plurality of images are transmitted in a batch transmission to various accessees. Thus, in response to a single operation performed to indicate that the thumbnail selection has been completed, the processing from step S234 to step S236 is executed to transmit the instructions in a batch without requiring the user to perform individual transmission operations to transmit the instructions to different accessees.

It is to be noted that the display brought up at the large screen display unit 3 in steps S195 through S202 while repeatedly executing steps S191 through S202 in FIG. 25 may adopt either of the following two modes. In one mode, the image corresponding to the thumbnail image selected in step S194 is displayed in an enlargement over the entire large screen display unit 3 and a superimposed display of the menu is brought up in step S196. In the second display mode, after a specific thumbnail image is selected in step S194, the display of the thumbnail images remains on the screen but the selected thumbnail image is displayed in a manner distinguishable from the rest of the thumbnail images. Then, in step S196, the menu is displayed under the selected thumbnail image. In the second display mode, as the processing in step S191 through step S202 is repeatedly executed, individual images having been selected and the results of the corresponding menu selections can be checked at-a-glance at all times. In addition, the user may also will be allowed to correct his selection by checking the display adopting this display mode.

Figure 28:
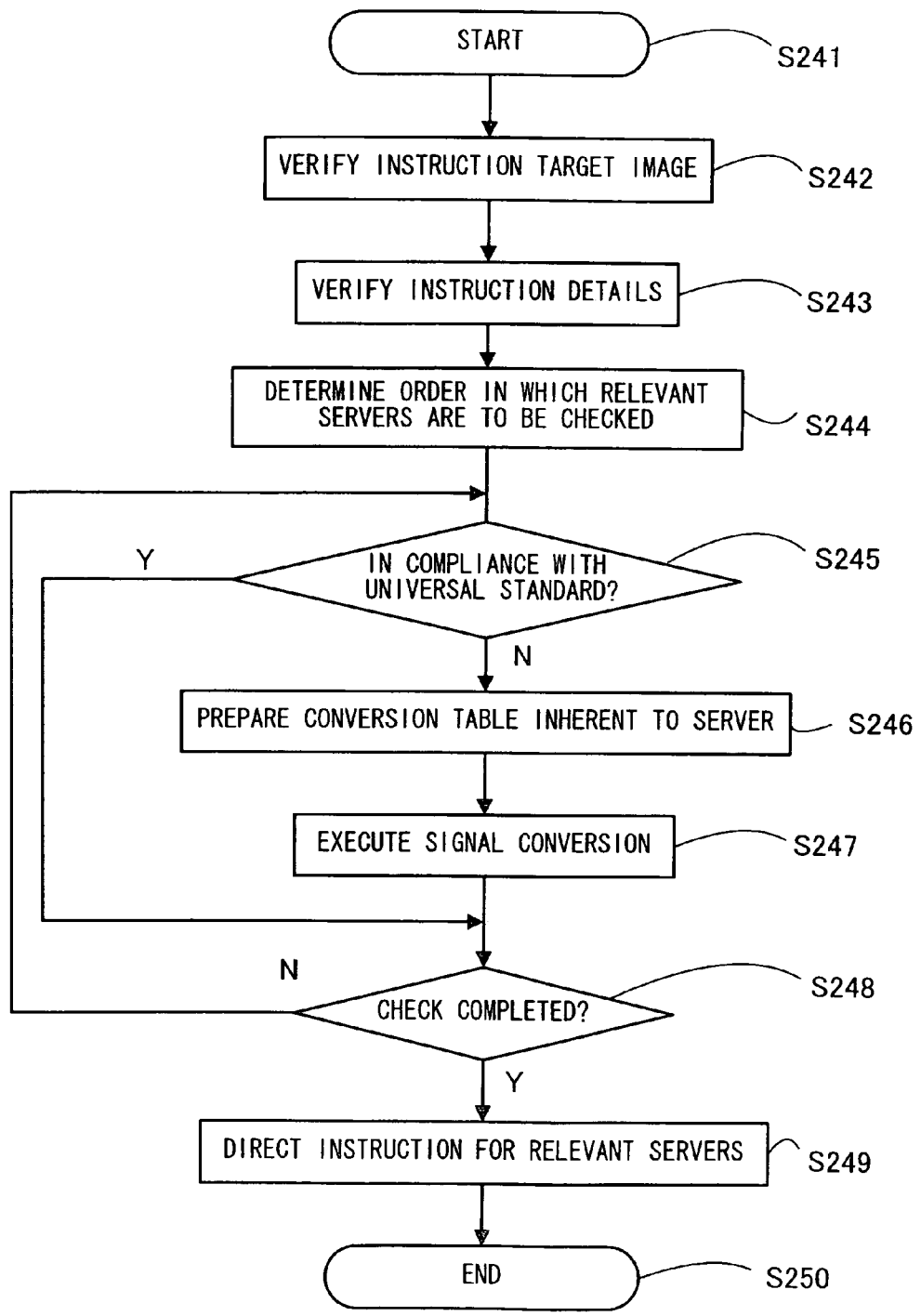
FIG. 28 presents a flowchart of the instruction dispatching operation constituting part of the batch transmission processing in FIG. 27.

FIG. 28 presents a flowchart of instruction dispatch processing which is part of the batch transmission processing executed in step S236 in FIG. 27. An image server which complies with the universal standard follows various instructions based upon standardized signals and rules and thus can perform an operation as instructed in direct response to a signal output by the telephone-integrated image storage apparatus 401. However, an image server with its own inherent standard may conform to different signal/instruction rules and, in such a case, it cannot respond to a universal standard compliant signal. Through the processing shown FIG. 28, an instruction can be carried out smoothly even at an image server that manages images in conformance to its own standard.

At an initial stage of the batch transmission processing, the flow of the instruction dispatch processing shown in FIG. 28 is executed for each of the target images. Accordingly, as long as there is any image that has not undergone the instruction dispatch processing, the processing in step S24 through step S250 is repeated and once the instruction dispatch processing for all the batch transmission target images is completed, the operation proceeds to the next step in the batch transmission processing.

After the flow of the processing on a given image starts in step S241, the instruction target image data are verified in step S242 and then, the instruction contents corresponding to the image data are verified in step S243. Based upon the results of the verifications, the image servers that are involved in the execution of the instructions for the image are identified and the order in which the image servers are to be checked is determined in step S244.

In step S245, a verification is executed to ascertain whether or not the first image server is in compliance with the universal standard. If it is decided that the image server is not in compliance with the universal standard, the operation proceeds to step S246 to prepare a signal conversion table for the server. Then, in step S247, the instruction signal which is in compliance with the universal standard is converted to an instruction signal inherent to the server. As a result, even though the operation is initially executed with the universal standard instruction signal, an instruction signal inherent to the image server is transmitted to the image server. If signals in the signal conversion table prepared in step S246 are changed due to an upgrade at the image server side, the latest version of the signal conversion table can be downloaded by contacting the maintenance service center for the telephone-integrated image storage apparatus 401 on the Internet or the like.

In step S248, a decision is made as to whether or not all the relevant servers have been checked and if it is decided that there is no more image server to be checked, the operation proceeds to step S249 to dispatch the instruction for the related server with the instruction signal and the instruction dispatch processing for the image ends in step S250.

If, on the hand, it is decided in step S245 that the image server being checked is in compliance with the universal standard, the signal does not need to be converted and thus, the operation jumps to step S248. In addition, if it is decided in step S248 that there is another image server to be checked, the operation returns to step S245 and subsequently, the processing in step S245 through step S248 is repeatedly executed until all the image servers are checked.

While a detailed explanation is given above in reference to FIGS. 25 through 28 on an example in which images are printed in the system achieved in the fifth embodiment, the advantages of the fifth embodiment can be realized in conjunction with various other services that may be provided by a plurality of image servers as well as in the print service. The benefits of the universal standard adopted to enable a plurality of image servers to work in conjunction and the management achieved with the integrated management software program 416 including services that do not comply with the universal standard remain valid when providing services other than the print service.

Sixth Embodiment

FIG. 29 shows the layouts of display screens brought up at the large screen display unit 3 of the image storage apparatus achieved in the sixth embodiment of the present invention. Since the sixth embodiment is basically similar to the fifth embodiment and the overall system configuration is similar to that shown FIG. 23, the illustration of the system achieved in the sixth embodiment is omitted and an explanation is given in reference to FIG. 23. While the telephone-integrated image storage apparatus 401 in the sixth embodiment, too, transmits images to a plurality of image servers 403, 407, 408 and the like, the functions of the integrated management software program 416 in the sixth embodiment differ from those in the fifth embodiment. Namely, since the screens laid out by the integrated management software program 416 are displayed at the large screen display unit 3 and operations are performed in conformance to the management method in compliance with the universal standard, screens with layouts inherent to the individual image servers are never brought up on display in the fifth embodiment. In contrast, screen configurations and management methods inherent to the individual image servers are retained in the sixth embodiment. FIG. 29 is provided to illustrate this point.

FIG. 29(A) shows the layout of the screen initially brought up on display when the image management function of the telephone-integrated image storage apparatus 401 is engaged, which includes icons 501, 502, 503 and 504 corresponding to a plurality of image servers. The designs of the icons vary among the individual image servers. If the user wishes to access the first image server, the user operates the corresponding icon 501 to open a special operation screen of the first image server and the subsequent operation can be performed by following instructions provided on the screen. The layout of the operation screen opened as described above and instructions provided on the screen also vary from one image servers to another.

It is to be noted that only the icons of image servers having saved therein original image data that can be accessed by the telephone-integrated image storage apparatus 401 are displayed, at the large screen display unit 3. Accordingly, the icon of an image server at which accessible image information has been saved for the first time is automatically added to the display at the large screen display unit 3. For instance, when an image has been transmitted with a save request to a given image server or when access-right inclusive storage image data have been received for the first time from a third party, the icon display corresponding to the image server is automatically added. If, on the other hand, accessible image information at an image server is depleted through an image delete operation or the like, the display of the icon is automatically deleted from the screen at the large screen display unit 3. Thus, with the at-a-glance display of the accessible image servers at the large screen display unit 3, a reliable and efficient image management is enabled while respecting the screen layouts and management methods inherent to the individual image servers. In other words, any image data transmitted to an external image server with a save request are guaranteed to be present at one of the image servers included in the at-a-glance display at the large screen display unit. In addition, since no irrelevant image server is displayed in the screen by mistake, no redundant operation needs to be performed.

It is to be noted that instead of displaying/clearing image icons as described above, the following mode may be adopted. Namely, all the image servers that can be used are first displayed at the large screen display unit, and display control is then implemented to differentiate the display mode adopted for image servers having accessible image information saved therein by using a different display color or the like from the display mode adopted for the rest of the image servers. In this case, it is possible to identify the relevant image servers with ease, and when transmitting an image to an image server for the first time, the transmission operation can be initiated from the same screen without having to switch to another screen. In this mode, too, if accessible image information has been saved at an image server for the first time or if an image server has run out of accessible image information, the display mode adopted for the image server should be automatically altered.

In another mode of implementation, when the available image servers are all first brought up on display at the large screen display unit, operations may be enabled in the display screen through a graphical user interface (GUI) and in such a case, instructions may be allowed to be directed only to the icons of image servers having saved therein accessible image information. The ease of operation can be improved in a similar manner by altering the functions instead of altering the icon display, as described above. In this embodiment, too, instructions for the icon of an image server at which accessible image information has been saved for the first time should be enabled automatically and instructions for the icon of an image server having run out of accessible image information should be automatically disabled.

In the sixth embodiment described above, a detection should be executed to ascertain that accessible image information has been saved for the first time at a given image server or that a given image server has run out of accessible image information based upon the history records of image transmission/reception operations and delete operations stored in the history record software program 417.

While the display mode shown in FIG. 29(B) is basically similar to that shown in FIG. 29(A), the designs of icons 505, 506, 507 and 508 are standardized by converting the instruction signals and the layouts of the operation screens to be opened from the icons and the instructions provided in the screens are also standardized so as to eliminate the need to conform to the individual instruction methods which vary among image servers.

The functions achieved in the various embodiments may be realized in an application program installed in a computer, and in such a case, the computer in which the application program is installed and peripheral devices connected to the computer as necessary constitute any one of the apparatuses described above. Accordingly, the application program itself, which is distributed on the Internet or the like in order to achieve the functions of the present invention or a recording medium such as a CD ROM having recorded therein the application program, too, are within the scope of the present invention.

Figure 30:
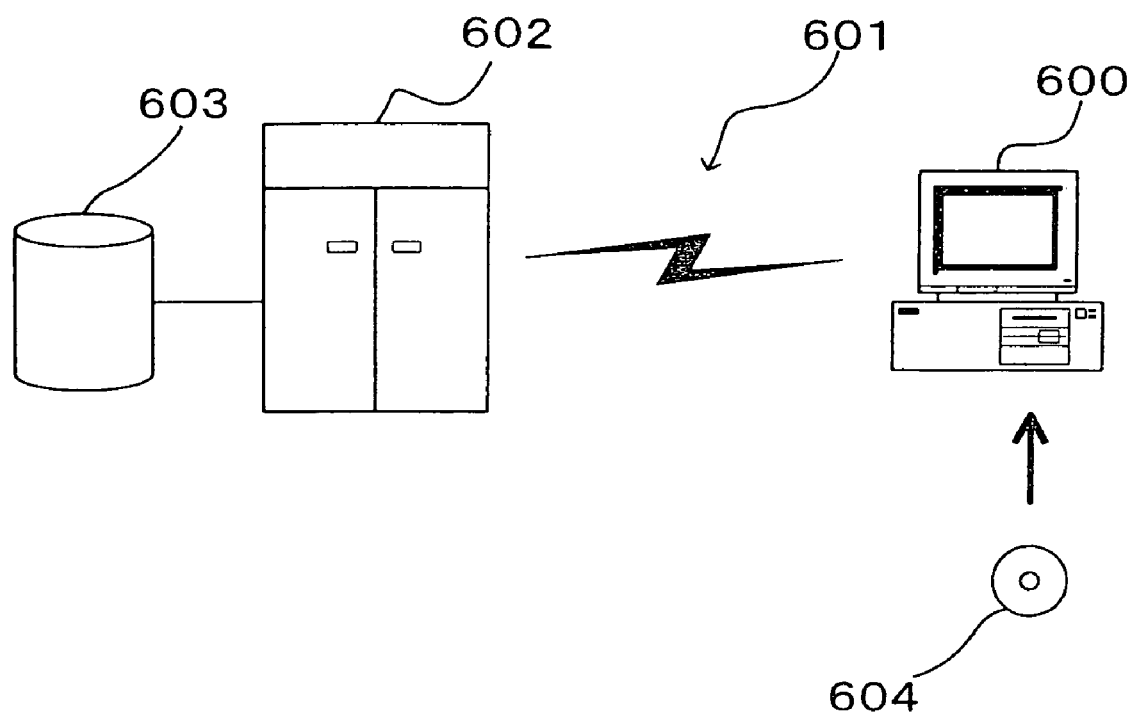

FIG. 30 shows how the application program may be provided in a recording medium such as a CD ROM or through a data signal on the Internet or the like. A personal computer 600 receives the application program via a CD-ROM 604. The personal computer 600 has a function which enables a connection with a communication line 601. A computer 602 is a server computer that provides the application program stored in a recording medium such as a hard disk 603. The communication line 601 is a communication line for Internet communication or personal computer communication or it may be a dedicated communication line. The computer 602 reads out the application program from the hard disk 603 and transmits the application program to the personal computer 600 via the communication line 601. Namely, the application program is embodied as a data signal on a carrier wave to be transmitted via the communication line 601. In short, the application program can be provided as a computer-readable computer program product adopting any of various modes including a recording medium and a carrier wave.

While image data and the like are exchanged through a telephone connection in the embodiments described above, the image data and the like may be exchanged by adopting another communication method. For instance, data may be transmitted via the Internet. In other words, data exchange through electronic mail is not limited to the third embodiment.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

The invention claimed is:

1. An image storage system comprising:
an image storage apparatus; and
a supporting apparatus, wherein:
the image storage apparatus comprises:
an input unit to which image information is input,
an image display unit,
a first communication unit,
a management unit that executes management so that the input image information is transmitted from the first communication unit in automatic response to an input of the image information to the input unit,
an information holding unit that holds the input image information until a transmission thereof is completed and then automatically discards the input image information after the transmission is completed in response to the management unit,
an information storage unit at which related information corresponding to the image information having been transmitted is stored even after the transmission is completed, the related information including display-image information created based upon the image information to be displayed on the image display unit with a resolution level which is lower than a resolution level of the image information and is high enough for display over an entire screen of the image display unit, and an instruction unit that issues an instruction via the first communication unit with regard to processing to be executed on the image information based upon the related information stored at the information storage unit; and the supporting apparatus comprises:

a second communication unit, an image storage unit at which the image information from the first communication unit having been received at the second communication unit is stored, and a processing unit that executes processing on the image information stored at the image storage unit based upon the instruction received at the second communication unit from the first communication unit.

2. An image storage system according to claim 1, wherein:

the image storage apparatus further comprises an information creation unit that creates the related information based upon the image information input to the input unit.

3. An image storage system according to claim 1, wherein:

the supporting apparatus further comprises an information creation unit that creates the related information based upon the image information received at the second communication unit; and the first communication unit receives the related information from the second communication unit.

4. An image storage system according to claim 2, wherein:

the information creation unit creates the display-image information with an information volume smaller than an information volume of the image information based upon the image information.

5. An image storage system according to claim 1, wherein:

the image storage apparatus further comprises an input instruction unit that issues an instruction for an individual input of the image information and a transmission instruction unit that issues an instruction for an image transmission; and the management unit manages individual sets of image information so that if an instruction is issued by the input instruction unit, the input image information is transmitted without any instruction from the transmission instruction unit.

6. An image storage system according to claim 5, wherein:

the management unit selects a first transmission mode in which a transmission of each set of image information is started in response to the input instruction unit or a second transmission mode in which a plurality of sets of image information are transmitted in a batch.

7. An image storage system according to claim 6, wherein:

the management unit implements management so as to execute a transmission in the first transmission mode when the first communication unit is currently connected with the second communication unit and to execute a transmission in the second transmission mode when the first communication unit is not currently connected with the second communication unit.

8. An image storage system according to claim 6, wherein:

the management unit implements management so as to execute a transmission in the first transmission mode when a communication fee is billed to the first communication unit based upon a data volume of image information and to execute a transmission in the second transmission mode when the communication fee is billed to the first communication unit based upon a length of communication time.

9. An image storage system according to claim 1, wherein:

the management unit implements management so that as image information held at the information holding unit comes to satisfy a predetermined condition, the image information is transmitted from the first communication unit in response.

10. An image storage system according to claim 9, wherein:

the management unit implements management so that when a predetermined length of time elapses following a previous transmission of image information, the image information held at the information holding unit is transmitted to an outside recipient from the communication unit even if the image information does not satisfy the predetermined condition.

11. An image storage system according to claim 9, wherein:

the management unit implements management so that the information held at the information holding unit is transmitted to an outside recipient from the communication unit at a predetermined time point even if the image information does not satisfy the predetermined condition.

12. An image storage system according to claim 9, wherein:

the predetermined condition stipulates that a number of sets of image information held at the information holding unit has reached a predetermined value.

13. An image storage system according to claim 9, wherein:

the predetermined condition stipulates that a total data volume of image information held at the information holding unit has reached a predetermined quantity.

14. An image storage apparatus comprising:

an input unit to which image information is input;

an image display unit;

a communication unit;

a management unit that executes management so that the input image information is transmitted from the communication unit to an outside recipient in automatic response to an input of the image information to the input unit;

an information holding unit that holds the input image information until a transmission thereof is completed and then automatically discards the input image information after the transmission is completed in response to the management unit;

an information storage unit at which related information corresponding to the image information having been transmitted is stored even after the transmission is completed, the related information including display-image information created based upon the image information to be displayed on the image display unit with a resolution level which is lower than a resolution level of the image information and is high enough for display over an entire screen of the image display unit; and an instruction unit that issues an instruction for the outside recipient via the communication unit with regard to processing to be executed on the image information based upon the related information stored at the information storage unit.

15. An image storage apparatus according to claim 14, further comprising:
an information creation unit that creates the related information based upon the image information input to the input unit.

16. An image storage apparatus according to claim 15, wherein:
the information creation unit creates the display-image information with an information volume smaller than an information volume of the input image information based upon the input image information.

17. An image storage apparatus according to claim 14, wherein:
the communication unit receives the related information from the outside recipient.

18. An image storage apparatus according to claim 17, wherein:
the related information received at the communication unit is the display-image information with an information volume smaller than an information volume of the image information which is created at the recipient based upon the image information having been transmitted thereto.

19. An image storage apparatus, comprising:
an input unit to which image information is input;
an image display unit;
a communication unit;
a management unit that implements management so as to transmit the input image information provided from the input unit to an outside recipient via the communication unit; and
a storage unit at which display-image information created based upon the input image information to be displayed on the image display unit with a resolution level which is lower than a resolution level of the image information and is high enough for display over an entire screen of the image display unit after the image information is input is stored.

20. An image storage apparatus according to claim 19, further comprising:
an instruction unit that issues an instruction via the communication unit for the outside recipient to process the image information, based upon the display-image information stored at the storage unit.

21. An image storage apparatus according to claim 19, further comprising:
an information creation unit that creates the display-image information with an information volume smaller than an information volume of the input image information based upon the input image information.

22. An image storage apparatus according to claim 19, wherein:
the communication unit receives the display-image information from the outside recipient to which the input image information has been transmitted.

23. An image storage apparatus according to claim 19, further comprising:
an input instruction unit that issues an instruction for the image information to be input individually; and
a transmission instruction unit that, issues an instruction to transmit an image, wherein the management unit implements management for individual sets of image information so as to transmit the input image information to an outside recipient from the communication unit without an instruction from the transmission instruction unit if an instruction has been issued by the input instruction unit.

24. An image storage apparatus according to claim 23, wherein:
the management unit selects a first transmission mode in which a transmission of each set of image information is started in response to the input instruction unit or a second transmission mode in which a plurality of sets of image information are transmitted in a batch.

25. An image storage apparatus according to claim 24, wherein:
the management unit implements management so as to execute a transmission in the first transmission mode when the communication unit is currently connected with the outside recipient and to execute a transmission in the second transmission mode when the communication unit is not currently connected with the outside recipient.

26. An image storage apparatus according to claim 24, wherein:
the management unit implements management so as to execute a transmission in the first transmission mode when a communication fee is billed to the communication unit based upon a data volume of image information and to execute a transmission in the second transmission mode when the communication fee is billed to the first communication unit based upon a length of communication time.

27. An image storage apparatus according to claim 19, further comprising:
an information holding unit that holds the image information input to the input unit, wherein
the management unit implements management so as to transmit the image information held at the information holding unit to an outside recipient from the communication unit when the image information has come to satisfy a predetermined condition.

28. An image storage apparatus according to claim 27, wherein:
the management unit implements management so that when a predetermined length of time elapses following a previous transmission of image information, the image information held at the information holding unit is transmitted to the outside recipient from the communication unit even if the image information does not satisfy the predetermined condition.

29. An image storage apparatus according to claim 27, wherein:
the management unit implements management so that the image information held at the information holding unit is transmitted to the outside recipient from the communication unit at a predetermined time point even if the image information does not satisfy the predetermined condition.

30. An image storage apparatus according to claim 27, wherein:
the predetermined condition stipulates that a number of sets of image information held at the information holding unit has reached a predetermined value.

31. An image storage apparatus according to claim 27, wherein:

the predetermined condition stipulates that a total data volume of image information held at the information holding unit has reached a predetermined quantity.

32. An image storage supporting apparatus, comprising:
a communication unit;
an image storage unit at which image information received at the communication unit is stored; and
an information creation unit that creates related information based upon the image information received at the communication unit, the related information including display-image information with a resolution level which is higher than a resolution level of a thumbnail image corresponding to the image information, wherein:
the related information is transmitted from the communication unit to an originator of the image information, and
the resolution level of the display-image information is lower than a resolution level of the image information and is high enough for display over an entire screen of an image display unit provided at the originator.

33. An image storage supporting apparatus according to claim 32, wherein:
the information creation unit creates the display-image information with an information volume smaller than an information volume of the image information based upon the image information.

34. An image storage supporting apparatus according to claim 32, further comprising:
a processing unit that processes the image information stored at the image storage unit as instructed in instructions received at the communication unit.

35. An image storage system according to claim 1, wherein:
the information storage unit stores thumbnail image information corresponding to the image information; and
the resolution level of the display-image information is higher than a resolution level of the thumbnail image information.

36. An image storage system according to claim 1, wherein:
the resolution level of the display-image information is high enough for editing an image displayed on the image display unit based upon the display-image information.

37. A storage medium storing a set of program instructions executable on a data processing device, the instructions comprising:
instructions for executing management so that input image information is transmitted from a first communication unit in automatic response to an input of image information to an input unit;
instructions for holding the input image information until a transmission thereof is completed and then automatically discarding the input image information after the transmission is completed;
instructions for storing related information corresponding to the input image information having been transmitted even after the transmission is completed, the related information including display-image information created based upon the input image information to be displayed on an image display unit with a resolution level that is lower than a resolution level of the input image information and is high enouah for display over an entire screen of the image display unit;
instructions for issuing an instruction via the first communication unit with regard to processing to be executed on the input image information based upon the related information stored;
instructions for storing the input image information from the first communication unit having been received at a second communication unit; and
instructions for executing processing on the input image information stored based upon the instruction received at the second communication unit from the first communication unit.

38. An image storage system comprising:
an image storage apparatus; and
a supporting apparatus, wherein:
the image storage apparatus comprises:
an input unit to which image information is input,
an image display unit,
a first communication unit,
a management unit that executes management so that the input image information is transmitted from the first communication unit in automatic response to an input of the image information to the input unit,
an information holding unit that holds the input image information until a transmission thereof is completed and then automatically discards the input image information after the transmission is completed in response to the management unit,
an information storage unit at which related information corresponding to the image information having been transmitted is stored even after the transmission is completed, the related information including display-image information created based upon the image information to be displayed on the image display unit, and
an instruction unit that issues an instruction via the first communication unit with regard to editing the image information based upon the related information stored at the information storage unit; and
the supporting apparatus comprises:
a second communication unit,
an image storage unit at which the image information from the first communication unit having been received at the second communication unit is stored, and
a processing unit that executes processing on the image information stored at the image storage unit based upon the instruction received at the second communication unit from the first communication unit.

39. An image storage system comprising:
an image storage apparatus; and
a supporting apparatus, wherein:
the image storage apparatus comprises:
an input unit to which image information is input,
an image display unit,
a first communication unit,
a management unit that executes management so that the input image information is transmitted from the first communication unit in automatic response to an input of the image information to the input unit,
an information holding unit that holds the input image information until a transmission thereof is completed and then automatically discards the input image information after the transmission is completed in response to the management unit,
an information storage unit at which related information corresponding to the image information having been transmitted is stored even after the transmission is completed, the related information including display-image information created based upon the image information to be displayed on the image display unit, and an instruction unit that issues an instruction via the first communication unit with regard to mailing an image corresponding to the image information based upon the related information stored at the information storage unit; and the supporting apparatus comprises:

a second communication unit, an image storage unit at which the image information from the first communication unit having been received at the second communication unit is stored, and a processing unit that executes processing on the image information stored at the image storage unit based upon the instruction received at the second communication unit from the first communication unit.

40. An image storage system comprising:

an image storage apparatus; and a supporting apparatus, wherein:

the image storage apparatus comprises:

an input unit to which image information is input, an image display unit, a first communication unit, a management unit that executes management so that the input image information is transmitted from the first communication unit in automatic response to an input of the image information to the input unit, an information holding unit that holds the input image information until a transmission thereof is completed and then automatically discards the input image information after the transmission is completed in response to the management unit, an information storage unit at which related information corresponding to the image information having been transmitted is stored even after the transmission is completed, the related information including display-image information created based upon the image information to be displayed on the image display unit, and an instruction unit that issues an instruction via the first communication unit with regard to printing the image information based upon the related information stored at the information storage unit; and the supporting apparatus comprises:

a second communication unit, an image storage unit at which the image information from the first communication unit having been received at the second communication unit is stored, and a processing unit that executes processing on the image information stored at the image storage unit based upon the instruction received at the second communication unit from the first communication unit.

* * * * *